US012646531B2

(12) United States Patent
Yamaga et al.

(10) Patent No.: US 12,646,531 B2
(45) Date of Patent: Jun. 2, 2026

(54) MAGNETIC RECORDING MEDIUM AND CARTRIDGE

(71) Applicant: Sony Group Corporation, Tokyo (JP)

(72) Inventors: Minoru Yamaga, Tokyo (JP); Tooru Sato, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/848,220

(22) PCT Filed: Aug. 7, 2023

(86) PCT No.: PCT/JP2023/028686
§ 371 (c)(1),
(2) Date: Sep. 18, 2024

(87) PCT Pub. No.: WO2024/038786
PCT Pub. Date: Feb. 22, 2024

(65) Prior Publication Data
US 2025/0218459 A1 Jul. 3, 2025

(30) Foreign Application Priority Data

Aug. 19, 2022 (JP) ................................. 2022-131380

(51) Int. Cl.
*G11B 5/714* (2006.01)
*G11B 5/706* (2006.01)
*G11B 5/73* (2006.01)
(52) U.S. Cl.
CPC .......... *G11B 5/714* (2013.01); *G11B 5/70678* (2013.01); *G11B 5/73927* (2019.05); *G11B 2220/956* (2013.01)

(58) Field of Classification Search
CPC .......... G11B 2220/956; G11B 5/70678; G11B 5/714; G11B 5/73927
See application file for complete search history.

(56) References Cited

U.S. PATENT DOCUMENTS

2007/0009768 A1* 1/2007 Takeda ............... G11B 5/73929
427/127
2007/0230054 A1 10/2007 Takeda et al.
(Continued)

FOREIGN PATENT DOCUMENTS

JP 2019021362 A 2/2019
JP 2020166914 A 10/2020

OTHER PUBLICATIONS

International Search Report from corresponding PCT application PCT/JP2023/028686, dated Aug. 11, 2023.

*Primary Examiner* — Holly Rickman
*Assistant Examiner* — Linda N Chau
(74) *Attorney, Agent, or Firm* — K&L Gates LLP

(57) ABSTRACT

Provided are a magnetic recording medium and a magnetic recording cartridge. An average thickness of the magnetic recording medium $t_T$ is $t_T \leq 5.3$ μm, a ratio $(A_2/A_1)$ of an average creep slope $A_2$ at a temperature of 32° C. and a humidity of 80% RH to an average creep slope $A_1$ at a temperature of 32° C. and a humidity of 20% RH is 1.440 or less, and a ratio $(\mathrm{Tan}\, \delta_2/\mathrm{Tan}\, \delta_1)$ of an average $\mathrm{Tan}\, \delta_2$ at a temperature of 32° C. and a humidity of 80% RH to an average $\mathrm{Tan}\, \delta_1$ at a temperature of 32° C. and a humidity of 20% RH is less than 1.2100. The magnetic recording cartridge includes the magnetic recording medium, a memory and a case that accommodates the magnetic recording medium and the memory.

27 Claims, 14 Drawing Sheets

(56)  References Cited

U.S. PATENT DOCUMENTS

| | | | |
|---|---|---|---|
| 2007/0231616 A1 | 10/2007 | Takeda et al. | |
| 2019/0027172 A1 | 1/2019 | Kasada | |
| 2020/0312364 A1 | 10/2020 | Terakawa et al. | |
| 2021/0056986 A1* | 2/2021 | Yamaga | ............. G11B 5/00817 |

* cited by examiner

Figure 2:
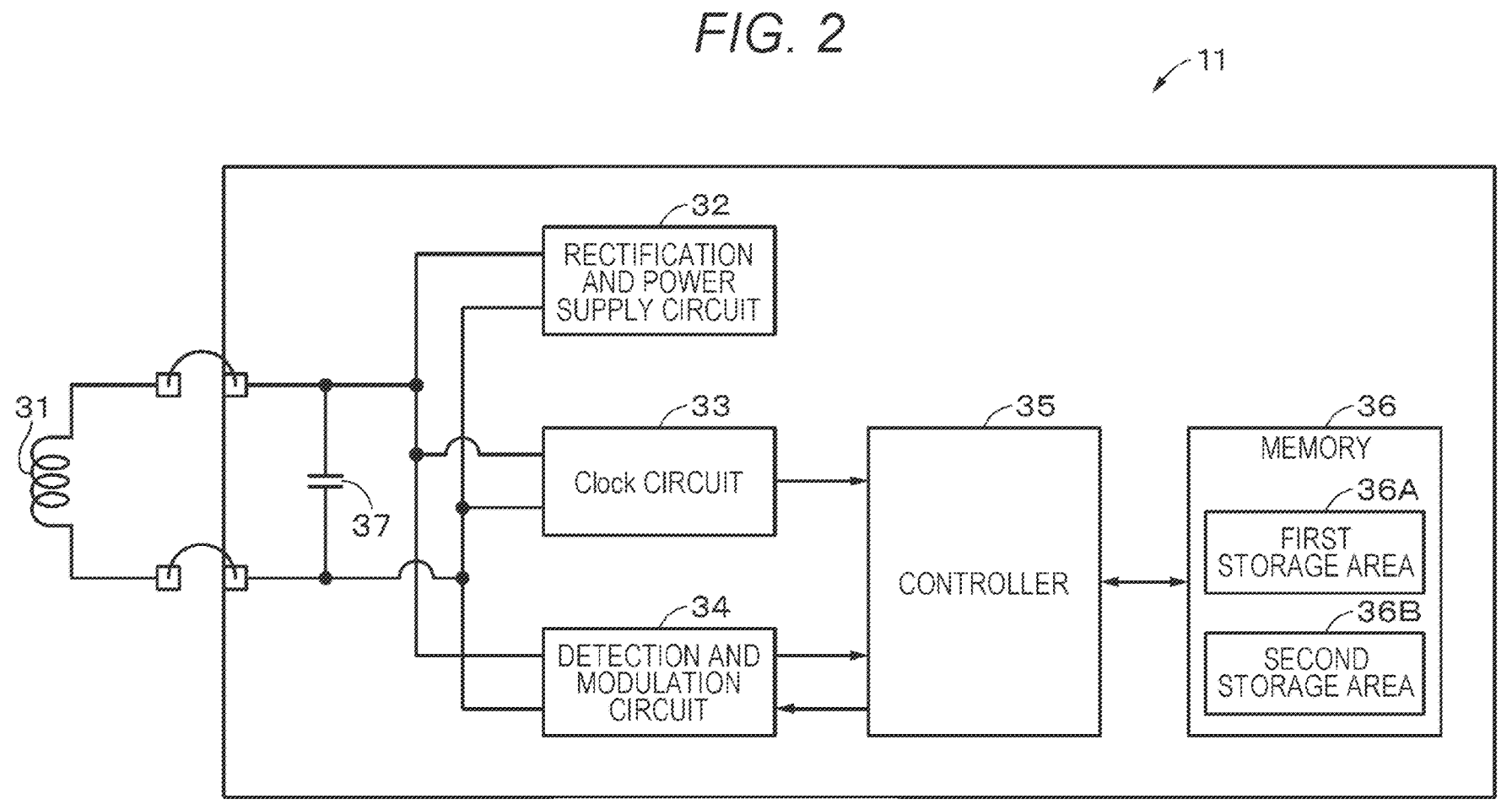

32 — RECTIFICATION AND POWER SUPPLY CIRCUIT

33 — Clock CIRCUIT

34 — DETECTION AND MODULATION CIRCUIT

35 — CONTROLLER

36 — MEMORY

36A — FIRST STORAGE AREA

36B — SECOND STORAGE AREA

37

31

AVERAGE SERVO BAND INTERVAL [μm]

AGING TIME [h]
(LOGARITHMIC AXIS)

MAGNETIC RECORDING MEDIUM AND CARTRIDGE

CROSS REFERENCE TO RELATED APPLICATIONS

This application claims the benefit of Japanese Priority Patent Application JP 2022-131380 filed on Aug. 19, 2022, the entire contents of which are incorporated herein by reference.

TECHNICAL FIELD

The present disclosure relates to a magnetic recording medium and a cartridge including the same.

BACKGROUND ART

Magnetic recording media in tape form are widely used in data centers and other archival applications. In recent years, it has become desirable to reduce the thickness of a magnetic recording medium in order to increase the capacity of a cartridge. For example, Patent Literature (PTL) 1 discloses a magnetic recording medium with an average thickness of 5.3 μm or less.

CITATION LIST

Patent Literature

[PTL 1]
JP 2020-166914A

SUMMARY

Technical Problem

However, when the thickness of the magnetic recording medium decreases, it may become difficult to maintain dimensional stability against a temperature change in a high-humidity environment.

An object of the present disclosure is to provide a magnetic recording medium having excellent dimensional stability against a temperature change in a high-humidity environment and a cartridge including the magnetic recording medium.

Solution to Problem

According to an embodiment of the present disclosure, a magnetic recording medium is provided. An average thickness of the magnetic recording medium $t_T$ is $t_T \leq 5.3$ μm, a ratio $(A_2/A_1)$ of an average creep slope $A_2$ at a temperature of 32° C. and a humidity of 80% RH to an average creep slope $A_1$ at a temperature of 32° C. and a humidity of 20% RH is 1.440 or less, and a ratio (Tan $\delta_2$/Tan $\delta_1$) of an average Tan $\delta_2$ at a temperature of 32° C. and a humidity of 80% RH to an average Tan $\delta_1$ at a temperature of 32° C. and a humidity of 20% RH is less than 1.2100.

According to another embodiment of the present disclosure, a magnetic recording cartridge is provided. The magnetic recording cartridge includes the magnetic recording medium described herein, a memory and a case that accommodates the magnetic recording medium and the memory.

BRIEF DESCRIPTION OF DRAWINGS

FIG. 2 is a block diagram illustrating an example of a configuration of a cartridge memory.

DESCRIPTION OF EMBODIMENTS

Embodiments of the present disclosure will be described in the following order.

1. Configuration of cartridge
2. Configuration of cartridge memory
3. Configuration of magnetic tape
4. Method for manufacturing magnetic tape
5. Effects
6. Modified Example In the present specification, in a case where the measurement environment is not particularly described for the description of the measurement method, the measurement is performed under an environment at 25° C.±2° C. and 50% RH±5% RH.

1. Configuration of Cartridge

Figure 1:
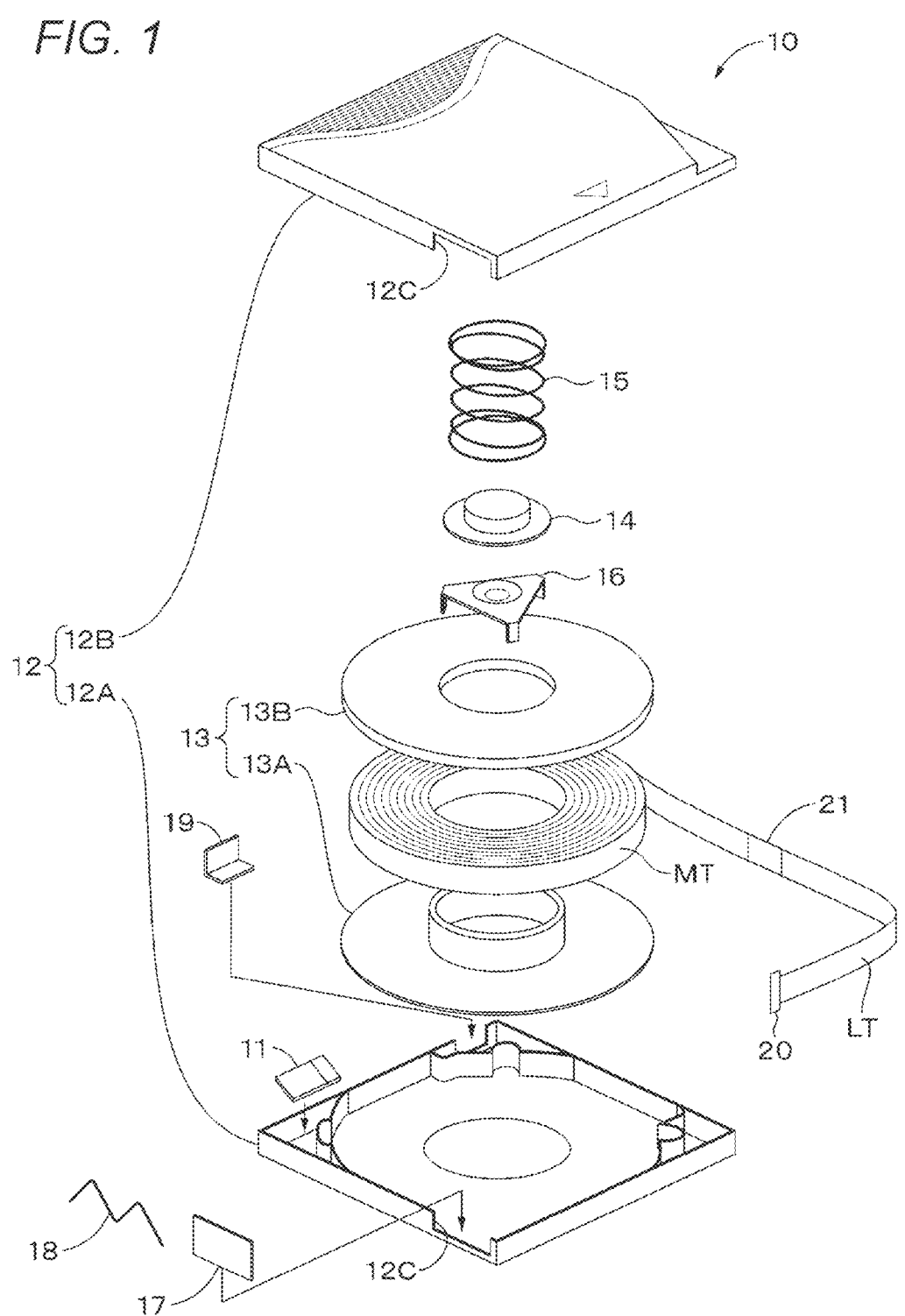
FIG. 1 is an exploded perspective view illustrating an example of a configuration of a cartridge according to an embodiment of the present disclosure.

FIG. 1 is an exploded perspective view illustrating an example of a configuration of a cartridge 10. The cartridge 10 is a one-reel type cartridge and includes: one reel 13 around which a magnetic recording medium in tape form (hereinafter referred to as a "magnetic tape") MT is wound inside a cartridge case 12 including a lower shell 12A and an upper shell 12B; a reel lock 14 and a reel spring 15 for locking the rotation of the reel 13; a spider 16 for releasing the locked state of the reel 13; a slide door 17 for opening and closing a tape outlet 12C provided in the cartridge case 12 across the lower shell 12A and the upper shell 12B; a door spring 18 for biasing the slide door 17 to the closed position of the tape outlet 12C; a write protect 19 for preventing accidental erasure; and a cartridge memory 11. The reel 13 for the winding of the magnetic tape MT is substantially disk-shaped with an opening in the center and includes a reel hub 13A and a flange 13B including a hard material such as plastic. A leader tape LT is connected to the outer peripheral end of the magnetic tape MT. A leader pin 20 is provided at the front end of the leader tape LT.

The cartridge 10 may be a magnetic tape cartridge conforming to the linear tape-open (LTO) standard or may be a magnetic tape cartridge conforming to a standard different from the LTO standard.

The cartridge memory 11 is provided near one corner of the cartridge 10. In a state where the cartridge 10 is loaded in the recording and reproduction apparatus, the cartridge memory 11 faces the reader/writer of the recording and reproduction apparatus. The cartridge memory 11 communicates with the recording and reproduction apparatus, specifically, the reader/writer, in accordance with a wireless communication standard conforming to the LTO standard.

2. Configuration of Cartridge Memory

FIG. 2 is a block diagram illustrating an example of the configuration of the cartridge memory 11. The cartridge memory 11 includes: an antenna coil (communication part) 31 that communicates with the reader/writer according to a prescribed communication standard; a rectification and power supply circuit 32 that generates and rectifies power from a radio wave received by the antenna coil 31, using an induced electromotive force to generate a power supply; a clock circuit 33 that generates a clock from the radio wave received by the antenna coil 31, using induced electromotive force in a similar manner; a detection and modulation circuit 34 that detects the radio wave received by the antenna coil 31 and modulates a signal transmitted by the antenna coil 31; a controller (control part) 35 including a logic circuit or the like for determining a command and data from a digital signal taken from the detection and modulation circuit 34 and processing the command and data, and a memory (storage part) 36 that stores information. Further, the cartridge memory 11 includes a capacitor 37 connected in parallel to the antenna coil 31, and the antenna coil 31 and the capacitor 37 constitute a resonance circuit.

The memory 36 stores information and the like related to the cartridge 10. The memory 36 is a non-volatile memory (NVMV). The storage capacity of the memory 36 is preferably about 32 KB or more.

The memory 36 may have a first storage area 36A and a second storage area 36B. For example, the first storage area 36A corresponds to a storage area of a cartridge memory of a magnetic tape standard of a specified generation or earlier (e.g., an LTO standard of LTO-8 or earlier) and is an area for storing information conforming to the magnetic tape standard of the specified generation or earlier. The information conforming to the magnetic tape standard of the specified generation or earlier is, for example, manufacturing information (e.g., a unique number of the cartridge 10, etc.), a use history (e.g., the number of times of tape extraction (Thread Count)), and the like.

The second storage area 36B corresponds to an extended storage area for a storage area of a cartridge memory of a magnetic tape standard of a specified generation or earlier (e.g., an LTO standard of LTO-8 or earlier). The second storage area 36B is an area for storing additional information. Here, the additional information means, for example, information related to the cartridge 10 that is not defined in a magnetic tape standard of a specified generation or earlier (e.g., the LTO standard of LTO-8 or earlier). The additional information includes, for example, at least one type of information selected from the group consisting of tension adjustment information, management ledger data, index information, thumbnail information, and the like, but is not limited to these data. The tension adjustment information is information for adjusting the tension applied to the magnetic tape MT in the longitudinal direction. The tension adjustment information includes, for example, at least one type of information selected from the group consisting of information obtained by intermittently measuring the width between servo bands in the longitudinal direction of the magnetic tape MT, drive tension information, drive temperature and humidity information, and the like. These pieces of information may be managed in conjunction with information regarding the usage status of the cartridge 10 or the like. The tension adjustment information is preferably acquired at the time of data recording on the magnetic tape MT or before data recording. The drive tension information means information on the tension applied to the magnetic tape MT in the longitudinal direction.

The management ledger data is data including at least one selected from the group consisting of a capacity, a creation date, an editing date, a storage location, and the like of a data file recorded on the magnetic tape MT. The index information is metadata or the like for searching the content of the data file. The thumbnail information is a thumbnail of a moving image or a still image stored on the magnetic tape MT.

The memory 36 may have a plurality of banks. In this case, some of the plurality of banks may constitute the first storage area 36A, and the remaining banks may constitute the second storage area 36B.

The antenna coil 31 induces an induced voltage by electromagnetic induction. The controller 35 communicates with the recording and reproduction apparatus according to a prescribed communication standard via the antenna coil 31. Specifically, for example, mutual authentication, transmission and reception of commands, exchange of data, and the like are performed.

The controller 35 stores the information received from the recording and reproduction apparatus via the antenna coil 31 in the memory 36. For example, the tension adjustment information received from the recording and reproduction apparatus through the antenna coil 31 is stored in the second storage area 36B of the memory 36. In response to a request from the recording and reproduction apparatus, the controller 35 reads information from the memory 36 and transmits the information to the recording and reproduction apparatus via the antenna coil 31. For example, in response to a request from the recording and reproduction apparatus, the tension adjustment information is read from the second storage area 36B of the memory 36 and transmitted to the recording and reproduction apparatus via the antenna coil 31.

3. Configuration of Magnetic Tape

Figure 3:
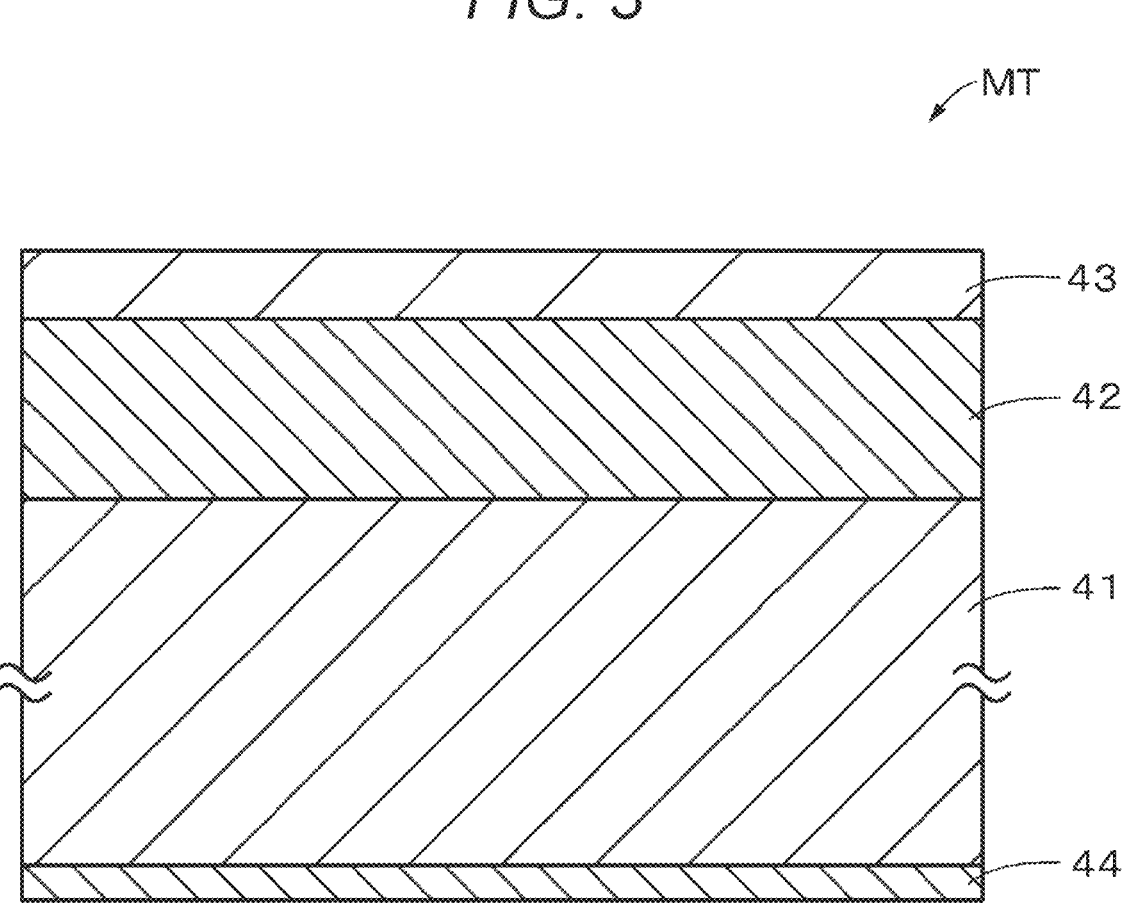
FIG. 3 is a cross-sectional view illustrating an example of a configuration of a magnetic tape.

FIG. 3 is a cross-sectional view illustrating an example of the configuration of the magnetic tape MT. The magnetic tape MT includes a long substrate 41, an underlayer 42 provided on one main surface (first main surface) of the substrate 41, a magnetic layer 43 provided on the underlayer 42, and a back layer 44 provided on the other main surface (second main surface) of the substrate 41. Note that the underlayer 42 and the back layer 44 are provided as necessary and may be absent. The magnetic tape MT may be a perpendicular recording type magnetic recording medium or a longitudinal recording type magnetic recording medium.

The magnetic tape MT preferably contains a lubricant from the viewpoint of improving running performance. The lubricant may be contained in at least one of the underlayer 42 or the magnetic layer 43.

The magnetic tape MT may conform to the LTO standard or may conform to a standard different from the LTO standard. The width of the magnetic tape MT may be ½ inch or may be wider than ½ inch. In a case where the magnetic tape MT conforms to the LTO standard, the width of the magnetic tape MT is ½ inch. The magnetic tape MT may have a configuration in which the width of the magnetic tape MT can be kept constant or substantially constant by adjustment of tension applied in the longitudinal direction of the magnetic tape MT by a recording and reproduction apparatus (drive) during running.

The magnetic tape MT has an elongated shape and runs in the longitudinal direction during recording and playback. The magnetic tape MT is preferably used in a recording and reproduction apparatus including a ring head as a recording head. The magnetic tape MT is preferably used in a recording and reproduction apparatus configured to be capable or recording data with a data track width of 1200 nm or less or 1000 nm or less.

The magnetic tape MT is preferably played back by a playback head using a tunnel magnetoresistance (TMR) device. A signal reproduced by the playback head using TMR may be data recorded in a data band DB (cf. FIG. 4) or a servo pattern (servo signal) recorded in a servo band SB (cf. FIG. 4).

(Substrate)

The substrate 41 is a nonmagnetic support that supports the underlayer 42 and the magnetic layer 43. The substrate 41 has a long film shape. The upper limit of the average thickness of the substrate 41 is preferably 4.40 μm or less, more preferably 4.20 μm or less, still more preferably 4.00 μm or less, particularly preferably 3.80 μm or less, and most preferably 3.40 μm or less. When the upper limit of the average thickness of the substrate 41 is 4.40 μm or less, the recording capacity with which recording is possible in one data cartridge can be made higher than a general magnetic tape. The lower limit of the average thickness of the substrate 41 is preferably 3.00 μm or more, and more preferably 3.20 μm or more. When the lower limit of the average thickness of the substrate 41 is 3.00 μm or more, a decrease in the strength of the substrate 41 can be reduced.

The average thickness of the substrate 41 is obtained as follows. First, the magnetic tape MT accommodated in the cartridge 10 is unwound, and the magnetic tape MT is cut out to a length of 250 mm at a position of 30 m to 40 m in the longitudinal direction from one outer peripheral end of the magnetic tape MT to prepare a sample. In the present specification, the "longitudinal direction" in the case of "the longitudinal direction from one outer peripheral end of the magnetic tape MT" means a direction from one end on the outer peripheral side toward the other inner peripheral end of the magnetic tape MT.

Subsequently, the layers of the sample except for the substrate 41 (i.e., the underlayer 42, the magnetic layer 43, and the back layer 44) are removed with a solvent such as methyl ethyl ketone (MEK) or dilute hydrochloric acid. Next, the thickness of the sample (substrate 41) is measured at five positions using Laser Hologage (LGH-110C) manufactured by Mitutoyo Corporation as a measuring apparatus, and the measured values are simply averaged (arithmetically averaged) to calculate the average thickness of the substrate 41. Note that the five measurement positions described above are randomly selected from the sample so as to be different positions in the longitudinal direction of the magnetic tape MT.

The substrate 41 contains, for example, a polyester-based resin as a main component. The polyester-based resin includes, for example, at least one selected from the group consisting of polyethylene terephthalate (PET), polyethylene naphthalate (PEN), polybutylene terephthalate (PBT), polybutylene naphthalate (PBN), polycyclohexylene dimethylene terephthalate (PCT), polyethylene-p-oxybenzoate (PEB), and polyethylene bisphenoxycarboxylate. In a case where the substrate 41 contains two or more polyester-based resins, the two or more polyester-based resins may be mixed, copolymerized, or laminated. At least one of the terminal or the side chain of the polyester-based resin may be modified. The substrate 41 may contain a resin except for the polyester-based resin described later in addition to the polyester-based resin.

In the present specification, the "main component" means a component having the highest content ratio among the components constituting the substrate 41. For example, in a case where the main component of the substrate 41 is a polyester-based resin, the content ratio of the polyester-based resin in the substrate 41 may be, for example, 50 mass % or more, 60 mass % or more, 70 mass % or more, 80 mass % or more, 90 mass % or more, 95 mass % or more, or 98 mass % or more with respect to the mass of the substrate 41, or the substrate 41 may only contain the polyester-based resin.

It is confirmed that the polyester-based resin is contained in the substrate 41, for example, as follows. First, similarly to the method for measuring the average thickness of the substrate 41, a magnetic tape MT is prepared, and cut into a length of 250 mm to prepare a sample, and then the layers of the sample except for the substrate 41 are removed. Next, by infrared absorption spectroscopy (IR), an IR spectrum of the sample (substrate 41) is acquired. On the basis of this IR spectrum, it can be confirmed that the substrate 41 contains a polyester-based resin.

The substrate 41 preferably contains a polyester-based resin. By the substrate 41 containing a polyester-based resin, the longitudinal Young's modulus of the substrate 41 can be reduced to preferably 2.5 GPa or more and 7.8 GPa or less, and more preferably 3.0 GPa or more and 7.0 GPa or less. Therefore, the width of the magnetic tape MT can be kept constant or substantially constant by adjusting the longitudinal tension of the magnetic tape MT during running by the recording and reproduction apparatus. A method for measuring the longitudinal Young's modulus of the substrate 41 will be described later.

The substrate 41 may contain a resin except for the polyester-based resin. In this case, a resin except for the polyester-based resin may be the main component of the constituent material of the substrate 41. In a case where the resin except for the polyester-based resin is the main component of the constituent material of the substrate 41, the content ratio of the resin except for the polyester-based resin in the substrate 41 may be, for example, 50 mass % or more, 60 mass % or more, 70 mass % or more, 80 mass % or more, 90 mass % or more, 95 mass % or more, or 98 mass % or more with respect to the mass of the substrate 41, or the substrate 41 may only contain the resin except for the polyester-based resin. The resin except for the polyester-based resin includes, for example, at least one selected from the group consisting of a polyolefin-based resin, a cellulose derivative, a vinyl-based resin, and other polymer resins. In a case where the substrate 41 contains two or more of these resins, the two or more materials may be mixed, copolymerized, or laminated.

The polyolefin-based resin contains, for example, at least one selected from the group consisting of polyethylene (PE) and polypropylene (PP). The cellulose derivative includes, for example, at least one selected from the group consisting of cellulose diacetate, cellulose triacetate, cellulose acetate butyrate (CAB), and cellulose acetate propionate (CAP). The vinyl-based resin includes, for example, at least one selected from the group consisting of polyvinyl chloride (PVC) and polyvinylidene chloride (PVDC).

The other polymer resin includes, for example, at least one selected from the group consisting of polyether ether ketone (PEEK), polyamide (PA, nylon), Aromatic polyamide (aromatic PA, aramid), polyimide (PI), aromatic PI (aromatic polyimide), polyamideimide (PAI), aromatic PAI (aromatic polyamideimide), polybenzoxazoles (PBO, e.g., ZYLON (registered trademark)), polyether, polyether ketone (PEK), polyether ester, polyether sulfone (PES), polyether imide (PEI), polysulfone (PSF), polyphenylene sulfide (PPS), polycarbonate (PC), polyarylate (PAR), and polyurethane (PU). Specifically, for example, the substrate 41 may contain polyether ether ketone (PEEK), polyamide (PA, nylon), Aromatic polyamide (aromatic PA, aramid), polyimide (PI), aromatic PI (aromatic polyimide), polyamideimide (PAI), aromatic PAI (aromatic polyamideimide), polybenzoxazoles (PBO, e.g., ZYLON (registered trademark)), polyether, polyether ketone (PEK), polyether ester, polyether sulfone (PES), polyether imide (PEI), polysulfone (PSF), polyphenylene sulfide (PPS), polycarbonate (PC), polyarylate (PAR), and polyurethane (PU) as a main component.

The substrate 41 may be biaxially stretched in the longitudinal direction and the width direction. The polymer resin contained in the substrate 41 is preferably oriented in an oblique direction with respect to the width direction of the substrate 41.

(Magnetic Layer)

The magnetic layer 43 is configured to be able to record a signal by a magnetization pattern. The magnetic layer 43 may be a perpendicular recording type recording layer or a longitudinal recording type recording layer. The magnetic layer 43 contains, for example, magnetic particles and a binder. The magnetic layer 43 may further contain at least one additive selected from the group consisting of conductive particles, abrasive particles, a lubricant, a curing agent, a rust inhibitor, nonmagnetic reinforcing particles, and the like, as necessary. The magnetic layer 43 may have a plurality of protrusions on the magnetic surface. The plurality of protrusions is formed using, for example, conductive particles, abrasive particles, and the like protruding from the magnetic surface.

Figure 4:
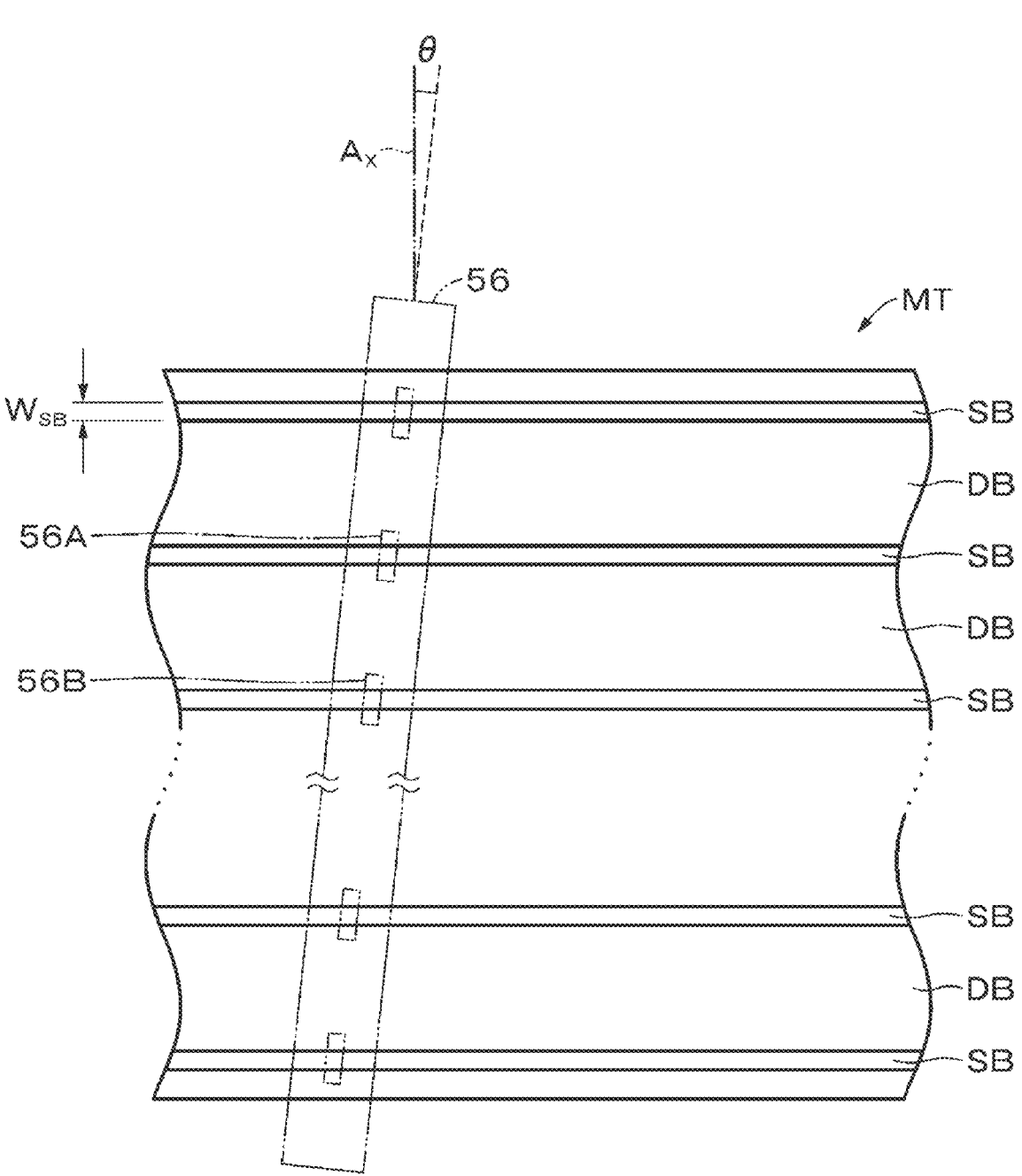
FIG. 4 is a schematic diagram illustrating an example of a layout of data bands and servo bands.

As illustrated in FIG. 4, the magnetic layer 43 may have a plurality of servo bands SB and a plurality of data bands DB in advance. The plurality of servo bands SB is provided at equal intervals in the width direction of the magnetic tape MT. A data band DB is provided between the adjacent servo bands SB. The servo band SB is for guiding a head unit (magnetic head) 56 (specifically, servo read heads 56A, 56B) at the time of recording or reproducing data. In the servo band SB, a servo pattern (servo signal) for performing tracking control of the head unit 56 is written in advance. User data is recorded in the data band DB.

In order to read asymmetric servo stripes 113 (cf. FIG. 6) to be described later, as illustrated in FIG. 4, the head unit 56 may be configured to be able to be held oblique to an axis Ax parallel to the width direction of the magnetic tape MT at the time of recording and reproducing data. Alternatively, the head unit 56 may be configured to be oblique to the above axis Ax following the meandering or deformation of the magnetic tape MT at the time of recording and reproducing data. The inclination angle of the head unit 56 based on the axis Ax parallel to the width direction of the magnetic tape MT is preferably 3° or more and 180 or less, and more preferably 5° or more and 15° or less.

The upper limit of a ratio $R_S$ (=(SSB/S)×100) of a total area SSB of the plurality of servo bands SB to an area S of the magnetic surface (the surface of the magnetic layer 43) is preferably 4.0% or less, more preferably 3.5% or less, and still more preferably 3.0% or less from the viewpoint of ensuring a high recording capacity. On the other hand, the lower limit of the ratio $R_S$ of the total area SSB of the plurality of servo bands SB to the area S of the magnetic surface is preferably 1.0% or more from the viewpoint of ensuring five or more servo bands SB.

The ratio $R_S$ of the total area SSB of the plurality of servo bands SB to the area S of the entire magnetic surface is obtained as follows. The magnetic tape MT is developed using a ferricolloid developer (manufactured by Sigma High Chemical Co., Ltd., Sigmarker Q), and then the developed magnetic tape MT is observed with an optical microscope to measure a servo bandwidth $W_{SB}$ and the number of servo bands SB.

Next, the ratio $R_S$ is obtained from the following equation.

$$\text{Ratio } R_S[\%] = (((\textit{servo bandwidth } W_{SB}) \times (\text{number of } \textit{servo bands } SB)) / (\text{width of magnetic tape } MT)) \times 100$$

The number of servo bands SB is, for example, 5+4n (where n is an integer of 0 or more) or more. The number of servo bands SB is preferably five or more, and more preferably nine or more. When the number of the servo bands SB is five or more, the influence on the servo signal due to the dimensional change of the magnetic tape MT in the width direction can be reduced, and stable recording and reproducing characteristics with less off-track can be ensured. The upper limit of the number of servo bands SB is not particularly limited, but is, for example, 33 or less.

The number of servo bands SB is obtained in a similar manner to the method for calculating the ratio $R_S$ described above.

The upper limit of the servo bandwidth $W_{SB}$ is preferably 95 μm or less, more preferably 65 μm or less, and still more preferably 50 μm or less from the viewpoint of ensuring a high recording capacity. The lower limit of the servo bandwidth $W_{SB}$ is preferably 10 μm or more. It is difficult to manufacture a magnetic head capable of reading a servo signal with a servo bandwidth $W_{SB}$ of less than 10 μm.

The width of the servo bandwidth $W_{SB}$ is obtained in a similar manner to the method for calculating the ratio $R_S$ described above.

Figure 5:
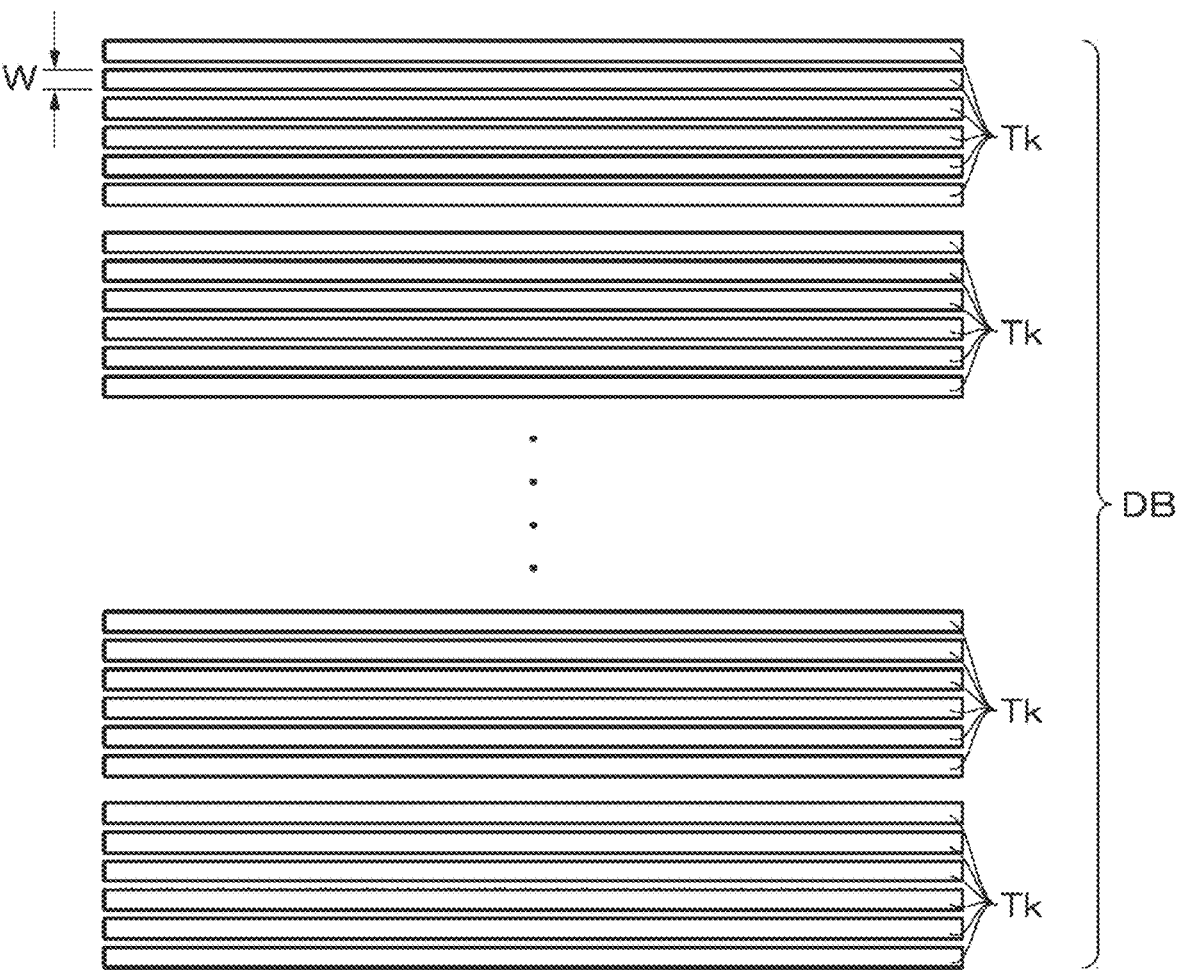
FIG. 5 is an enlarged view illustrating an example of the configuration of the data band.

As illustrated in FIG. 5, the magnetic layer 43 is configured to be able to form a plurality of data tracks Tk in the data band DB. The upper limit of the data track width W is preferably 1200 nm or less, 1000 nm or less, or 800 nm or less, and particularly preferably 600 nm or less from the viewpoint of improving the track recording density and ensuring a high recording capacity. The lower limit of the data track width W is preferably 20 nm or more in consideration of the magnetic particle size.

The data track width W is obtained as follows. First, the cartridge 10 in which data is recorded on the entire surface of the magnetic tape MT is prepared, the magnetic tape MT is unwound from the cartridge 10, and the magnetic tape MT is cut out to a length of 250 mm at a position of 30 m to 40 m in the longitudinal direction from one outer peripheral end of the magnetic tape MT to prepare a sample. Subsequently, the data recording pattern of the data band DB portion of the magnetic layer 43 of the sample is observed using a magnetic force microscope (MFM) to obtain an MFM image. As the MFM, Dimension 3100 manufactured by Digital Instruments and its analysis software are used. The measurement region of the MFM image is 10 μm×10 μm, and the measurement region of 10 μm×10 μm is divided into 512× 512 (=262,144) measurement points. Measurement by MFM is performed on three 10 μm×10 μm measurement regions at different locations, that is, three MFM images are obtained. The track width is measured at ten points in each of the obtained three MFM images, the measured values at 30 points in total are acquired, and the average value (simple average) of the measured values at the 30 points is calculated. The average value is the data track width W. For the measurement of the track width, analysis software included with Dimension 3100 is used. Note that measurement conditions for the above MFM are as follows: a sweep speed is 1 Hz, a chip used is MFMR-20, a lift height is 20 nm, and a correction is made by Flatten order 3.

From the viewpoint of ensuring a high recording capacity, the magnetic layer 43 is configured to be capable of recording data such that a minimum value $L_{min}$ of the distance between magnetization reversals is preferably 47 nm or less, more preferably 44 nm or less, still more preferably 42 nm or less, and particularly preferably 40 nm or less. The lower limit of the minimum value $L_{min}$ of the distance between magnetization reversals is preferably 20 nm or more in consideration of the magnetic particle size.

The minimum value $L_{min}$ of the distance between magnetization reversals is obtained as follows. First, a sample is prepared in a similar manner to the method for measuring the data track width W. Subsequently, the data recording pattern of the data band DB portion of the magnetic layer 43 of the sample is observed using a magnetic force microscope (MFM) to obtain an MFM image. As the MFM, Dimension 3100 manufactured by Digital Instruments and its analysis software are used. The measurement region of the MFM image is 2 μm×2 μm, and the measurement region of 2 μm×2 μm is divided into 512×512 (=262,144) measurement points. Measurement by MFM is performed on three 2 μm×2 μm measurement regions at different locations, that is, three MFM images are obtained. From the two-dimensional unevenness chart of the recording pattern of the obtained MFM image, 50 distances between bits are measured. The distance between bits is measured using analysis software included with Dimension 3100. A value that is approximately the greatest common divisor of the 50 measured distances between bits is set as the minimum value $L_{min}$ of the distance between magnetization reversals. Note that measurement conditions are as follows: a sweep speed is 1 Hz, a chip used is MFMR-20, a lift height is 20 nm, and a correction is made by Flatten order 3.

A bit length $L_{bit}$ of the signal recorded in the data band DB is preferably 46 nm or less, more preferably 44 nm or less, still more preferably 42 nm or less, and particularly preferably 40 nm or less from the viewpoint of improving the recording density of the magnetic tape MT.

The bit length $L_{bit}$ of the signal recorded in the data band DB is obtained in a similar manner to the method for measuring the minimum value $L_{min}$ of the distance between magnetization reversals.

The bit area of the signal recorded in the data band DB is preferably 53000 nm² or less, more preferably 45000 nm² or less, still more preferably 37000 nm² or less, and particularly preferably 30,000 nm² or less from the viewpoint of improving the recording density of the magnetic tape MT.

The bit area of the signal recorded in the data band DB is obtained as follows. First, three MFM images are obtained in a similar manner to the method for measuring the data track width W. Next, the data track width W and the bit length $L_{bit}$ are obtained in similar manners to the method for measuring the data track width W and the method for measuring the bit length $L_{bit}$. Next, the bit area (W×$L_{bit}$) of the signal recorded in the data band DB is obtained using the data track width W and the bit length $L_{bit}$.

The servo pattern is a magnetized region and is formed by magnetizing a specific region of the magnetic layer 43 in a specific direction by a servo write head at the time of manufacturing the magnetic tape. In the servo band SB, a region where no servo pattern is formed (hereinafter referred to as a "non-pattern region") may be a magnetized region where the magnetic layer 43 is magnetized or a non-magnetized region where the magnetic layer 43 is not magnetized. In a case where the non-pattern region is the magnetized region, the servo pattern-formed region and the non-pattern region are magnetized in different directions (e.g., opposite directions).

Figure 6:
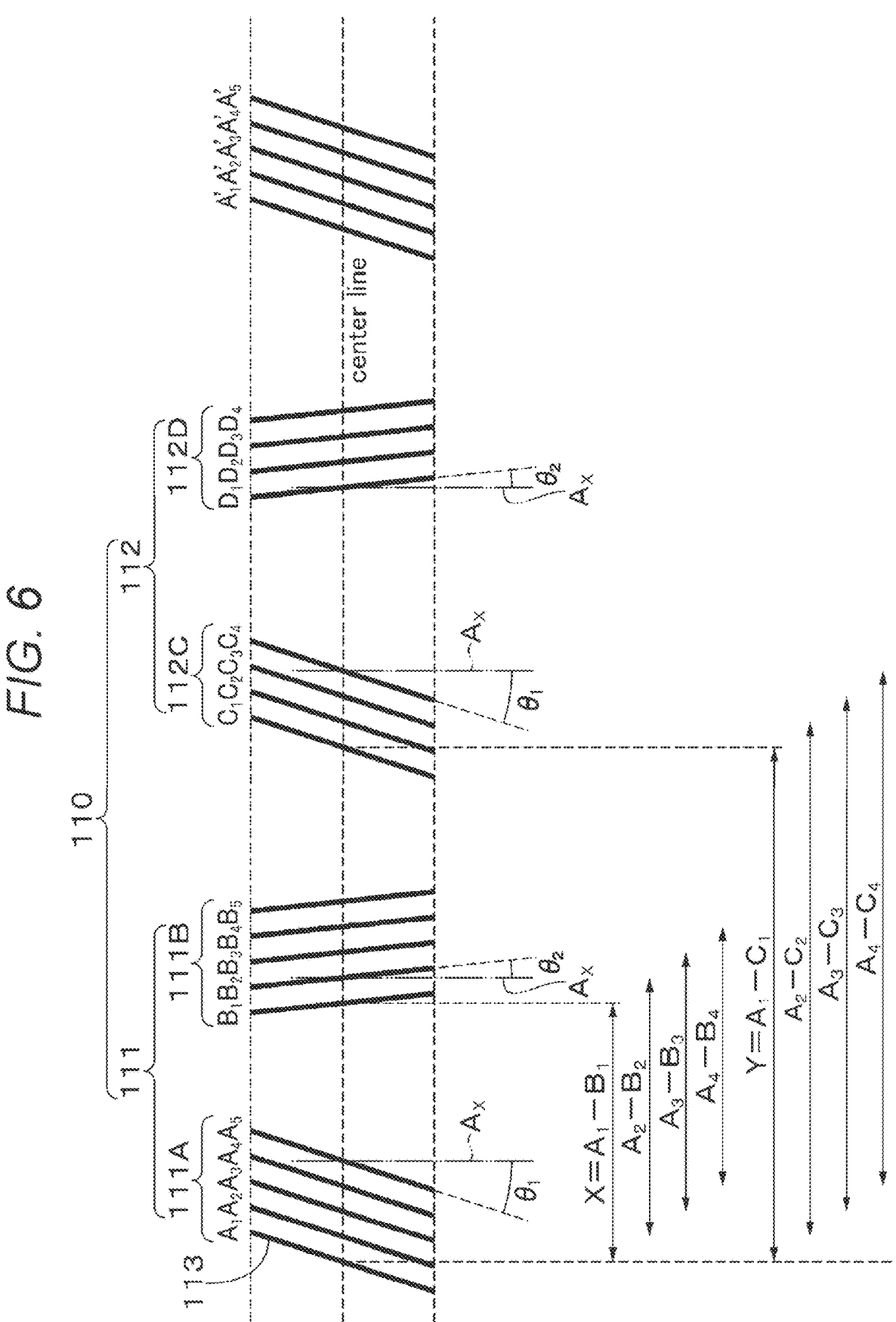
FIG. 6 is an enlarged view illustrating an example of the configuration of servo bands.

In the LTO standard, as illustrated in FIG. 6, a servo pattern including a plurality of servo stripes (linear magnetized regions) 113 inclined with respect to the axis Ax parallel to the width direction of the magnetic tape MT is formed on the servo band SB.

The servo band SB includes a plurality of servo frames 110. Each servo frame 110 includes 18 servo stripes 113. Specifically, each servo frame 110 includes a servo subframe 1(111) and a servo subframe 2(112).

The servo subframe 1(111) includes an A-burst 111A and a B-burst 111B. The B-burst 111B is disposed adjacent to the A-burst 111A. The A-burst 111A includes five servo stripes 113 inclined at a predetermined angle G1 with respect to the axis Ax parallel to the width direction of the magnetic tape MT and formed at a prescribed interval. In FIG. 6, these five servo stripes 113 are denoted by reference signs $A_1$, $A_2$, $A_3$, $A_4$, and $A_5$ from an end-of-tape (EOT) to a beginning-of-tape (BOT) of the magnetic tape MT.

The B-burst 111B includes five servo stripes 113 inclined at a predetermined angle $\theta_2$ with respect to the axis Ax parallel to the width direction of the magnetic tape MT and formed at a prescribed interval. In FIG. 6, these five servo stripes 113 are denoted by reference signs $B_1$, $B_2$, $B_3$, $B_4$, and $B_5$ from the EOT to the BOT of the magnetic tape MT.

The servo stripe 113 of the B-burst 111B is inclined in a direction opposite to the servo stripe 113 of the A-burst 111A. The servo stripe 113 of the A-burst 111A and the servo stripe 113 of the B-burst 111B have asymmetry with respect to the axis Ax parallel to the width direction of the magnetic tape MT. That is, the servo stripes 113 of the A-burst 111A and the servo stripes 113 of the B-burst 111B are disposed in a substantially inverted V-shape. Due to the servo stripe 113 of the A-burst 111A and the servo stripe 113 of the B-burst 111B having asymmetry with respect to the axis Ax, there is a state where the servo stripe 113 of the A-burst 111A and the servo stripe 113 of the B-burst 111B become substantially symmetrical with respect to the central axis of the sliding surface of the head unit 56 when the head unit 56 is inclined obliquely to the axis Ax. By changing the inclination of the head unit 56 with reference to this state, the distance between the servo read heads 56A, 56B in the width direction of the magnetic tape MT can be adjusted. Thus, in both a case where the width of the magnetic tape MT increases and a case where the width of the magnetic tape MT decreases, the servo read heads 56A, 56B can be caused to face the prescribed position of the servo band SB. Note that the central axis of the sliding surface of the head unit 56 means an axis passing through the centers of the plurality of servo read heads 56A, 56B on the sliding surface of the head unit 56.

A predetermined angle $\theta_1$ that is the inclination angle of the servo stripe 113 of the A-burst 111A is different from a predetermined angle $\theta_2$ that is the inclination angle of the servo stripe 113 of the B-burst 111B. More specifically, the predetermined angle $\theta_1$ of the servo stripe 113 of the A-burst 111A may be larger than the predetermined angle $\theta_2$ of the servo stripe 113 of the B-burst 111B, or the predetermined angle $\theta_2$ of the servo stripe 113 of the B-burst 111B may be larger than the predetermined angle $\theta_1$ of the servo stripe 113 of the A-burst 111A. That is, the inclination of the servo stripe 113 of the A-burst 111A may be larger than the inclination of the servo stripe 113 of the B-burst 111B, or the inclination of the servo stripe 113 of the B-burst 111B may be larger than the inclination of the servo stripe 113 of the A-burst 111A. Note that FIG. 6 illustrates an example where the predetermined angle $\theta_1$ of the servo stripe 113 of the A-burst 111A is larger than the predetermined angle $\theta_2$ of the servo stripe 113 of the B-burst 111B. Hereinafter, a case where the predetermined angle $\theta_1$ of the servo stripe 113 of the A-burst 111A is larger than the predetermined angle $\theta_2$ of the servo stripe 113 of the B-burst 111B will be described.

The servo subframe 2(112) includes a C-burst 112C and a D-burst 112D. The D-burst 112D is disposed adjacent to the C-burst 112C. The C-burst 112C includes four servo stripes 113 inclined at a predetermined angle $\theta_1$ with respect to the axis Ax parallel to the width direction of the magnetic tape MT and formed at a prescribed interval. In FIG. 6, these four servo stripes 113 are denoted by reference signs $C_1$, $C_2$, $C_3$, and $C_4$ from the EOT to the BOT of the magnetic tape MT.

The D-burst 112D includes four servo stripes 113 inclined at a predetermined angle $\theta_2$ with respect to the axis Ax parallel to the width direction of the magnetic tape MT and formed at a prescribed interval. In FIG. 6, these four servo stripes 113 are denoted by reference signs $D_1$, $D_2$, $D_3$, and $D_4$ from the EOT to the BOT of the magnetic tape MT.

The servo stripe 113 of the D-burst 112D is inclined in a direction opposite to the servo stripe 113 of the C-burst 112C. The servo stripe 113 of the C-burst 112C and the servo stripe 113 of the D-burst 112D have asymmetry with respect to the axis Ax parallel to the width direction of the magnetic tape MT. That is, the servo stripe 113 of the C-burst 112C and the servo stripe 113 of the D-burst 112D are disposed in a substantially inverted V-shape. Due to the servo stripe 113 of the C-burst 112C and the servo stripe 113 of the D-burst 112D having asymmetry with respect to the axis Ax, there is a state where the servo stripe 113 of the C-burst 112C and the servo stripe 113 of the D-burst 112D are substantially symmetrical with respect to the central axis of the head unit 56 when the head unit 56 is inclined obliquely to the axis Ax. The inter-servo distance can be adjusted by changing the inclination of the head unit 56 with reference to this state.

A predetermined angle $\theta_1$ that is the inclination angle of the servo stripe 113 of the C-burst 112C is different from a predetermined angle $\theta_2$ that is the inclination angle of the servo stripe 113 of the D-burst 112D. More specifically, the predetermined angle $\theta_1$ of the servo stripe 113 of the C-burst 112C may be larger than the predetermined angle $\theta_2$ of the servo stripe 113 of the D-burst 112D, or the predetermined angle $\theta_2$ of the servo stripe 113 of the D-burst 112D may be larger than the predetermined angle $\theta$ of the servo stripe 113 of the C-burst 112C. That is, the inclination of the servo stripe 113 of the C-burst 112C may be larger than the inclination of the servo stripe 113 of the D-burst 112D, or the inclination of the servo stripe 113 of the D-burst 112D may be larger than the inclination of the servo stripe 113 of the C-burst 112C. Note that FIG. 6 illustrates an example where the predetermined angle G1 of the servo stripe 113 of the C-burst 112C is larger than the predetermined angle $\theta_2$ of the servo stripe 113 of the D-burst 112D. Hereinafter, a case where the predetermined angle G1 of the servo stripe 113 of the C-burst 112C is larger than the predetermined angle $\theta_2$ of the servo stripe 113 of the D-burst 112D will be described.

The above predetermined angle $\theta_1$ of the servo stripe 113 in the A-burst 111A and the C-burst 112C is preferably 180 or more and 28° or less, and more preferably 18° or more and 26° or less. The above predetermined angle $\theta_2$ of the servo stripe 113 in the B-burst 111B and the D-burst 112D is preferably −4° or more and 6° or less, and more preferably −2° or more and 6° or less. The servo stripe 113 in the A-burst 111A and the C-burst 112C is an example of a first magnetized region. The servo stripe 113 in the B-burst 111B and the D-burst 112D is an example of a second magnetized region.

By reading the servo band SB with the head unit 56, information for acquiring the tape speed and the vertical position of the head unit 56 can be obtained. The tape speed is calculated from four periods of time between timing signals (A1-C1, A2-C2, A3-C3, A4-C4). The head position is calculated from the four periods of time between timing signals described above and another four periods of time between timing signals (A1-B1, A2-B2, A3-B3, A4-B4). The servo pattern may have a shape including two parallel lines.

As illustrated in FIG. 6, the servo patterns (i.e., the plurality of servo stripes 113) are preferably linearly disposed in the longitudinal direction of the magnetic tape MT. That is, the servo band SB preferably has a linear shape in the longitudinal direction of the magnetic tape MT.

The upper limit of an average thickness $t_1$ of the magnetic layer 43 is preferably 80 nm or less, more preferably 65 nm or less, and still more preferably 55 nm or less. When the upper limit of the average thickness $t_1$ of the magnetic layer 43 is 80 nm or less, the influence of the demagnetizing field can be reduced in a case where a ring-type head is used as the recording head, so that more excellent electromagnetic conversion characteristics can be obtained.

The lower limit of the average thickness $t_1$ of the magnetic layer 43 is preferably 35 nm or more. When the lower limit of the average thickness $t_1$ of the magnetic layer 43 is 35 nm or more, an output can be ensured in a case where an MR-type head is used as a playback head, so that more excellent electromagnetic conversion characteristics can be obtained.

The average thickness $t_1$ of the magnetic layer 43 is obtained as follows. First, the magnetic tape MT accommodated in the cartridge 10 is unwound, and the magnetic tape MT is cut out into a length of 250 mm from each of a position of 10 m to 20 m, a position of 30 m to 40 m, and a position of 50 m to 60 m in the longitudinal direction from one outer peripheral end of the magnetic tape MT to prepare three samples. Subsequently, each sample is processed to be thinned by a focused ion beam (FIB) method or the like. In a case where the FIB method is used, a carbon layer and a tungsten layer are formed as protective films as pretreatment for observing a TEM image of a cross section to be described later. The carbon layer is formed on the surface of the magnetic tape MT on the magnetic layer 43 side and the surface of the magnetic tape MT on the back layer 44 side by vapor deposition or sputtering, and then, the tungsten layer is further formed on the surface on the magnetic layer 43 side by vapor deposition or sputtering. The thinning is performed along the longitudinal direction of the magnetic tape MT. That is, by the thinning, a cross section parallel to both the longitudinal direction and the thickness direction of the magnetic tape MT is formed.

The above cross section of each obtained thinned sample is observed with a transmission electron microscope (TEM) under the following conditions to obtain a TEM image of each thinned sample. Note that the magnification and the acceleration voltage may be appropriately adjusted in accordance with the type of the apparatus.

Apparatus: TEM (H9000NAR manufactured by Hitachi, Ltd.)
  Acceleration voltage: 300 kV
  Magnification: 100,000 times Next, the obtained TEM image of each thinned sample is used to measure the thickness of the magnetic layer 43 at ten points of each thinned sample. Note that ten measurement positions of each of the thinned samples are randomly selected from the samples so as to be different positions in the longitudinal direction of the magnetic tape MT. An average value obtained by simply averaging (arithmetically averaging) the measured values of each thinned sample (the thicknesses of the magnetic layers 43 at 30 points in total) is defined as the average thickness $t_1$ [nm] of the magnetic layer 43.

(Magnetic Particles)

The magnetic particles are, for example, particles containing hexagonal ferrite (hereinafter referred to as "hexagonal ferrite particles"), particles containing epsilon-type iron oxide (ε-iron oxide) (hereinafter referred to as "ε-iron oxide particles"), or particles containing Co-containing spinel ferrite (hereinafter referred to as "cobalt ferrite particles"). The magnetic particles are preferably crystal-oriented preferentially in the perpendicular direction of the magnetic tape MT. In the present specification, the perpendicular direction (thickness direction) of the magnetic tape MT means the thickness direction of the magnetic tape MT in a planar state.

(Hexagonal Ferrite Particles)

The hexagonal ferrite particles have, for example, a plate-like shape such as a hexagonal plate-like shape or a columnar shape such as a hexagonal columnar shape (where the thickness or height is smaller than the major axis of the plate surface or the bottom surface). In the present specification, the hexagonal plate-like shape includes a substantially hexagonal plate-like shape. The hexagonal ferrite preferably contains at least one selected from the group consisting of Ba, Sr, Pb, and Ca, and more preferably at least one selected from the group consisting of Ba and Sr. The hexagonal ferrite may be specifically, for example, barium ferrite or strontium ferrite. The barium ferrite may further contain at least one selected from the group consisting of Sr, Pb, and Ca in addition to Ba. The strontium ferrite may further contain at least one selected from the group consisting of Ba, Pb, and Ca in addition to Sr.

More specifically, the hexagonal ferrite has an average composition represented by the general formula $MFe_{12}O_{19}$. Here, M is, for example, at least one metal selected from the group consisting of Ba, Sr, Pb, and Ca, preferably at least one metal selected from the group consisting of Ba and Sr. M may be a combination of Ba and at least one metal selected from the group consisting of Sr, Pb, and Ca. Further, M may be a combination of Sr and at least one metal selected from the group consisting of Ba, Pb, and Ca. In the above general formula, a part of Fe may be substituted with another metal element.

In a case where the magnetic particles are hexagonal ferrite particles, the average particle size of the magnetic particles is preferably 13 nm or more and 20 nm or less, more preferably 13 nm or more and 19 nm or less, still more preferably 13 nm or more and 18 nm or less, particularly preferably 14 nm or more and 17 nm or less, and most preferably 14 nm or more and 16 nm or less. When the average particle size of the magnetic particles is 20 nm or less, more excellent electromagnetic conversion characteristics (e.g., signal-to-noise ratio (SNR)) can be obtained in the magnetic tape MT having a high recording density. On the other hand, when the average particle size of the magnetic particles is 13 nm or more, the dispersibility of the magnetic particles is further improved, and more excellent electromagnetic conversion characteristics (e.g., SNR) can be obtained.

In the case where the magnetic particles are hexagonal ferrite particles, the average aspect ratio of the magnetic particles is preferably 1.0 or more and 3.0 or less, more preferably 1.5 or more and 2.8 or less, and still more preferably 1.8 or more and 2.7 or less. When the average aspect ratio of the magnetic particles is in the range of 1.0 or more and 3.0 or less, the aggregation of the magnetic particles can be reduced. In addition, when the magnetic particles are perpendicularly oriented in the step of forming the magnetic layer 43, resistance applied to the magnetic particles can be reduced. Therefore, the perpendicular orientation of the magnetic particles can be improved.

In the case where the magnetic particles are hexagonal ferrite particles, the average particle size and the average aspect ratio of the magnetic particles are obtained as follows. First, the magnetic tape MT accommodated in the cartridge 10 is unwound, and the magnetic tape MT is cut out at a position of 30 m to 40 m in the longitudinal direction from one outer peripheral end of the magnetic tape MT. Subsequently, the magnetic tape MT to be measured is processed into a thin piece by the FIB method or the like. In a case where the FIB method is used, a carbon layer and a tungsten layer are formed as protective films as pretreatment for observing a TEM image of a cross section to be described later. The carbon layer is formed on the surface of the magnetic tape MT on the magnetic layer 43 side and the surface of the magnetic tape MT on the back layer 44 side by vapor deposition or sputtering, and then, the tungsten layer is further formed on the surface on the magnetic layer 43 side by vapor deposition or sputtering. The thinning is performed along the length direction (longitudinal direction) of the magnetic tape MT. That is, by the thinning, a cross section parallel to both the longitudinal direction and the thickness direction of the magnetic tape MT is formed.

Using a transmission electron microscope (H-9500 manufactured by Hitachi High-Tech Corporation), the above cross section of the obtained thinned sample is observed at an acceleration voltage of 200 kV and a total magnification of 500,000 times such that the entire magnetic layer 43 is included in the thickness direction of the magnetic layer 43, and a TEM image is captured. The TEM image is prepared in a number of sheets from which 50 particles can be extracted, each of the particles having a plate diameter DB and a plate thickness DA (cf. FIG. 7), described below, that can be measured.

Figure 7:
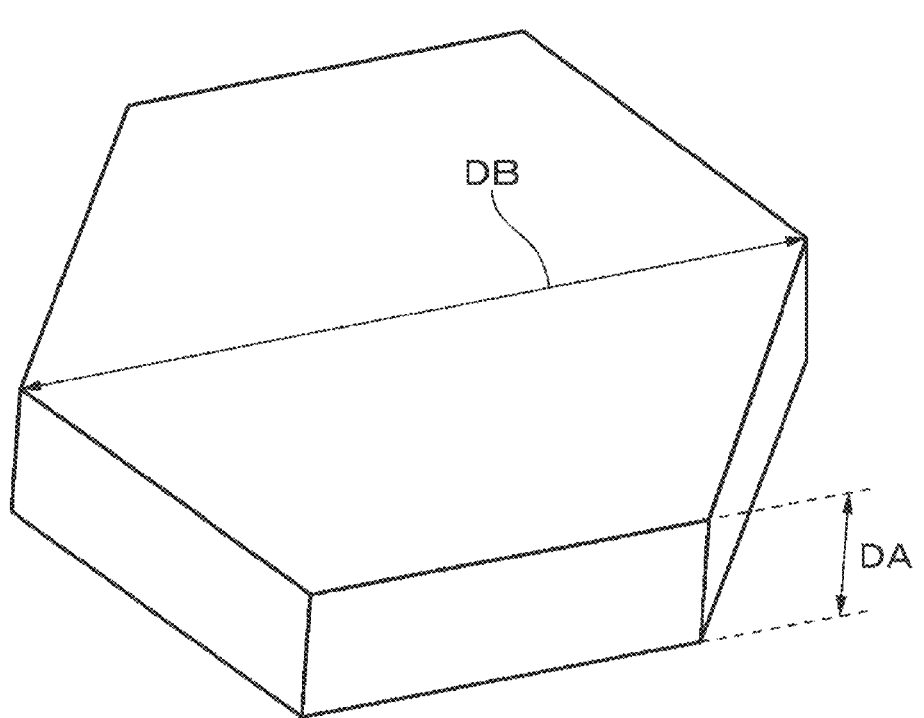
FIG. 7 is a perspective view illustrating an example of a shape of a particle.

In the present specification, as for the size of the hexagonal ferrite particle (hereinafter referred to as "particle size"), when the shape of the particle observed in the above TEM image is a plate shape or a columnar shape (where the thickness or height is smaller than the major axis of the plate surface or the bottom surface.) as shown in FIG. 7, the major axis of the plate surface or the bottom surface is taken as the value of the plate diameter DB. The thickness or height of the particle observed in the above TEM image is defined as the value of the plate thickness DA. In a case where the thickness or height of the particle is not constant in one particle observed in the TEM image, the maximum particle thickness or height is defined as the plate thickness DA.

Next, 50 particles taken from the captured TEM image are selected on the basis of the following criteria. A particle that is partially outside the field of view of the TEM image is not measured, and a particle having a clear outline and existing in isolation is measured. In a case where there is an overlap between the particles, each particle is measured as a single particle when the boundary between the particles is clear and the shape of the entire particle is determinable, but each particle is not measured when the boundary is not clear and the entire shape of the particle is undeterminable as the shape of the particle is undeterminable.

Figure 8:
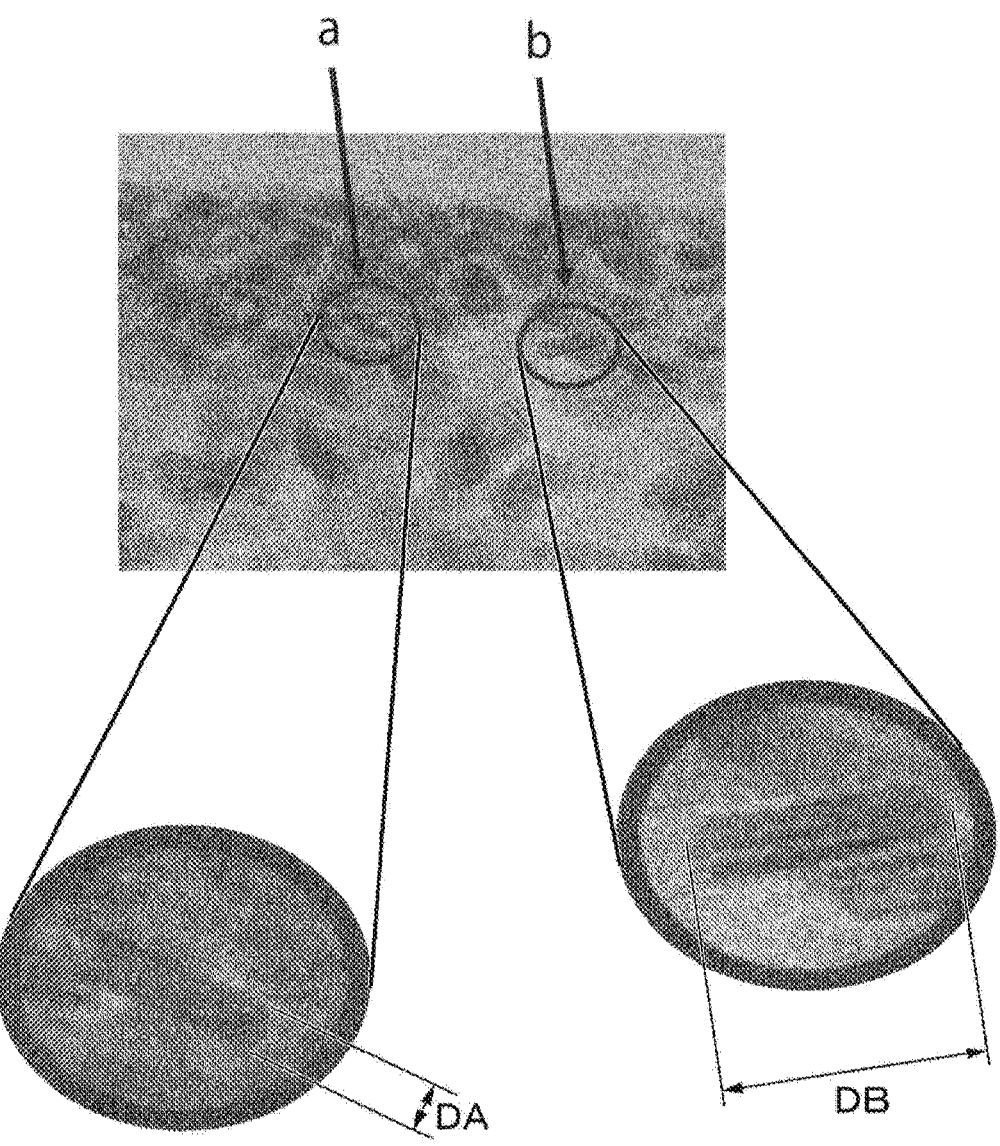
FIG. 8 shows a first example of a cross-sectional transmission electron microscope (TEM) image of a magnetic layer.
Figure 9:
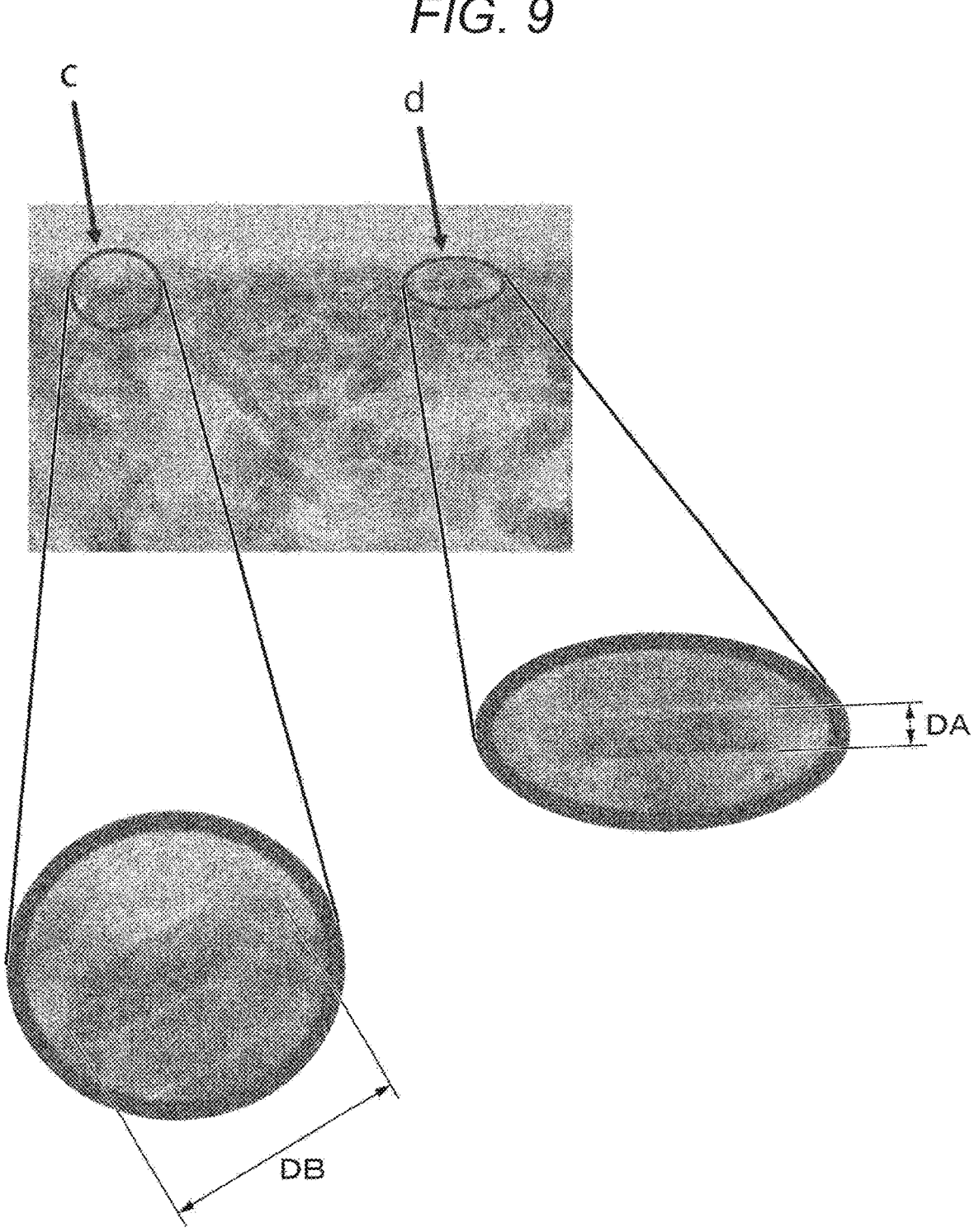
FIG. 9 shows a second example of a cross-sectional TEM image of a magnetic layer.

FIGS. 8 and 9 show a first example and a second example of the TEM image, respectively. In FIGS. 8 and 9, for example, the particles indicated by arrows a and d are selected because the plate thickness of each of the particles (the thickness or height of each of the Particles) DA of can be confirmed clearly. The plate thickness DA of each of the selected 50 particles is measured. The plate thicknesses DA thus obtained are simply averaged (arithmetically averaged) to obtain an average plate thickness $DA_{ave}$. The average plate thickness $DA_{ave}$ is the average particle plate thickness. Subsequently, the plate diameter DB of each magnetic particle is measured. In order to measure the plate diameter DB of the particles, 50 particles, the plate diameters DB of which can be clearly confirmed, are selected from the captured TEM image. For example, in FIGS. 8 and 9, for example, particles indicated by arrows b and c are selected because the plate diameter DB thereof can be confirmed clearly. The plate diameter DB of each of the selected 50 particles is measured. The plate diameters DB thus obtained are simply averaged (arithmetically averaged) to obtain an average plate diameter $DB_{ave}$. The average plate diameter $DB_{ave}$ is an average particle size. Then, the average aspect ratio $(DB_{ave}/DA_{ave})$ of the particles is obtained from the average plate thickness $DA_{ave}$ and the average plate diameter $DB_{ave}$.

In the case where the magnetic particles are hexagonal ferrite particles, the average particle volume of the magnetic particles is preferably 500 nm³ or more and 2500 nm³ or less, more preferably 500 nm³ or more and 1500 nm³ or less, still more preferably 500 nm³ or more and 1400 nm³ or less, particularly preferably 600 nm³ or more and 1200 nm³ or less, and most preferably 600 nm³ or more and 1000 nm³ or less. When the average particle volume of the magnetic particles is 2500 nm³ or less, a similar effect to a case where the average particle size of the magnetic particles is 22 nm or less can be obtained. On the other hand, in a case where the average particle volume of the magnetic particles is 500 nm³ or more, a similar effect to the case of setting the average particle size of the magnetic particles to 13 nm or more can be obtained.

The average particle volume of the magnetic particles is obtained as follows. First, as described above regarding the method for calculating the average particle size of the magnetic particles, the average plate thickness $DA_{ave}$ and the average plate diameter $DB_{ave}$ are obtained. Next, the average volume V of the magnetic particles is obtained by the following equation.

$$< IMG\ SRC = \text{``}SYP348412WO01m001.gif\text{''} > \qquad \text{[Math. 1]}$$

(ε-Iron Oxide Particles)

The ε-iron oxide particles are hard magnetic particles capable of obtaining a high coercivity even though being fine particles. The ε-iron oxide particles have a spherical shape or a cubic shape. In the present specification, the spherical shape includes a substantially spherical shape. Further, the cubic shape includes a substantially cubic shape. With the ε-iron oxide particles having the shape as described above, in a case where the ε-iron oxide particles are used as the magnetic particles, the contact area between the particles in the thickness direction of the magnetic tape MT can be reduced and aggregation between the particles can be reduced as compared with a case where hexagonal plate-shaped barium ferrite particles are used as the magnetic particles. Therefore, the dispersibility of the magnetic particles can be enhanced, and more excellent electromagnetic conversion characteristics (e.g., SNR) can be obtained.

The ε-iron oxide particle may have a structure of a composite particle. More specifically, the ε-iron oxide particle includes an ε-iron oxide portion and a soft magnetic portion or a magnetic portion having a higher saturation magnetization amount σs and a smaller coercivity Hc than ε-iron oxide (hereinafter referred to as a "soft magnetic portion or the like").

The ε-iron oxide portion contains ε-iron oxide. The ε-iron oxide contained in the ε-iron oxide portion preferably has an ε-$Fe_2O_3$ crystal as a main phase and more preferably has a single phase of ε-$Fe_2O_3$.

The soft magnetic portion or the like is at least partially in contact with the ε-iron oxide portion. Specifically, the soft magnetic portion or the like may partially cover the ε-iron oxide portion or may cover the entire periphery of the ε-iron oxide portion.

The soft magnetic portion (the magnetic portion having a higher saturation magnetization amount σs and a smaller coercivity Hc than ε-iron oxide) includes, for example, a soft magnetic material such as α-Fe, a Ni—Fe alloy, or a Fe—Si—Al alloy. α-Fe may be obtained by reducing ε-iron oxide contained in the ε-iron oxide portion.

In addition, the soft magnetic portion may contain, for example, $Fe_3O_4$, γ-$Fe_2O_3$, spinel ferrite, or the like.

The inclusion of a soft magnetic portion or the like as described above in the ε-iron oxide particle makes it possible to adjust the coercivity Hc of the ε-iron oxide particle (composite particle) as a whole to a coercivity Hc suitable for recording while maintaining the coercivity Hc of the ε-iron oxide portion alone at a large value for ensuring thermal stability.

The ε-iron oxide particle may contain an additive instead of the structure of the composite particle described above or may have the structure of the composite particle described above and contain an additive. In this case, a part of Fe in the ε-iron oxide particles is substituted with an additive. The containment of an additive in the ε-iron oxide particles also makes it possible to adjust the coercivity Hc of the ε-iron oxide particles as a whole to a coercivity Hc suitable for recording, and thereby to improve the ease of recording. The additive is a metal element except for iron, preferably a trivalent metal element, more preferably at least one selected from the group consisting of Al, Ga, and In, and still more preferably at least one selected from the group consisting of Al and Ga.

Specifically, the ε-iron oxide containing the additive is an ε-$Fe_{2-x}M_xO_3$ crystal (where M is a metal element except for iron, preferably a trivalent metal element, more preferably at least one selected from the group consisting of Al, Ga, and In, and still more preferably at least one selected from the group consisting of Al and Ga. x is, for example, $0 < x < 1$).

In a case where the magnetic particles are ε-iron oxide particles, the average particle size of the magnetic particles is preferably 10 nm or more and 20 nm or less, more preferably 10 nm or more and 18 nm or less, still more preferably 10 nm or more and 16 nm or less, particularly preferably 10 nm or more and 15 nm or less, and most preferably 10 nm or more and 14 nm or less. In the magnetic tape MT, a region having a size of ½ of a recording wavelength is an actual magnetized region. Thus, by setting the average particle size of the magnetic particles to half or less of the shortest recording wavelength, more excellent electromagnetic conversion characteristics (e.g., SNR) can be obtained. Therefore, when the average particle size of the magnetic particles is 20 nm or less, more excellent electromagnetic conversion characteristics (e.g., SNR) can be obtained in a magnetic tape MT with high recording density (e.g., a magnetic tape MT configured to be capable of recording a signal at the shortest recording wavelength of 40 nm or less). On the other hand, when the average particle size of the magnetic particles is 10 nm or more, the dispersibility of the magnetic particles is further improved, and more excellent electromagnetic conversion characteristics (e.g., SNR) can be obtained.

In the case where the magnetic particles are ε-iron oxide particles, the average aspect ratio of the magnetic particles is preferably 1.0 or more and 3.0 or less, more preferably 1.0 or more and 2.5 or less, still more preferably 1.0 or more and 2.1 or less, and particularly preferably 1.0 or more and 1.8 or less. When the average aspect ratio of the magnetic particles is in the range of 1.0 or more and 3.0 or less, the aggregation of the magnetic particles can be reduced. In addition, when the magnetic particles are perpendicularly oriented in the step of forming the magnetic layer 43, resistance applied to the magnetic particles can be reduced. Therefore, the perpendicular orientation of the magnetic particles can be improved.

In the case where the magnetic particles are ε-iron oxide particles, the average particle size and the average aspect ratio of the magnetic particles are obtained as follows. First, the magnetic tape MT accommodated in the cartridge 10 is unwound, and the magnetic tape MT is cut out at a position of 30 m to 40 m in the longitudinal direction from one outer peripheral end of the magnetic tape MT. Subsequently, the magnetic tape MT to be measured is processed into a thin piece by the focused ion beam (FIB) method or the like. In a case where the FIB method is used, a carbon layer and a tungsten layer are formed as protective layers as pretreatment for observing a TEM image of a cross section to be described later. The carbon layer is formed on the surface of the magnetic tape MT on the magnetic layer 43 side and the surface of the magnetic tape MT on the back layer 44 side by vapor deposition or sputtering, and then, the tungsten layer is further formed on the surface on the magnetic layer 43 side by vapor deposition or sputtering. The thinning is performed along the length direction (longitudinal direction) of the magnetic tape MT. That is, by the thinning, a cross section parallel to both the longitudinal direction and the thickness direction of the magnetic tape MT is formed.

Using a transmission electron microscope (H-9500 manufactured by Hitachi High-Tech Corporation), the above cross section of the obtained thinned sample is observed at an acceleration voltage of 200 kV and a total magnification of 500,000 times such that the entire magnetic layer 43 is included in the thickness direction of the magnetic layer 43, and a TEM image is captured. Next, 50 particles, the shapes of which can be clearly confirmed, are selected from the captured TEM image, and a long-axis length DL and a short-axis length DS of each particle are measured. Here, the long-axis length DL means the largest distance (so-called maximum Feret diameter) among distances between two parallel lines drawn from all angles so as to be in contact with the contour of each particle. On the other hand, the short-axis length DS means the maximum length of the particle in the direction orthogonal to the long axis (DL) of the particle. Subsequently, the measured long-axis lengths DL of the 50 particles are simply averaged (arithmetically averaged) to obtain an average long-axis length $DL_{ave}$. The average long-axis length $DL_{ave}$ thus obtained is taken as the average particle size of the magnetic particles. Further, the measured short-axis lengths DS of the 50 particles are simply averaged (arithmetically averaged) to obtain an average short-axis length $DS_{ave}$. Then, the average aspect ratio $(DL_{ave}/DS_{ave})$ of the particles is obtained from the average long-axis length $DL_{ave}$ and the average short-axis length $DS_{ave}$.

In the case where the magnetic particles are ε-iron oxide particles, the average particle volume of the magnetic particles is preferably 500 $nm^3$ or more and 4000 $nm^3$ or less, more preferably 500 $nm^3$ or more and 3000 $nm^3$ or less, still more preferably 500 $nm^3$ or more and 2000 $nm^3$ or less, particularly preferably 600 $nm^3$ or more and 1600 $nm^3$ or less, and most preferably 600 $nm^3$ or more and 1300 $nm^3$ or less. In general, since the noise of the magnetic tape MT is inversely proportional to the square root of the number of particles (i.e., proportional to the square root of the particle volume), further excellent electromagnetic conversion characteristics (e.g., SNR) can be obtained by reducing the particle volume. Thus, in a case where the average particle volume of the magnetic particles is 4000 $nm^3$ or less, more excellent electromagnetic conversion characteristics (e.g., SNR) can be obtained as in the case where the average particle size of the magnetic particles is 20 nm or less. On the other hand, when the average particle volume of the magnetic particles is 500 $nm^3$ or more, a similar effect to the case of setting the average particle size of the magnetic particles to 10 nm or more can be obtained.

In a case where the ε-iron oxide particles have a spherical shape, the average particle volume of the magnetic particles is obtained as follows. First, the average long-axis length $DL_{ave}$ is obtained in a similar manner to the method for calculating the average particle size of the magnetic particles described above. Next, the average volume V of the magnetic particles is obtained by the following equation.

$$V = (\pi/6) \times DL_{ave}^3$$

In a case where the ε-iron oxide particles have a cubic shape, the average volume of the magnetic particles is obtained as follows. First, the magnetic tape MT accommodated in the cartridge 10 is unwound, and the magnetic tape MT is cut out at a position of 30 m to 40 m in the longitudinal direction from one outer peripheral end of the magnetic tape MT. Subsequently, the cut-out magnetic tape MT is processed to be thinned by the focused ion beam (FIB) method or the like. In a case where the FIB method is used, a carbon film and a tungsten thin film are formed as protective films as pretreatment for observing a TEM image of a cross section to be described later. The carbon film is formed on the surface of the magnetic tape MT on the magnetic layer 43 side and the surface of the magnetic tape MT on the back layer 44 side by vapor deposition or sputtering, and then, the tungsten film is further formed on the surface on the magnetic layer 43 side by vapor deposition or sputtering. The thinning is performed along the length direction (longitudinal direction) of the magnetic tape MT. That is, by the thinning, a cross section parallel to both the longitudinal direction and the thickness direction of the magnetic tape MT is formed.

Using a transmission electron microscope (H-9500 manufactured by Hitachi High-Tech Corporation), the cross-section of the obtained thin sample is observed at an acceleration voltage of 200 kV and a total magnification of 500,000 times such that the entire magnetic layer 43 is included in the thickness direction of the magnetic layer 43, and a TEM image is obtained. Note that the magnification and the acceleration voltage may be appropriately adjusted in accordance with the type of the apparatus. Next, 50 particles, the shapes of which are clear, are selected from the captured TEM image, and a side length DC of each particle is measured. Subsequently, the measured side lengths DC of the 50 particles are simply averaged (arithmetically averaged) to obtain an average side length $DC_{ave}$.

Next, an average volume $V_{ave}$ (particle volume) of the magnetic particles is obtained from the following equation using the average side length $DC_{ave}$.

$$V_{ave}=DC_{ave}^3$$

(Cobalt Ferrite Particles)

The cobalt ferrite particles preferably have uniaxial crystal anisotropy. Due to the cobalt ferrite particles having uniaxial crystal anisotropy, the magnetic particles can be preferentially crystal-oriented in the perpendicular direction of the magnetic tape MT. The cobalt ferrite particles have, for example, a cubic shape. In the present specification, the cubic shape includes a substantially cubic shape. The Co-containing spinel ferrite may further contain at least one selected from the group consisting of Ni, Mn, Al, Cu, and Zn in addition to Co.

The Co-containing spinel ferrite has, for example, an average composition represented by the following formula.

$$Co_xM_yFe_2O_z$$

(where M is, for example, at least one metal selected from the group consisting of Ni, Mn, Al, Cu, and Zn. x is a value within a range of $0.4 \leq x \leq 1.0$. y is a value within a range of $0 \leq y \leq 0.3$. Here, x and y satisfy the relationship of $(x+y) \leq 1.0$. z is a value within a range of $3 \leq z \leq 4$. A part of Fe may be substituted with another metal element.)

In a case where the magnetic particles are cobalt ferrite particles, the average particle size of the magnetic particles is preferably 8 nm or more and 16 nm or less, more preferably 8 nm or more and 13 nm or less, and still more preferably 8 nm or more and 10 nm or less. When the average particle size of the magnetic particles is 16 nm or less, more excellent electromagnetic conversion characteristics (e.g., SNR) can be obtained in the magnetic tape MT having a high recording density. On the other hand, when the average particle size of the magnetic particles is 8 nm or more, the dispersibility of the magnetic particles is further improved, and more excellent electromagnetic conversion characteristics (e.g., SNR) can be obtained. The method for calculating the average particle size of the magnetic particles is similar to the method for calculating the average particle size of the magnetic particles in a case where the magnetic particles are ε-iron oxide particles.

In the case where the magnetic particles are cobalt ferrite particles, the average aspect ratio of the magnetic particles is preferably 1.0 or more and 3.0 or less, more preferably 1.0 or more and 2.5 or less, and still more preferably 1.0 or more and 2.0 or less. When the average aspect ratio of the magnetic particles is in the range of 1.0 or more and 3.0 or less, the aggregation of the magnetic particles can be reduced. In addition, when the magnetic particles are perpendicularly oriented in the step of forming the magnetic layer 43, resistance applied to the magnetic particles can be reduced. Therefore, the perpendicular orientation of the magnetic particles can be improved. The method for calculating the average aspect ratio of the magnetic particles is similar to the method for calculating the average aspect ratio of the magnetic particles in a case where the magnetic particles are ε-iron oxide particle powder.

In the case where the magnetic particles are cobalt ferrite particle powder, the average particle volume of the magnetic particles is preferably 500 $nm^3$ or more and 4000 $nm^3$ or less, more preferably 600 $nm^3$ or more and 2000 $nm^3$ or less, and still more preferably 600 $nm^3$ or more and 1000 $nm^3$ or less. When the average particle volume of the magnetic particles is 4000 $nm^3$ or less, a similar effect to a case where the average particle size of the magnetic particles is 16 nm or less can be obtained. On the other hand, when the average particle volume of the magnetic particles is 500 $nm^3$ or more, a similar effect to the case where the average particle size of the magnetic particles is 8 nm or more can be obtained. The method for calculating the average particle volume of the magnetic component is similar to the method for calculating the average particle volume in a case where the ε-iron oxide particles have a cubic shape.

(Binder)

The binder contains, for example, a thermoplastic resin. The binder may further contain a thermosetting resin, a reactive resin, or the like.

The thermoplastic resin includes a first thermoplastic resin containing a chlorine atom (first binder) and a second thermoplastic resin containing a nitrogen atom (second binder). More specifically, the thermoplastic resin includes a vinyl chloride-based resin and a urethane-based resin. In the present specification, the vinyl chloride-based resin means a polymer containing a structural unit derived from vinyl chloride. More specifically, for example, the vinyl chloride-based resin means a homopolymer of vinyl chloride, a polymer of vinyl chloride and a comonomer copolymerizable therewith, and a mixture of these polymers.

The vinyl chloride-based resin includes, for example, at least one selected from the group consisting of vinyl chloride, a vinyl chloride-vinyl acetate copolymer, a vinyl chloride-vinylidene chloride copolymer, a vinyl chloride-acrylonitrile copolymer, an acrylic acid ester-vinyl chloride-vinylidene chloride copolymer, and a methacrylic acid ester-vinyl chloride copolymer.

The urethane-based resin means a resin containing a urethane bond in at least a part of a molecular chain constituting the resin and may be a urethane resin or a copolymer containing a urethane bond in a part of a molecular chain. The urethane-based resin may be obtained, for example, by reacting a polyisocyanate with a polyol. Alternatively, the urethane-based resin may be obtained, for example, by reacting a polyester with a polyol. In the present specification, the urethane-based resin includes those obtained by reaction with a curing agent.

The polyisocyanate includes, for example, at least one selected from the group consisting of diphenylmethane diisocyanate (MDI), tolylene diisocyanate (TDI), xylylene diisocyanate (XDI), 1,5-pentamethylene diisocyanate (PDI), hexamethylene diisocyanate (HDI), isophorone diisocyanate (IPDI), and the like. In the present specification, the polyisocyanate means a compound having two or more isocyanate groups in the molecule. The polyisocyanate may be a polyisocyanate contained in the curing agent.

As the polyol, any suitable polyol can be adopted as long as it is a polyol having two or more OH groups. The polyol includes, for example, at least one selected from the group consisting of a polyol having two OH groups (diol), a polyol having three OH groups (triol), a polyol having four OH groups (tetraol), a polyol having five OH groups (pentaol), and a polyol having six OH groups (hexaol). Specifically, the polyol includes, for example, at least one selected from the group consisting of a polyester-based polyol, a polyether-based polyol, a polycarbonate-based polyol, a polyesteramide-based polyol, an acrylate-based polyol, and the like.

The polyester contains, for example, at least one selected from the group consisting of a phthalic acid-based polyester and an aliphatic polyester.

The thermoplastic resin may further contain a thermoplastic resin except for the vinyl chloride-based resin and the urethane-based resin. Such a thermoplastic resin includes, for example, at least one selected from the group consisting of vinyl acetate, an acrylic acid ester-acrylonitrile copolymer, an acrylic acid ester-acrylonitrile copolymer, an acrylic acid ester-vinylidene chloride copolymer, a methacrylic acid ester-vinylidene chloride copolymer, a methacrylic acid ester-ethylene copolymer, polyvinyl fluoride, a vinylidene chloride-acrylonitrile copolymer, an acrylonitrile-butadiene copolymer, a polyamide resin, polyvinyl butyral, a cellulose derivative (cellulose acetate butyrate, cellulose diacetate, cellulose triacetate, cellulose propionate, nitrocellulose), a styrene-butadiene copolymer, a polyester resin, an amino resin, a synthetic rubber, and the like.

The thermosetting resin includes, for example, at least one selected from the group consisting of a phenol resin, an epoxy resin, a polyurethane curable resin, a urea resin, a melamine resin, an alkyd resin, a silicone resin, a polyamine resin, a urea-formaldehyde resin, and the like.

For the purpose of improving the dispersibility of the magnetic particles, polar functional groups such as $-SO_3M$, $-OSO_3M$, $-COOM$, $P=O(OM)_2$ (where M represents a hydrogen atom or an alkali metal such as lithium, potassium, or sodium), a side chain type amine having an end group represented by $-NR1R2$, $-NR1R2R3^+X^-$, a main chain type amine represented by $>NR1R2^+X^-$ (where R1, R2, and R3 represent a hydrogen atom or a hydrocarbon group, and $X^-$ represents a halogen element ion such as fluorine, chlorine, bromine, or iodine, an inorganic ion, or an organic ion), $-OH$, $-SH$, $-CN$, and an epoxy group may be introduced into all the above binders. The amount of introduction of these polar functional groups into the binder is preferably $10^{-1}$ or more and $10^{-8}$ mol/g or less, and more preferably $10^{-2}$ or more and $10^{-6}$ mol/g or less.

(Conductive Particles)

Some of the conductive particles contained in the magnetic layer 43 may protrude from the magnetic surface to form a plurality of protrusions. The formation of the plurality of protrusions using conductive particles makes it possible to reduce the electric resistance of the magnetic surface and prevent the charging of the magnetic surface. Further, dynamic friction between the head unit 56 and the magnetic surface can be reduced when the magnetic tape MT runs.

The conductive particles are preferably antistatic agents and solid lubricants. The conductive particles are preferably particles containing carbon. As the carbon-containing particles, for example, at least one selected from the group consisting of carbon particles and hybrid particles can be used, and it is preferable to use carbon particles. The average primary particle size of the conductive particles is preferably 100 nm or less. When the average primary particle size of the conductive particles is 100 nm or less, the content of particles excessively large with respect to the thickness of the magnetic layer 43 is prevented even in a case where the conductive particles are particles having a large particle size distribution (e.g., carbon black, etc.).

As the carbon particles, for example, one or more selected from the group consisting of carbon black, acetylene black, Ketjen black, carbon nanotubes, and graphene can be used, and among these carbon particles, carbon black is preferably used. As the carbon black, for example, SEAST TA manufactured by Tokai Carbon Co., Ltd., Asahi #15 and #15HS manufactured by ASAHI CARBON CO., LTD., and the like can be used.

The hybrid particle contains carbon and a material except for carbon. The material except for carbon is, for example, an organic material or an inorganic material. The hybrid particle may be a hybrid particle in which carbon is attached to the surface of the inorganic particle. Specifically, for example, hybrid carbon in which carbon is attached to the surfaces of silica particles may be used.

(Abrasive Particles)

Some of the abrasive particles contained in the magnetic layer 43 may protrude from the magnetic surface to form a plurality of protrusions. At the time of sliding of the head unit 56 and the magnetic tape MT, the protrusions formed by the abrasive particles can come into contact with the head unit 56.

The lower limit of the Mohs scale of the abrasive particles is preferably 7.0 or more, more preferably 7.5 or more, still more preferably 8.0 or more, and particularly preferably 8.5 or more from the viewpoint of reducing deformation due to contact with the head unit 56. The upper limit of the Mohs scale of the abrasive particles is preferably 9.5 or less from the viewpoint of reducing the wear of the head unit 56.

The abrasive particles are preferably inorganic particles. Examples of the inorganic particles include α-alumina having a gelatinization rate of 90% or more, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, acicular α-iron oxide obtained by dehydrating and annealing a raw material of magnetic iron oxide, those obtained by surface-treating them with aluminum and/or silica as necessary, diamond powder, and the like. As the inorganic particles, alumina particles such as α-alumina, β-alumina, and, γ-alumina, and silicon carbide are preferably used. The abrasive particles may have any shape such as a needle shape, a spherical shape, or a dice shape, but those having corners in a part of the shape are preferable since having high lubricity.

(Lubricant)

The lubricant includes, for example, at least one selected from fatty acids and fatty acid esters, preferably both fatty acids and fatty acid esters. The fact that the magnetic layer 43 contains a lubricant, in particular, the fact that the magnetic layer 43 contains both a fatty acid and a fatty acid ester contributes to improvement in the running stability of the magnetic tape MT. More particularly, good running stability is achieved by the magnetic layer 43 containing a lubricant and having pores. The improvement in the running stability is considered to be because the coefficient of dynamic friction on the surface of the magnetic tape MT on the magnetic layer 43 side is adjusted to a value suitable for the running of the magnetic tape MT by the above lubricant.

The fatty acid may preferably be a compound represented by the following general formula (1) or (2). For example, one or both of the compound represented by the following general formula (1) and the compound represented by general formula (2) may be contained as the fatty acid.

Further, the fatty acid ester may preferably be a compound represented by the following general formula (3), (4), or (5). For example, one, two, or three of a compound represented by the following general formula (3), a compound represented by general formula (4), and a compound represented by general formula (5) may be contained as the fatty acid ester.

When the lubricant contains one or both of the compound represented by general formula (1) and the compound represented by general formula (2), and one, two, or three of the compounds represented by general formula (3), the compound represented by general formula (4), and the compound represented by general formula (5), an increase in the coefficient of dynamic friction due to repeated recording or playback of the magnetic tape MT can be reduced.

$$CH_3(CH_2)_kCOOH \tag{1}$$

(In general formula (1), k is an integer selected from a range of 14 or more and 22 or less, and more preferably a range of 14 or more and 18 or less.)

$$CH_3(CH_2)_nCH=CH(CH_2)_mCOOH \tag{2}$$

(In general formula (2), the sum of n and m is an integer selected from a range of 12 or more and 20 or less, and more preferably a range of 14 or more and 18 or less.)

$$CH_3(CH_2)_pCOO(CH_2)_qCH_3 \tag{3}$$

(In general formula (3), p is an integer selected from a range of 14 or more and 22 or less, more preferably a range of 14 or more and 18 or less, and q is an integer selected from a range of 2 or more and 5 or less, more preferably a range of 2 or more and 4 or less.)

$$CH_3(CH_2)_rCOO—(CH_2)_sCH(CH_3)_2 \tag{4}$$

(In general formula (4), r is an integer selected from a range of 14 or more and 22 or less, and s is an integer selected from a range of 1 or more and 3 or less.)

$$CH_3(CH_2)_tCOO—(CH)(CH_3)CH_2(CH_3)_u \tag{5}$$

(In general formula (5), t is an integer selected from a range of 14 or more and 22 or less, and u is an integer selected from a range of 1 or more and 3 or less.)

(Antistatic Agent)

The antistatic agent contains carbon particles. The antistatic agent may further contain at least one selected from the group consisting of a natural surfactant, a nonionic surfactant, a cationic surfactant, and the like. The carbon particles include, for example, at least one selected from the group consisting of carbon black, acetylene black, Ketjen black, carbon nanotubes, and graphene.

(Curing Agent)

The curing agent contains, for example, polyisocyanate, and the like. The polyisocyanate may contain, for example, diphenylmethane diisocyanate (MDI), tolylene diisocyanate (TDI), xylylene diisocyanate (XDI), 1,5-pentamethylene diisocyanate (PDI), hexamethylene diisocyanate (HDI), isophorone diisocyanate (IPDI), or the like as an isocyanate source. The polyisocyanate may have a trimethylolpropane (TMP) adduct structure, an isocyanurate structure, a biuret structure, an allophanate structure, or the like.

Specifically, the polyisocyanate includes, for example, aromatic polyisocyanates such as an adduct of tolylene diisocyanate (TDI) and an active hydrogen compound, aliphatic polyisocyanates such as an adduct of hexamethylene diisocyanate (HMDI) and an active hydrogen compound, and the like. The weight-average molecular weight of each of these polyisocyanates is desirably in a range of 100 or more and 3000 or less.

(Rust Inhibitor)

Examples of the rust inhibitor include phenols, naphthols, quinones, heterocyclic compounds containing a nitrogen atom, heterocyclic compounds containing an oxygen atom, heterocyclic compounds containing a sulfur atom, and the like.

(Nonmagnetic Reinforcing Particles)

Examples of the nonmagnetic reinforcing particles include aluminum oxide (α, β, or γ-alumina), chromium oxide, silicon oxide, diamond, garnet, emery, boron nitride, titanium carbide, silicon carbide, titanium carbide, titanium oxide (rutile type or anatase type titanium oxide), and the like.

(Underlayer)

The underlayer 42 relaxes the uneven shape of the surface of the substrate 41 and adjusts the uneven shape of the magnetic surface. The underlayer 42 is a nonmagnetic layer containing nonmagnetic particles, a binder, and a lubricant. The underlayer 42 supplies a lubricant to the magnetic surface. The underlayer 42 may further contain at least one additive selected from the group consisting of an antistatic agent, a curing agent, a rust inhibitor, and the like, as necessary.

An average thickness $t_2$ of the underlayer 42 is preferably 300 nm or more and 1200 nm or less, more preferably 300 nm or more and 900 nm or less, and 300 nm or more and 600 nm or less. Note that the average thickness $t_2$ of the underlayer 42 is obtained in a similar manner to the average thickness $t_1$ of the magnetic layer 43. However, the magnification of the TEM image is appropriately adjusted in accordance with the thickness of the underlayer 42. When the average thickness $t_2$ of the underlayer 42 is 1200 nm or less, the stretchability of the magnetic tape MT due to an external force is further enhanced, so that the adjustment of the width of the magnetic tape MT by tension adjustment is further facilitated.

The underlayer 42 preferably has a plurality of holes. The lubricant is stored in the plurality of holes, whereby it is possible to further reduce a decrease in the amount of lubricant supplied between the magnetic surface and the head unit 56 even after repeated recording or playback (i.e., even after contact of the head unit 56 with the surface of the magnetic tape MT and repeated running). Hence it is possible to further reduce an increase in the coefficient of dynamic friction. That is, more excellent running stability can be obtained.
(Nonmagnetic Particles)

The nonmagnetic particles include, for example, at least one of inorganic particles or organic particles. Further, the nonmagnetic particles may be carbon particles such as carbon black. Note that one kind of nonmagnetic particles may be used alone, or two or more kinds of nonmagnetic particles may be used in combination. The inorganic particles include, for example, a metal, a metal oxide, a metal carbonate, a metal sulfate, a metal nitride, a metal carbide, a metal sulfide, or the like. Examples of the shape of the nonmagnetic particle include various shapes such as a needle shape, a spherical shape, a cubic shape, and a plate shape, but are not limited to these shapes.
(Binder, Lubricant)

The binder and the lubricant are similar to those of the magnetic layer 43 described above.
(Additive)

The antistatic agent, the curing agent, and the rust inhibitor are similar to those of the magnetic layer 43 described above.
(Back Layer)

The back layer 44 contains a binder and nonmagnetic particles. The back layer 44 may further contain at least one additive selected from the group consisting of a lubricant, a curing agent, an antistatic agent, and the like, as necessary. The binder and the nonmagnetic particles are similar to those of the underlayer 42 described above. The curing agent and the antistatic agent are similar to those of the magnetic layer 43 described above.

The average particle size of the nonmagnetic particles is preferably 10 nm or more and 150 nm or less, and more preferably 15 nm or more and 110 nm or less. The average particle size of the nonmagnetic particles is obtained in a similar manner to the average particle size of the magnetic particles described above. The nonmagnetic particles may include nonmagnetic particles having two or more particle size distributions.

The upper limit of the average thickness of the back layer 44 is preferably 0.60 μm or less. When the upper limit of the average thickness of the back layer 44 is 0.60 μm or less, even in a case where the average thickness of the magnetic tape MT is 5.30 μm or less, the thicknesses of the underlayer 42 and the substrate 41 can be kept thick, so that the running stability of the magnetic tape MT in the recording and reproduction apparatus can be maintained. The lower limit of the average thickness of the back layer 44 is not particularly limited, but is, for example, 0.20 μm or more.

The average thickness $t_b$ of the back layer 44 is obtained as follows. First, the average thickness $t_T$ of the magnetic tape MT is measured. A method for measuring the average thickness $t_T$ is as described in "Average thickness of magnetic tape" below. Subsequently, the magnetic tape MT accommodated in the cartridge 10 is unwound, and the magnetic tape MT is cut out to a length of 250 mm at a position of 30 m to 40 m in the longitudinal direction from one outer peripheral end of the magnetic tape MT to prepare a sample. Next, the back layer 44 of the sample is removed with a solvent such as methyl ethyl ketone (MEK), dilute hydrochloric acid, or the like. Next, the thickness of the sample is measured at five positions using Laser Hologage (LGH-110C) manufactured by Mitutoyo Corporation, and the measured values are simply averaged (arithmetically averaged) to calculate an average value $t_B$ [μm]. Thereafter, the average thickness $t_b$ [μm] of the back layer 44 is obtained by the following equation. Note that the five measurement positions described above are randomly selected from the sample so as to be different positions in the longitudinal direction of the magnetic tape MT.

$$t_b[\mu m] = t_T[\mu m] - t_B[\mu m]$$

(Average Thickness of Magnetic Tape)

The upper limit of the average thickness (average total thickness) $t_T$ of the magnetic tape MT is preferably 5.30 μm or less, more preferably 5.10 μm or less, still more preferably 4.90 μm or less, and particularly preferably 4.70 μm or less. When the average thickness $t_T$ of the magnetic tape MT is 5.30 μm or less, the recording capacity that can be recorded in one data cartridge can be increased as compared with a general magnetic tape. The lower limit of the average thickness $t_T$ of the magnetic tape MT is not particularly limited, but is, for example, 3.50 μm or more.

The average thickness $t_T$ of the magnetic tape MT is obtained as follows. First, the magnetic tape MT accommodated in the cartridge 10 is unwound, and the magnetic tape MT is cut out to a length of 250 mm at a position of 30 m to 40 m in the longitudinal direction from one outer peripheral end of the magnetic tape MT to prepare a sample. Next, the thickness of the sample is measured at five positions using Laser Hologage (LGH-110C) manufactured by Mitutoyo Corporation as a measuring apparatus, and the measured values are simply averaged (arithmetically averaged) to calculate the average thickness $t_T$ [μm]. Note that the five measurement positions described above are randomly selected from the sample so as to be different positions in the longitudinal direction of the magnetic tape MT.
(Coercivity Hc2)

The upper limit of the coercivity Hc2 of the magnetic layer 43 in the longitudinal direction of the magnetic tape MT is preferably 2000 Oe or less, more preferably 1900 Oe or less, and still more preferably 1800 Oe or less. When the coercivity Hc2 of the magnetic layer 43 in the longitudinal direction of the magnetic tape MT is 2000 Oe or less, sufficient electromagnetic conversion characteristics can be achieved even at a high recording density.

The lower limit of the coercivity Hc2 of the magnetic layer 43 measured in the longitudinal direction of the magnetic tape MT is preferably 1000 Oe or more. When the coercivity Hc2 of the magnetic layer 43 measured in the longitudinal direction of the magnetic tape MT is 1000 Oe or more, demagnetization due to leakage flux from the recording head can be reduced.

The above coercivity Hc2 is obtained as follows. First, the magnetic tape MT accommodated in the cartridge 10 is unwound, and the magnetic tape MT is cut out at a position of 30 m to 40 m in the longitudinal direction from one outer peripheral end of the magnetic tape MT. Three sheets of the magnetic tape MT are stacked with a double-sided tape such that the longitudinal directions of the magnetic tape MT are the same, and then punched out with a punch of φ 6.39 mm to prepare a measurement sample. At this time, marking is performed with an arbitrary ink having no magnetism so that the longitudinal direction (running direction) of the magnetic tape MT can be recognized. Then, the M-H loop of the measurement sample (the entire magnetic tape MT) corresponding to the longitudinal direction (running direction) of the magnetic tape MT is measured using a vibrating sample magnetometer (VSM). Next, the coating film (underlayer 42, magnetic layer 43, back layer 44, etc.) of the magnetic tape MT cut out as described above is wiped off using acetone, ethanol, or the like, leaving only the substrate 41. Then, three substrates 41 obtained are stacked with a double-sided tape, and then punched out with a φ 6.39 mm punch to prepare a sample for background correction (hereinafter simply "correction sample"). Thereafter, the M-H loop of the correction sample (substrate 41) corresponding to the longitudinal direction of the substrate 41 (the longitudinal direction of the magnetic tape MT) is measured using the VSM.

In the measurement of the M-H loop of the measurement sample (the entire magnetic tape MT) and the M-H loop of the correction sample (substrate 41), a highly sensitive vibrating sample magnetometer "VSM-P7-15 type" manufactured by TOEI INDUSTRY CO., LTD. is used. The measurement conditions are as follows: a measurement mode is Full Loop, the maximum magnetic field is 15 kOe, a magnetic field step is 40 bits, a time constant of Locking Amp is 0.3 sec, a waiting time is 1 sec, and an MH average number is 20.

After the M-H loop of the measurement sample (the entire magnetic tape MT) and the M-H loop of the correction sample (substrate 41) are obtained, the M-H loop of the correction sample (substrate 41) is subtracted from the M-H loop of the measurement sample (the entire magnetic tape MT) to perform background correction, and an M-H loop after background correction is obtained. For the calculation of the background correction, a measurement and analysis program attached to "VSM-P7-15 type" is used. The coercivity Hc2 is obtained from the obtained background-corrected M-H loop. Note that for this calculation, a measurement and analysis program attached to "VSM-P7-15 type" is used. Note that the above M-H loops is measured at 25° C.±2° C. and 50% RH±5% RH. Further, "demagnetizing field correction" at the time of measuring the M-H loop in the longitudinal direction of the magnetic tape MT is not performed.

(Squareness Ratio)

A squareness ratio S1 of the magnetic layer 43 in the perpendicular direction of the magnetic tape MT is preferably 62% or more, more preferably 65% or more, still more preferably 68% or more, particularly preferably 72% or more, and most preferably 75% or more. When the squareness ratio S1 is 62% or more, the perpendicular orientation of the magnetic particles is sufficiently high, so that more excellent electromagnetic conversion characteristics can be obtained.

The squareness ratio S1 of the magnetic tape MT in the perpendicular direction is obtained as follows. First, the magnetic tape MT accommodated in the cartridge 10 is unwound, and the magnetic tape MT is cut out at a position of 30 m to 40 m in the longitudinal direction from one outer peripheral end of the magnetic tape MT. Three sheets of the magnetic tape MT are stacked with a double-sided tape such that the longitudinal directions of the magnetic tape MT are the same, and then punched out with a punch of φ 6.39 mm to prepare a measurement sample. At this time, marking is performed with an arbitrary ink having no magnetism so that the longitudinal direction (running direction) of the magnetic tape MT can be recognized. Then, the M-H loop of the measurement sample (the entire magnetic tape MT) corresponding to the perpendicular direction of the magnetic tape MT (the perpendicular direction of the magnetic tape MT) is measured using a vibrating sample magnetometer (VSM). Next, the coating film (underlayer 42, magnetic layer 43, back layer 44, etc.) of the magnetic tape MT cut out as described above is wiped off using acetone, ethanol, or the like, leaving only the substrate 41. Then, three substrates 41 obtained are stacked with a double-sided tape, and then punched out with a φ 6.39 mm punch to prepare a sample for background correction (hereinafter simply "correction sample"). Thereafter, the M-H loop of the correction sample (substrate 41) corresponding to the perpendicular direction of the substrate 41 (the perpendicular direction of the magnetic tape MT) is measured using the VSM.

In the measurement of the M-H loop of the measurement sample (the entire magnetic tape MT) and the M-H loop of the correction sample (substrate 41), a highly sensitive vibrating sample magnetometer "VSM-P7-15 type" manufactured by TOEI INDUSTRY CO., LTD. is used. The measurement conditions are as follows: a measurement mode is Full Loop, the maximum magnetic field is 15 kOe, a magnetic field step is 40 bits, a time constant of Locking Amp is 0.3 sec, a waiting time is 1 sec, and an MH average number is 20.

After the M-H loop of the measurement sample (the entire magnetic tape MT) and the M-H loop of the correction sample (substrate 41) are obtained, the M-H loop of the correction sample (substrate 41) is subtracted from the M-H loop of the measurement sample (the entire magnetic tape MT) to perform background correction, and an M-H loop after background correction is obtained. For the calculation of the background correction, a measurement and analysis program attached to "VSM-P7-15 type" is used.

A saturation magnetization Ms (emu) and residual magnetization Mr (emu) of the obtained background-corrected M-H loop are substituted into the following equation to calculate the squareness ratio S1(%). Note that the above M-H loops is measured at 25° C.±2° C. and 50% RH±5% RH. Further, "demagnetizing field correction" at the time of measuring the M-H loop in the perpendicular direction of the magnetic tape MT is not performed. Note that for this calculation, a measurement and analysis program attached to "VSM-P7-15 type" is used.

$$\text{Squareness ratio } S1(\%) = (Mr/Ms) \times 100$$

A squareness ratio S2 of the magnetic layer 43 in the longitudinal direction (running direction) of the magnetic tape MT is preferably 35% or less, more preferably 30% or less, still more preferably 25% or less, particularly preferably 20% or less, and most preferably 15% or less. When the squareness ratio S2 is 35% or less, the perpendicular orientation of the magnetic particles is sufficiently high, so that more excellent electromagnetic conversion characteristics can be obtained. Note that one of the squareness ratio S1 of the magnetic layer 43 in the perpendicular direction of the magnetic tape MT and the squareness ratio S2 of the magnetic layer 43 in the longitudinal direction (running direction) of the magnetic tape MT may be within the above preferable range, and the other may be out of the above preferable range. Alternatively, both the squareness ratio S1 of the magnetic layer 43 in the perpendicular direction of the magnetic tape MT and the squareness ratio S2 of the magnetic layer 43 in the longitudinal direction (running direction) of the magnetic tape MT may be within the above preferable ranges.

The squareness ratio S2 of the magnetic tape MT in the longitudinal direction is obtained in a similar manner to the squareness ratio S1 except that the M-H loop is measured in the longitudinal direction (running direction) of the magnetic tape MT and the substrate 41.

(Ratio Hc2/Hc1)

The ratio Hc2/Hc1 of the coercivity Hc1 of the magnetic layer 43 in the perpendicular direction of the magnetic tape MT to the coercivity Hc2 of the magnetic layer 43 in the longitudinal direction of the magnetic tape MT preferably satisfies a relationship of Hc2/Hc1≤0.8, more preferably Hc2/Hc1≤0.75, still more preferably Hc2/Hc1≤0.7, particularly preferably Hc2/Hc1≤0.65, and most preferably Hc2/Hc1≤0.6. When the coercivities Hc1, Hc2 satisfy the relationship of Hc2/Hc1≤0.8, the degree of perpendicular orientation of the magnetic particles can be increased. Therefore, the magnetization transition width can be reduced, and a high-output signal can be obtained at the time of signal reproduction, so that more excellent electromagnetic conversion characteristics can be obtained. Note that, as described above, when Hc2 is small, magnetization reacts with high sensitivity by the perpendicular magnetic field from the recording head, and hence a good recording pattern can be formed.

In a case where the ratio Hc2/Hc1 is Hc2/Hc1≤0.8, it is particularly effective that the average thickness $t_1$ of the magnetic layer 43 is 90 nm or less. When the average thickness $t_1$ of the magnetic layer 43 exceeds 90 nm, in a case where a ring-type head is used as a recording head, a lower region (a region on the underlayer 42 side) of the magnetic layer 43 is magnetized in the longitudinal direction of the magnetic tape MT, and there is a possibility that the magnetic layer 43 may not be uniformly magnetized in the thickness direction. Thus, even when the ratio Hc2/Hc1 is set to Hc2/Hc1≤0.8 (i.e., even when the degree of perpendicular orientation of the magnetic particles is increased), there is a possibility that more excellent electromagnetic conversion characteristics may not be obtained.

The lower limit of Hc2/Hc1 is not particularly limited, but is, for example, 0.5≤Hc2/Hc1. Note that Hc2/Hc1 represents the degree of perpendicular orientation of the magnetic particles, and the smaller Hc2/Hc1, the higher the degree of perpendicular orientation of the magnetic particles.

The method for calculating the coercivity Hc2 of the magnetic layer 43 in the longitudinal direction of the magnetic tape MT is as described above. The coercivity Hc1 of the magnetic layer 43 in the perpendicular direction of the magnetic tape MT is obtained in a similar manner to the coercivity Hc2 of the magnetic layer 43 in the longitudinal direction of the magnetic tape MT except that the M-H loop is measured in the perpendicular direction (thickness direction) of the magnetic tape MT and the substrate 41.

(Activation Volume $V_{act}$)

An activation volume $V_{act}$ is preferably 8000 $nm^3$ or less, more preferably 6000 $nm^3$ or less, still more preferably 5000 $nm^3$ or less, particularly preferably 4000 $nm^3$ or less, and most preferably 3000 $nm^3$ or less. When the activation volume $V_{act}$ is 8000 $nm^3$ or less, the dispersion state of the magnetic particles is favorable, so that it is possible to make the bit inversion region steep and to reduce the deterioration of the magnetization signal recorded in the adjacent track due to the leakage field from the recording head. Therefore, further excellent electromagnetic conversion characteristics may not be obtained.

The above activation volume $V_{act}$ is obtained by the following equation derived by Street and Woolley.

$$V_{act}(nm^3) = k_B \times T \times X_{irr}/(\mu_0 \times Ms \times S)$$

(where $k_B$ is a Boltzmann constant $(1.38 \times 10^{-23}$ J/K), T is a temperature (K), $X_{irr}$ is an irreversible magnetic susceptibility, $\mu_0$ is a vacuum magnetic permeability, S is a magnetic viscosity coefficient, and Ms is a saturation magnetization $(emu/cm^3)$)

The irreversible magnetic susceptibility $X_{irr}$, the saturation magnetization Ms, and the magnetic viscosity coefficient S substituted into the above equation are obtained as follows using the VSM. Note that the measurement direction by the VSM is the perpendicular direction (thickness direction) of the magnetic tape MT. In addition, the measurement by the VSM is performed at 25° C.±2° C. and 50% RH±5% RH on the measurement sample cut out from the long magnetic tape MT. Further, "demagnetizing field correction" at the time of measuring the M-H loop in the perpendicular direction (thickness direction) of the magnetic tape MT is not performed.

(Irreversible Magnetic Susceptibility $X_{irr}$)

The irreversible magnetic susceptibility $X_{irr}$ is defined as an inclination near a residual coercivity Hr in the inclination of the residual magnetization curve (DCD curve). First, a magnetic field of −1193 kA/m (15 kOe) is applied to the entire magnetic tape MT, and the magnetic field is returned to zero to form a residual magnetization state. Then, a magnetic field of about 15.9 kA/m (200 Oe) is applied in the opposite direction and returned to zero again, and a residual magnetization amount is measured. Thereafter, similarly, the measurement in which a magnetic field 15.9 kA/m larger than the previously applied magnetic field is applied and returned to zero is repeated, and a residual magnetization amount is plotted with respect to the applied magnetic field to measure a DCD curve. From the obtained DCD curve, a point at which the magnetization amount becomes zero is defined as the residual coercivity Hr, the DCD curve is further differentiated, and the inclination of the DCD curve in each magnetic field is obtained. In the inclination of the DCD curve, the inclination near the residual coercivity Hr is $X_{irr}$.

(Saturation Magnetization Ms)

First, an M-H loop after background correction is obtained in a similar manner to the method for measuring the squareness ratio S1 described above. Next, Ms $(emu/cm^3)$ is calculated from the value of the saturation magnetization Ms (emu) of the obtained M-H loop and the volume $(cm^3)$ of the magnetic layer 43 in the measurement sample. Note that the volume of the magnetic layer 43 is obtained by multiplying the area of the measurement sample by the average thickness $t_1$ of the magnetic layer 43. The method for calculating the average thickness $t_1$ of the magnetic layer 43 necessary for calculating the volume of the magnetic layer 43 is as described above.

(Magnetic Viscosity Coefficient S)

First, a magnetic field of −1193 kA/m (15 kOe) is applied to the entire magnetic tape MT (measurement sample), and the magnetic field is returned to zero to obtain a residual magnetization state. Thereafter, a magnetic field equivalent to the value of the residual coercivity Hr obtained from the DCD curve is applied in the opposite direction. The magnetization amount is continuously measured at regular time intervals for 1000 seconds in a state where the magnetic field is applied. The magnetic viscosity coefficient S is calculated by comparing the relationship between the time t and the magnetization amount M(t) thus obtained with the following equation.

$$M(t) = M0 + S \times \ln(t)$$

(where M(t) is a magnetization amount at time t, M0 is an initial magnetization amount, S is a magnetic viscosity coefficient, and ln(t) is a natural logarithm of time)
(Surface Roughness $R_b$ of Back Surface)

A surface roughness $R_b$ of the back surface (a surface roughness of the back layer 44) preferably meets $R_b \leq 6.0$ [nm]. When the surface roughness $R_b$ of the back surface is in the above range, more excellent electromagnetic conversion characteristics can be obtained.

The surface roughness $R_b$ of the back surface is obtained as follows. First, the magnetic tape MT accommodated in the cartridge 10 is unwound, and the magnetic tape MT is cut out to a length of 100 mm at a position of 30 m to 40 m in the longitudinal direction from one outer peripheral end of the magnetic tape MT to manufacture a sample. Next, the sample is placed on a microscope slide such that the surface to be measured (the surface on the magnetic layer side) of the sample faces upward, and the end of the sample is fixed with a mending tape. The surface shape is measured using VertScan (objective lens 20 times) as a measuring apparatus, and the surface roughness $R_b$ of the back surface is obtained from the following equation on the basis of the standard of ISO 25178.

The measurement conditions are as follows.

Apparatus: non-contact roughness meter using optical interference (Non-contact surface/layer cross-sectional shape measurement system VertScan R5500GL-M100-AC manufactured by Ryoka Systems Inc.)

Objective lens: 20 times

Measurement region: 640×480 pixels (field of view: about 237 μm×178 μm field of view)

Measurement mode: phase

Wavelength filter: 520 nm

CCD: ⅓ inch

Noise removal filter: Smoothing 3×3

Surface correction: corrected by second-order polynomial approximation surface

Measurement software: VS-Measure Version 5.5.2

Analysis software: VS-viewer Version 5.5.5

< IMG SRC = "SYP348412WO01m002.gif" >     [Math. 2]

As described above, the surface roughness is measured at five positions in the longitudinal direction of the magnetic tape MT, and then the average value of arithmetic average roughnesses $S_a$ (nm) automatically calculated from the surface profiles obtained at the respective positions is taken as the surface roughness $R_b$(nm) of the back surface.
(Longitudinal Young's Modulus of Magnetic Tape)

The upper limit of the longitudinal Young's modulus of the magnetic tape MT is preferably 9.0 GPa or less, more preferably 8.0 GPa or less, still more preferably 7.5 GPa or less, and particularly preferably 7.1 GPa or less. When the longitudinal Young's modulus of the magnetic tape MT is 9.0 GPa or less, the stretchability of the magnetic tape MT due to an external force is further enhanced, so that the adjustment of the width of the magnetic tape MT by tension adjustment is further facilitated. Therefore, off-track can be more appropriately prevented, and data recorded on the magnetic tape MT can be more accurately reproduced. The lower limit of the longitudinal Young's modulus of the magnetic tape MT is preferably 3.0 GPa or more, and more preferably 4.0 GPa or more. When the lower limit of the longitudinal Young's modulus of the magnetic tape MT is 3.0 GPa or more, a decrease in running stability can be prevented.

The longitudinal Young's modulus of the magnetic tape MT is a value indicating difficulty in expansion and contraction of the magnetic tape MT in the longitudinal direction due to an external force. As this value is larger, the magnetic tape MT is less likely to expand and contract in the longitudinal direction due to an external force, and as this value is smaller, the magnetic tape MT is more likely to expand and contract in the longitudinal direction due to an external force.

Note that the longitudinal Young's modulus of the magnetic tape MT is a value related to the longitudinal direction of the magnetic tape MT, but is also correlated with difficulty in the expansion and contraction of the magnetic tape MT in the width direction. That is, as this value is larger, the magnetic tape MT is less likely to expand and contract in the width direction by external force, and as this value is smaller, the magnetic tape MT is more likely to expand and contract in the width direction by external force. Therefore, from the viewpoint of tension adjustment, it is advantageous that the longitudinal Young's modulus of the magnetic tape MT is small and is 9.0 GPa or less as described above.

A tensile tester (AG-100D manufactured by Shimadzu Corporation) is used to measure the Young's modulus. In a case where it is desired to measure the longitudinal Young's modulus of the tape, the magnetic tape MT accommodated in the cartridge 10 is unwound, and the magnetic tape MT is cut out at a position of 30 m to 40 m in the longitudinal direction from one outer peripheral end of the magnetic tape MT to a length of 180 mm to prepare a measurement sample. A jig capable of fixing the width (½ inch) of the tape is attached to the above tensile tester, and the upper and lower sides of the tape width are fixed. The distance (the length of the tape between the chucks) is set to 100 mm. After chucks are put on the tape sample, stress is gradually applied in the direction of pulling the sample. The pulling speed is 0.1 mm/min. From the change in stress and the amount of elongation at this time, the Young's modulus is calculated using the following equation.

$$E(N/m^2) = ((\Delta N/S)/(\Delta x/L)) \times 10^6$$

ΔN: Change in stress (N)

S: Cross-sectional area of test piece (mm²)

Δx: Elongation amount (mm)

L: Distance between gripping jigs (mm)

The cross-sectional area S of a measurement sample 10S described above is a cross-sectional area before the tensile operation and is obtained by the product of the width (½ inch) of the measurement sample 10S and the thickness of the measurement sample 10S. For the range of the tensile stress at the time of measurement, the range of the tensile stress in the linear region is set in accordance with the thickness of the magnetic tape MT or the like. Here, the range of the stress is set to 0.2 N to 0.7 N, and the stress change (ΔN) and the elongation amount (Δx) at this time are used for calculation. Note that the measurement of the Young's modulus described above is performed at 25° C.±2° C. and 50% RH±5% RH.

(Longitudinal Young's Modulus of Substrate)

The longitudinal Young's modulus of the substrate 41 is preferably 7.8 GPa or less, more preferably 7.0 GPa or less, still more preferably 6.6 GPa or less, and particularly preferably 6.4 GPa or less. When the longitudinal Young's modulus of the substrate 41 is 7.8 GPa or less, the stretchability of the magnetic tape MT due to an external force is further enhanced, so that the width of the magnetic tape MT can be more easily adjusted by tension adjustment. Therefore, off-track can be more appropriately prevented, and data recorded on the magnetic tape MT can be more accurately reproduced. The lower limit of the longitudinal Young's modulus of the substrate 41 is preferably 2.5 GPa or more, and more preferably 3.0 GPa or more. When the lower limit of the longitudinal Young's modulus of the substrate 41 is 2.5 GPa or more, deterioration of running stability can be prevented.

The longitudinal Young's modulus of the substrate 41 described above is obtained as follows. First, the magnetic tape MT accommodated in the cartridge 10 is unwound, and the magnetic tape MT is cut out to a length of 180 mm at a position of 30 m to 40 m in the longitudinal direction from one outer peripheral end of the magnetic tape MT. Subsequently, the underlayer 42, the magnetic layer 43, and the back layer 44 are removed from the cut magnetic tape MT to obtain the substrate 41. Using the substrate 41, the longitudinal Young's modulus of the substrate 41 described above is obtained in a similar procedure to the longitudinal Young's modulus of the magnetic tape MT.

The thickness of the substrate 41 accounts for half or more of the entire thickness of the magnetic tape MT. Thus, the longitudinal Young's modulus of the substrate 41 is correlated with difficulty in the expansion and contraction of the magnetic tape MT due to an external force. As this value is larger, the magnetic tape MT is less likely to expand and contract in the width direction due to an external force, and as this value is smaller, the magnetic tape MT is more likely to expand and contract in the width direction due to an external force.

Note that the longitudinal Young's modulus of the substrate 41 is a value related to the longitudinal direction of the magnetic tape MT, but is also correlated with difficulty in expansion and contraction of the magnetic tape MT in the width direction. That is, as this value is larger, the magnetic tape MT is less likely to expand and contract in the width direction by external force, and as this value is smaller, the magnetic tape MT is more likely to expand and contract in the width direction by external force. Therefore, from the viewpoint of tension adjustment, it is advantageous that the longitudinal Young's modulus of the substrate 41 is small and is 7.8 GPa or less as described above.

(Average Creep Slope Ratio $(A_2/A_1)$)

An average creep slope ratio $(A_2/A_1)$ of an average creep slope $A_2$ measured in an environment at a temperature of 32° C. and a humidity of 80% RH to an average creep slope $A_1$ measured in an environment at a temperature of 32° C. and a humidity of 20% RH is 1.440 or less, preferably 1.400 or less, and more preferably 1.300 or less. When the average creep slope ratio $(A_2/A_1)$ exceeds 1.440, the substrate 41 easily absorbs moisture, and the humidity dependency of the creep slope increases. Hence the dimensional stability of the magnetic tape MT decreases in response to a humidity change. In addition, the dimensional stability of the magnetic tape MT against a temperature change in an environment at a humidity of 80% RH decreases. Note that the humidity 20% RH and the humidity 80% RH respectively correspond to the minimum value and the maximum value of the humidity of the guaranteed environment in the general storage tape system.

The average creep slope $A_1$ is an average value of the creep slopes of the plurality of first samples taken out from the magnetic tape MT. The creep slope of each first sample is obtained by performing a creep test on the first sample in the environment at a temperature of 32° C. and a humidity of 20% RH, acquiring a graph (cf. FIGS. 10A and 10B) with time on the horizontal axis and strain on the vertical axis, changing the horizontal axis of the graph to a logarithmic representation (cf. FIGS. 10B and 10C), performing logarithmic approximation of data in the graph after the change, and obtaining a slope of an approximate straight line (cf. FIG. 10C).

The average creep slope $A_2$ is an average value of the creep slopes of the plurality of second samples taken out from the magnetic tape MT. The creep slope of each second sample is obtained by performing a creep test on the second sample in the environment at a temperature of 32° C. and a humidity of 80% RH, acquiring a graph (cf. FIGS. 10A and 10B) with time on the horizontal axis and strain on the vertical axis, changing the horizontal axis of the graph to a logarithmic representation (cf. FIGS. 10B and 10C), performing logarithmic approximation of data in the graph after the change, and obtaining a slope of an approximate straight line (cf. FIG. 10C).

Specifically, the average creep slope ratio $(A_2/A_1)$ is measured as follows.

(Preparation of Sample)

First, the magnetic tape MT having a width of ½ inch (12.65 mm) accommodated in the cartridge 10 is unwound, and the magnetic tape MT is punched out by a punching machine from each of a position of 10 m to 20 m, a position of 30 m to 40 m, and a position of 50 m to 60 m in the longitudinal direction from one outer peripheral end of the magnetic tape MT. As a result, three rectangular samples with a width of 4 mm in the tape width direction and a length of 10 mm in the tape longitudinal direction are obtained. Next, a creep test is performed on these three samples as follows.

(Creep Test in Environment at Temperature of 32° C. and Humidity of 20% RH)

First, both longitudinal ends of the sample are clamped by a measurement part of a dynamic viscoelasticity measuring apparatus (RSAII, manufactured by TA Instruments). Subsequently, the temperature and humidity in a measurement chamber are controlled, and the sample is allowed to stand for at least 60 minutes or more until the temperature and humidity in the measurement chamber stabilize. Then, after it is confirmed that the dimensions of the sample are stable, a creep test is performed.

The measurement conditions for the creep test are as follows.

Measurement sample size: 4 mm×10 mm

Sampling: 1 s/point

Control

Temperature control PID: P=10, I=125, D=1

SS control PID: P=0.5, I=30, D=10

Hold temperature control PID: P=9, I=250, D=1

SS control: F-assembly

SS Program (Load)

TABLE 1

<img src="SYP348412WO01t001.gif">

Initial: 0.02 N/4 mm (corresponding to 0.06 N/12.65 mm)
Maximum load: 0.19569 N/4 mm (corresponding to 0.6 N/12.65 mm)
Acceleration: 19.613 mN/min
Temperature and Humidity Control
Temperature: 32° C.
Humidity: 20% RH
Bubbling temperature: 6.24° C.
Note that the bubbling temperature is a set value serving as a guide for adjusting the temperature and humidity of the measurement environment. In the case of the above setting, the temperature and humidity of the measurement environment are roughly adjusted by setting the temperature and humidity to 6.24° C., and thus, fine adjustment is then performed to adjust the temperature and humidity to the actual measurement environment.
(Creep Test in Environment at Temperature of 32° C. and Humidity of 80% RH)

Next, the temperature and humidity in the measurement chamber are controlled as follows, and the sample is allowed to stand for at least 60 minutes or more until the temperature and humidity stabilize. Then, after it is confirmed that the dimensions of the sample are stable, a creep test is performed.
Temperature and Humidity Control
Temperature: 32° C.
Humidity: 80% RH
Bubbling temperature: 28.11° C.

Note that the measurement conditions for the present creep test are similar to those for the creep test in the environment at a temperature of 32° C. and a humidity of 20% RH with respect to conditions except for the temperature and humidity control described above. In addition, the bubbling temperature is a set value serving as a guide for adjusting the temperature and humidity of the measurement environment as described above. The temperature and humidity of the measurement environment are roughly adjusted by setting the bubbling temperature to 28.11° C., and thus, fine adjustment is then performed to adjust the bubbling temperature to the actual measurement environment.
(Calculation of Average Creep Slope Ratio $(A_2/A_1)$)

Figure 10A:
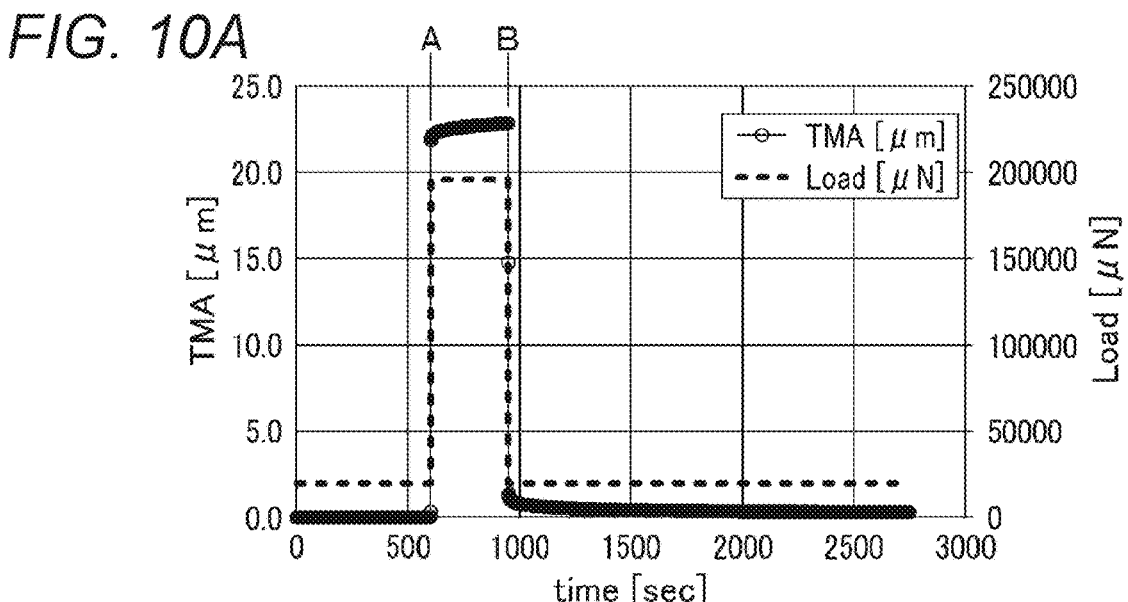
FIG. 10A is a graph illustrating an example of a load of a creep test and a creep curve obtained by the load.
Figure 10B:
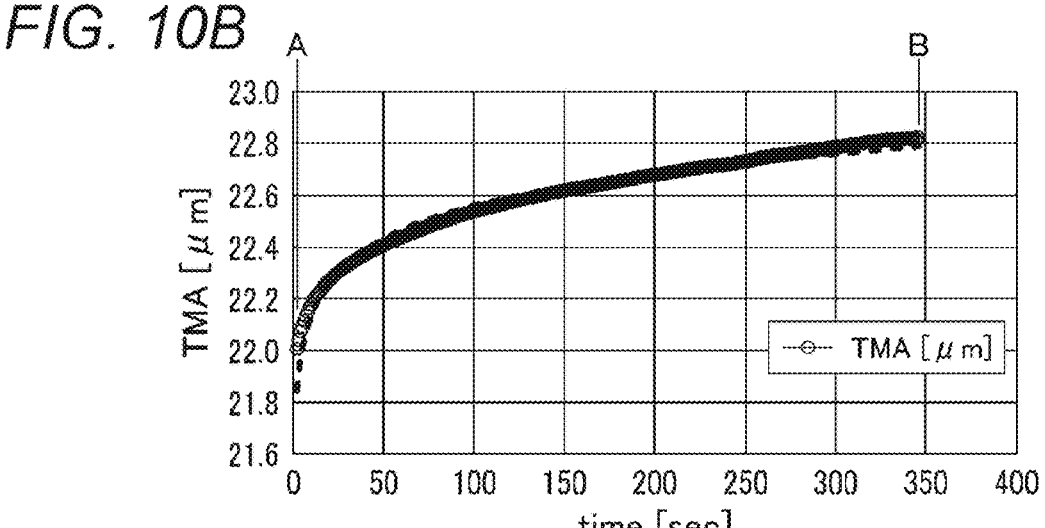
FIG. 10B is an enlarged graph illustrating the creep curve of FIG. 10A.

Next, a graph with time on the horizontal axis and strain on the vertical axis is acquired by each of the above creep test in the environment at a temperature of 32° C. and a humidity of 20% RH and the creep test in the environment at a temperature of 32° C. and a humidity of 80% RH (cf. FIGS. 10A and 10B). In the acquired graph (cf. FIG. 10A), a portion where elongation gradually occurs in a state where constant stress (load) is applied (raised portion of the graph) is referred to as a creep curve. In FIGS. 10A and 10B, point A indicates a position where the load reached the set value (maximum load), and point B indicates a position where the load of the set load (maximum load) was stopped. Note that the horizontal axis in FIG. 10B is represented by time with point A in FIG. 10A as a reference (0 [sec]).

Figure 10C:
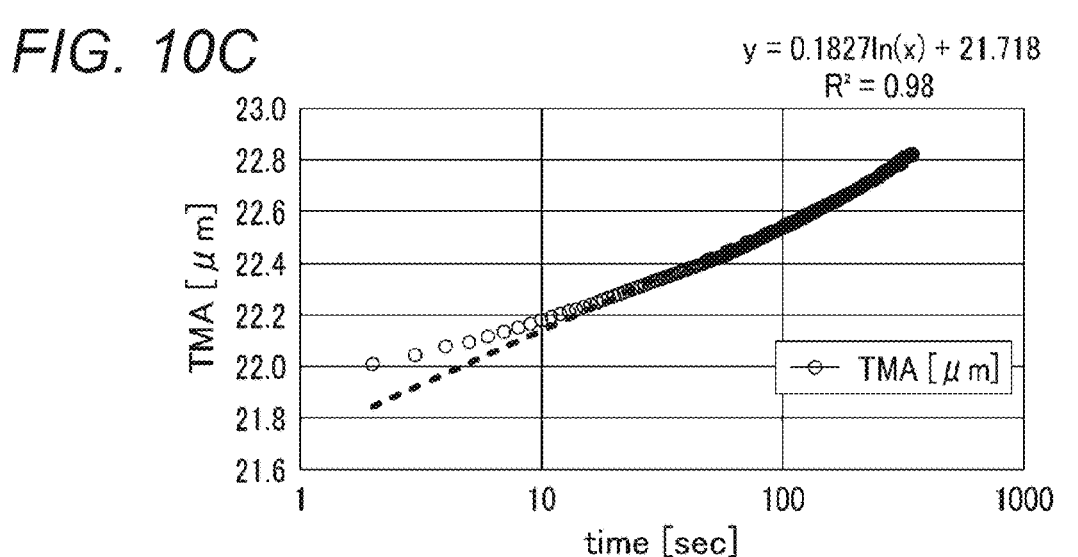
FIG. 10C is a graph in which the horizontal axis (time axis) of FIG. 10B has been changed to a logarithmic representation.

Next, the horizontal axis (time axis) of the graph acquired by the above creep test at a temperature of 32° C. and a humidity of 20% RH is changed to a logarithmic representation, an approximate straight line is obtained from the graph after the change by logarithmic approximation, and the slope of the approximate straight line is defined as a "creep slope $a_1$" (cf. FIGS. 10B and 10C). For the calculation of the approximate straight line, the "Add approximate curve" function of Excel (registered trademark) of Microsoft (registered trademark) is used. Note that the version of Microsoft (registered trademark) Excel (registered trademark) described above is Microsoft (registered trademark) Excel (registered trademark) for Microsoft 365 MSO. In addition, data between point A and point B is used to calculate the approximate straight line. Similarly, the horizontal axis (time axis) of the graph acquired by the above creep test at a temperature of 32° C. and a humidity of 80% RH is changed to a logarithmic representation, the data in the graph after the change is subjected to logarithmic approximation to obtain an approximate straight line, and the slope of the approximate straight line is referred to as a "creep slope $a_2$".

Next, three creep slopes $a_1$ in total obtained from the three samples are simply averaged (arithmetically averaged) to calculate an average creep slope $A_1$. Similarly, the three creep slopes $a_2$ in total obtained from the three samples are simply averaged (arithmetically averaged) to calculate the average creep slope $A_2$. Next, the ratio $(A_2/A_1)$ of the average creep slope $A_2$ to the average creep slope $A_1$ is obtained and set as the average creep slope ratio $(A_2/A_1)$.
(Average Tan δ Ratio (Average Tan $\delta_2$/Average Tan $\delta_1$)

An average Tan δ ratio (average Tan $\delta_2$/average Tan $\delta_1$) between an average Tan $\delta_1$ measured in the environment at a temperature of 32° C. and a humidity of 20% RH and an average Tan $\delta_2$ measured in the environment at a temperature of 32° C. and a humidity of 80% RH is 1.2000 or less, preferably 1.1900 or less, and more preferably 1.1800 or less. When the average Tan δ ratio (average Tan $\delta_2$/average Tan $\delta_1$) exceeds 1.2000, the humidity dependence of Tan δ of the magnetic tape MT increases. Thus, the elasticity of the magnetic tape MT is lost or the viscosity of the magnetic tape MT increases in response to a humidity change. That is, the increased humidity dependence leads to a change in the viscoelasticity of the magnetic tape MT. Hence the dimensional stability of the magnetic tape MT decreases in response to a humidity change. In addition, the dimensional stability of the magnetic tape MT against a temperature change in an environment at a humidity of 80% RH decreases.

The average Tan δ ratio (average Tan $\delta_2$/average Tan $\delta_1$) is measured as follows.
(Preparation of Sample)

First, three rectangular samples are obtained in a similar manner to the method for measuring the average creep slope ratio $(A_2/A_1)$. Next, a storage modulus E' and a loss modulus E'' of these three samples are measured as follows.
(Measurement of Storage Modulus E' and Loss Modulus E'' in Environment at Temperature of 32° C. and Humidity of 20% RH)

First, both longitudinal ends of the sample are clamped by a measurement part of a dynamic viscoelasticity measuring apparatus (RSAII, manufactured by TA Instruments). Subsequently, the temperature and humidity in a measurement chamber are controlled, and the sample is allowed to stand for at least 60 minutes or more until the temperature and humidity in the measurement chamber stabilize. Then, after it is confirmed that the dimensions of the sample are stable, the storage modulus E' and the loss modulus E'' are measured.

The measurement conditions for the storage modulus E' and the loss modulus E'' are as follows.
Measurement sample size: 4 mm×10 mm
Sampling: 1 s/point
Control
Temperature control PID: P=10, I=125, D=1
SS control PID: P=0.5, I=30, D=10
Hold temperature control PID: P=9, I=250, D=1
SS control: F set sign control SS Program (Load)

Offset: 110 mN

Amplitude: 50 mN

Frequency: 0.01 Hz

Hold: 0 min

Measurement time: 10 min

Temperature and Humidity Control

Temperature: 32° C.

Humidity: 20% RH

Bubbling temperature: 6.24° C.

Note that the bubbling temperature is a set value serving as a guide for adjusting the temperature and humidity of the measurement environment. In the case of the above setting, the temperature and humidity of the measurement environment are roughly adjusted by setting the temperature and humidity to 6.24° C., and thus, fine adjustment is then performed to adjust the temperature and humidity to the actual measurement environment.

(Measurement of Storage Modulus E' and Loss Modulus E" in Environment at Temperature of 32° C. and Humidity of 80% RH)

Next, the temperature and humidity in the measurement chamber are controlled as follows, and the sample is allowed to stand for at least 60 minutes or more until the temperature and humidity stabilize. Then, after it is confirmed that the dimensions of the sample are stable, the storage modulus E' and the loss modulus E" are measured.

Temperature and Humidity Control

Temperature: 32° C.

Humidity: 80% RH

Bubbling temperature: 28.11° C.

Note that the measurement conditions for the storage modulus E' and the loss modulus E" in the environment at a temperature of 32° C. and a humidity of 80% RH are similar to the measurement conditions for the storage modulus E' and the loss modulus E" in the environment at a temperature of 32° C. and a humidity of 20% RH with respect to conditions except for the temperature and humidity control described above.

In addition, the bubbling temperature is a set value serving as a guide for adjusting the temperature and humidity of the measurement environment as described above. The temperature and humidity of the measurement environment are roughly adjusted by setting the bubbling temperature to 28.11° C., and thus, fine adjustment is then performed to adjust the bubbling temperature to the actual measurement environment.

(Calculation of Average Tan δ Ratio (Average Tan $\delta_2$/Average Tan $\delta_1$))

In the following description, among the above three samples, the sample taken from the position of 10 m to 20 m in the longitudinal direction is referred to as "sample 1", the sample taken from the position of 30 m to 40 m in the longitudinal direction is referred to as "Sample 2", and the sample taken from the position of 50 m to 60 m in the longitudinal direction is referred to as "Sample 3".

Next, Tan $\delta_1$ (=E"/E') of Sample 1 is calculated using the storage modulus E' and the loss modulus E" of Sample 1 measured at a temperature of 32° C. and a humidity of 20% RH. Subsequently, Tan $\delta_2$ (=E"/E') of Sample 1 is calculated using the storage modulus E' and the loss modulus E" of Sample 1 measured at a temperature of 32° C. and a humidity of 80% RH. Next, Tan $\delta_1$ and Tan $\delta_2$ of Sample 2 and Tan $\delta_1$ and Tan $\delta_2$ of Sample 3 are calculated in a similar manner to the calculation procedure for Tan $\delta_1$ and Tan $\delta_2$ of Sample 1.

Next, Tan $\delta_1$ of Samples 1 to 3 is simply averaged (arithmetically averaged) to calculate an average Tan $\delta_1$. Similarly, Tan $\delta_2$ of Samples 1 to 3 is simply averaged (arithmetically averaged) to calculate an average Tan $\delta_2$. Next, the ratio of the average Tan $\delta_2$ to the average Tan $\delta_1$ (average Tan $\delta_2$/average Tan $\delta_1$) is obtained.

(Average Width Change Amount ΔW of Magnetic Tape MT with Respect to Temperature Change in Environment at Humidity of 80% RH)

An average width change amount ΔW of the magnetic tape MT with respect to the temperature change in the environment at a humidity of 80% RH is preferably 160 nm/° C. or less, more preferably 150 nm/° C. or less, still more preferably 140 nm/° C. or less, and particularly preferably 130 nm/° C. or less or 120 nm/° C. or less. When the average width change amount OW is 160 nm/° C. or less, reproduction of signals recorded in a different temperature environment can be sufficiently guaranteed even if the track density is high. The reason for this is specifically as follows. In a case where the average width change amount OW of the magnetic tape MT with respect to the temperature change in the environment at a humidity of 80% RH is 160 nm/° C. or less, when the temperature change of the recording/playback head of 89 nm/° C. is taken into consideration, a substantial change amount of the tape width in the tape drive is 71 nm/° C. or less. In a general storage tape system, a temperature range to be guaranteed in an environment at a humidity of 80% RH is about 20° C., and hence the maximum change amount is 1420 nm (20 [° C.]×71 [nm/° C.]). According to the findings by the present inventors, when the maximum change amount is 1420 nm or less in a magnetic tape MT with a width of ½ inch (12.65 mm), reproduction of signals recorded in a different temperature environment can be sufficiently ensured by a general drive even if the track density is high.

Figure 11:
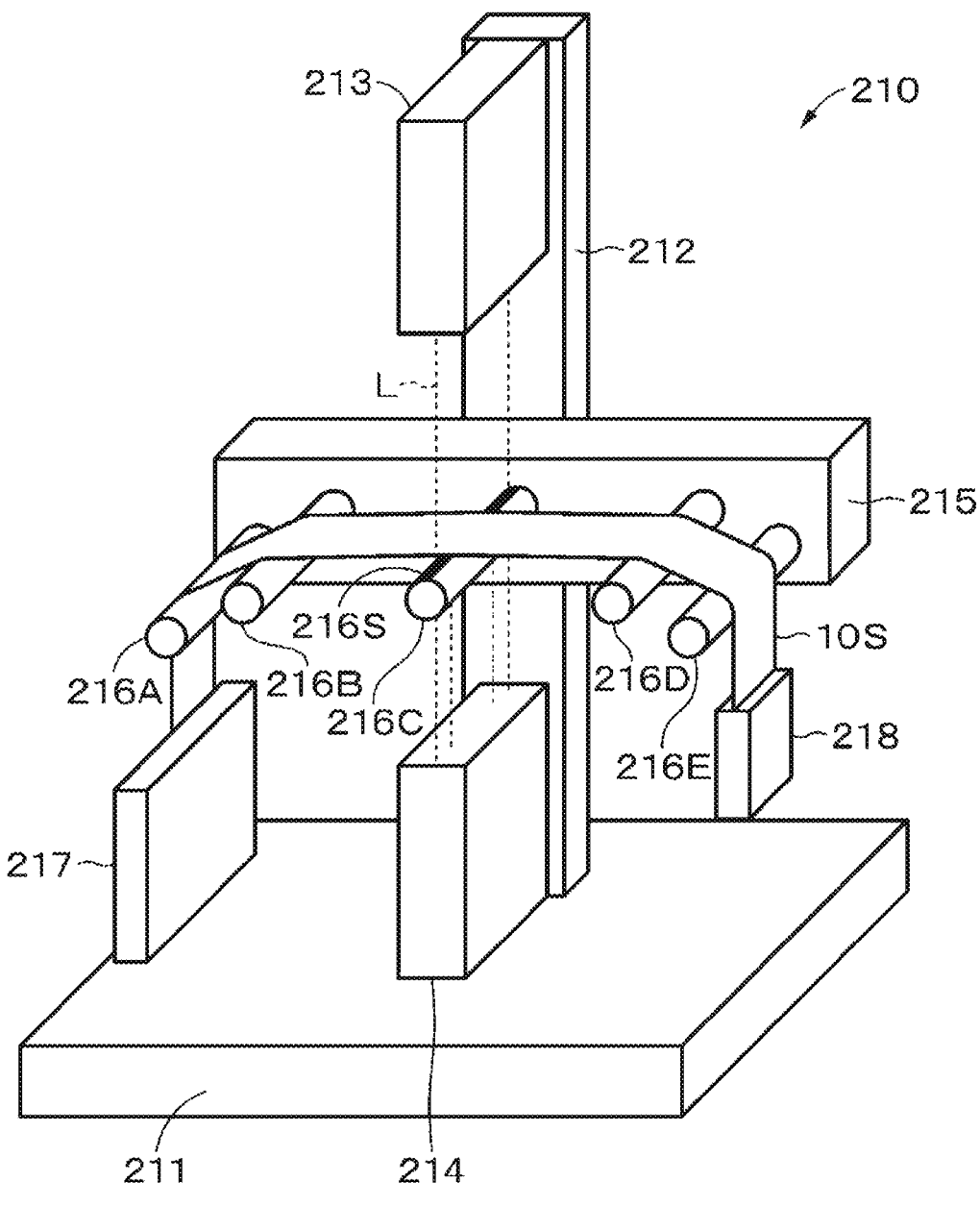
FIG. 11 is a perspective view illustrating a configuration of a measuring apparatus.

FIG. 11 is a schematic view illustrating an appearance of a measuring apparatus 210 used for measuring the average width change amount OW of the magnetic tape MT with respect to the temperature change in the environment at a humidity of 80% RH. The measuring apparatus 210 includes a base 211, a support column 212, a light emitter 213, a light receiver 214, a support plate 215, five support members 216A to 216E, and a fixing portion 217.

The base 211 has a rectangular plate shape. The light receiver 214 is provided at the center of the base 211. The support column 212 is erected adjacent to the light receiver 214 at a position shifted toward one long side from the center of the base 211. The fixing portion 217 is provided on one short side of the base 211.

The light emitter 213 is supported at the top of the support column 212. The light emitter 213 and the light receiver 214 face each other. During the measurement, the sample 10S supported by the support members 216A to 216E is disposed between the light emitter 213 and the light receiver 214 facing each other. The light emitter 213 and the light receiver 214 are connected to a personal computer (PC) (not illustrated), measure the width of the sample 10S supported by the support members 216A to 216E on the basis of the control of the PC, and output the measurement result to a personal computer (PC).

A digital dimension measuring instrument LS-7000 manufactured by KEYENCE CORPORATION is incorporated in the light emitter 213 and the light receiver 214. The light emitter 213 irradiates the sample 10S with linear light parallel to the width direction of the sample 10S supported by the support members 216A to 216E. The light receiver 214 measures the width of the sample 10S by measuring the amount of light not blocked by the sample 10S.

The support plate 215 having an elongated rectangular shape is fixed at the height position of approximately half of the support column 212. The support plate 215 is supported such that the long side of the support plate 215 is parallel to the main surface of the base 211. On one main surface of the support plate 215, the five support members 216A to 216E are supported. The support members 216A to 216E have a cylindrical rod shape and support the back surface of the sample 10S (magnetic tape MT). All of the five support members 216A to 216E (particularly, the surfaces thereof) include stainless steel SUS304 and have a surface roughness Rz (maximum height) of 0.15 μm or more and 0.3 μm or less.

Here, the arrangement of the five support members 216A to 216E will be described with reference to FIG. 11. As illustrated in FIG. 11, the sample 10S is placed on the five support members 216A to 216E. The diameter of each of the five support members 216A to 216E is, for example, 7 mm. A distance d1 between the support member 216A and the support member 216B (particularly, a distance between the central axes of these support members) is 20 mm. A distance d2 between the support member 216B and the support member 216C is 30 mm. A distance d3 between the support member 216C and the support member 216D is 30 mm. A distance d4 between the support member 216D and the support member 216E is 20 mm.

Further, the three support members 216B to 216D are disposed such that a portion of the sample 10S placed between the support member 216B, the support member 216C, and the support member 216D forms a plane substantially perpendicular to the direction of gravity. Moreover, the support member 216A and the support member 216B are disposed such that the sample 10S forms an angle of θ$_1$=30° with respect to the substantially perpendicular plane described above between the support member 216A and the support member 216B. Furthermore, the support member 216D and the support member 216E are disposed such that the sample 10S forms an angle of O$_2$=30° with respect to the substantially perpendicular plane described above between the support member 216D and the support member 216E. In addition, among the five support members 216A to 216E, the support member 216C is fixed so as not to rotate, but all the other four support members 216A, 216B, 216D, 216E are rotatable.

Among the support members 216A to 216E, a slit 216S is provided in the support member 216C positioned between the light emitter 213 and the light receiver 214 and positioned substantially at the center of the fixing portion 217 and the portion to which the load is applied. Light L is emitted from the light emitter 213 to the light receiver 214 through the slit 216S. The slit 216S has a slit width of 1 mm, and the light L can pass through the slit 216S without being blocked by the frame of the slit 216S.

The average width change amount OW of the magnetic tape MT with respect to the temperature change in the environment at a humidity of 80% RH is measured as follows using the measuring apparatus 210 described above. First, the magnetic tape MT with a width of ½ inch (12.65 mm) accommodated in the cartridge 10 is unwound, and the magnetic tape MT is cut out to a length of 250 mm from each of a range of 10 m to 20 m, a range of 30 m to 40 m, and a range of 50 m to 60 m in the longitudinal direction from one outer peripheral end of the magnetic tape MT, thereby obtaining three samples 10S.

Next, the width change amount of the magnetic tape MT with respect to the temperature change in the environment at a humidity of 80% RH is measured for each of the above three samples as follows.

The sample 10S is set in the measuring apparatus 210. Specifically, one end of the long sample 10S is fixed by the fixing portion 217. Next, the sample 10S is placed on the five support members 216A to 216E. At this time, the back surface of the sample 10S is brought into contact with the five support members 216A to 216E.

Next, after the measuring apparatus 210 is accommodated in the chamber, a weight 218 for applying a load of 0.2 N is attached to the other end of the sample 10S. Thereafter, the temperature and humidity in the chamber are controlled, the inside of the chamber is set to a first environment (temperature 10° C., humidity 20% RH), and then the process waits until the environment in the chamber stabilizes. When the environment in the chamber stabilizes, the width of the sample 10S in the first environment is measured for three hours using the digital dimension measuring instrument, and data for the last 10 minutes of the measurement is taken as the width of the sample 10S in the above first environment.

Next, after the temperature and humidity in the chamber are controlled and the inside of the chamber is set to a second environment (temperature 10° C., humidity 80% RH), the process waits until the environment in the chamber stabilizes. When the environment in the chamber stabilizes, the width of the sample 10S in the second environment is measured in a similar manner to the measurement of the width of the sample 10S in the first environment.

Next, after the temperature and humidity in the chamber are controlled and the inside of the chamber is set to a third environment (temperature 29° C., humidity 80% RH), the process waits until the environment in the chamber stabilizes. When the environment in the chamber stabilizes, the width of the sample 10S in the third environment is measured in a similar manner to the measurement of the width of the sample 10S in the first environment.

The width change amount Δw [nm/° C.] of the magnetic tape MT with respect to the temperature change in the environment at a humidity of 80% RH is calculated using the width of the sample 10S measured in the second environment (temperature 10° C., humidity 80% RH) and the third environment (temperature 29° C., humidity 80% RH) among the first to third environments described above. Specifically, the width change amount Δw [nm/° C.] of the magnetic tape MT with respect to the temperature change in the environment at a humidity of 80% RH is calculated by the following equation.

$$\text{Width change amount } \Delta w[\text{nm}/^\circ \text{ C.}] = ((w_3 - w_2)(29^\circ \text{ C.} - 10^\circ \text{ C.}),$$

where w$_2$ represents the width of the magnetic tape MT in the second environment (temperature 10° C., humidity 80% RH), and w$_3$ represents the width of the magnetic tape MT in the third environment (temperature 29° C., humidity 80% RH).

Next, an average value is obtained by simply averaging (arithmetically averaging) the width change amounts Ow of the three samples 10S measured as described above, and this is taken as the average width change amount OW of the magnetic tape MT with respect to the temperature change in the environment at a humidity of 80% RH.

In the above description of the measurement method, the method for measuring the width of the sample 10S in each of the three environments of the first environment to the third environment has been described. However, in a case where, even if the measurement of the width of the sample 10S in the first environment is omitted, the measurement of the width change amount Lw of the magnetic tape MT is not affected, that is, the measurement of the width of the sample 10S in the second environment and the third environment is not affected, the width of the sample 10S may be measured only in two environments of the second environment and the third environment.

(Ten-Year Creep Deformation Amount ΔD)

A ten-year creep deformation amount ΔD in an environment at a temperature of 32° C. and a humidity of 55% RH is preferably 66 nm or less, more preferably 60 nm or less, still more preferably 50 nm or less, and particularly preferably 40 nm or less. When the creep deformation amount ΔD is 66 nm or less (300 nm or less in terms of magnetic tape width), the signal reproduction of the magnetic tape MT can be guaranteed even after ten years have elapsed in a general storage tape system. Here, the reason why the period is set to ten years is that a warranty period of at least ten years is generally desired for the cartridge.

The ten-year creep deformation amount ΔD in an environment at a temperature of 32° C. and a humidity of 55% RH represents a creep deformation amount estimated when the tape runs over ten years in an environment at a temperature of 32° C. and a humidity of 55% RH. The creep deformation amount ΔD is measured as follows.

First, an LTO cartridge accommodating a magnetic tape MT with a width of ½ inch (12.65 mm) and an LTO drive that can use the LTO cartridge are prepared. Next, the cartridge and drive are then held for at least 24 hours until thermally stabilizing in an environment at a temperature of 32° C. and a humidity of 55% RH. All of the following steps are performed in the environment at a temperature of 32° C. and a humidity of 55% RH. Next, the cartridge is loaded into the drive, the entire length of the magnetic tape MT is made one round trip at a running speed of 5 m/sec and a tape tension of 0.4 N, and the cartridge is unloaded from the drive. After the unloaded cartridge is left for 30 minutes, the cartridge is loaded into the drive again, the entire length of the magnetic tape MT is made one round trip at a running speed of 5 m/sec and a tape tension of 0.4 N, and the cartridge is unloaded from the drive. This procedure is repeated for 160 hours.

When the above operation is repeated for 160 hours, the cartridge is unloaded from the drive, and the cartridge is left for four hours. Next, the cartridge is loaded into the drive, and the magnetic tape runs from the beginning of tape (BOT) to the end of tape (EOT) at a running speed of 5 m/sec and a tape tension of 0.4 N to measure a servo band interval. After the measurement, the cartridge is unloaded from the drive, and the cartridge is left for four hours. The cartridge is loaded into the drive again, and the magnetic tape runs from the BOT to the EOT at a running speed of 5 m/sec and a tape tension of 0.4 N to measure a servo band interval. This procedure is repeated for 340 hours or more.

Next, an average servo band interval for each predetermined region in the first run is obtained using the servo band interval data acquired in the first run. Here, the predetermined region represents a region obtained by dividing the entire length of the magnetic tape by 80 at equal intervals in the longitudinal direction. The average servo band interval is obtained by measuring servo band intervals of 1300 frames in a predetermined region and simply averaging (arithmetically averaging) the measured values. Subsequently, using the servo band interval data acquired in the second and subsequent runs, an average value of the servo band intervals in each predetermined region in the second and subsequent runs is obtained in a similar manner to the average servo band interval in each predetermined region in the first run.

Figure 12:
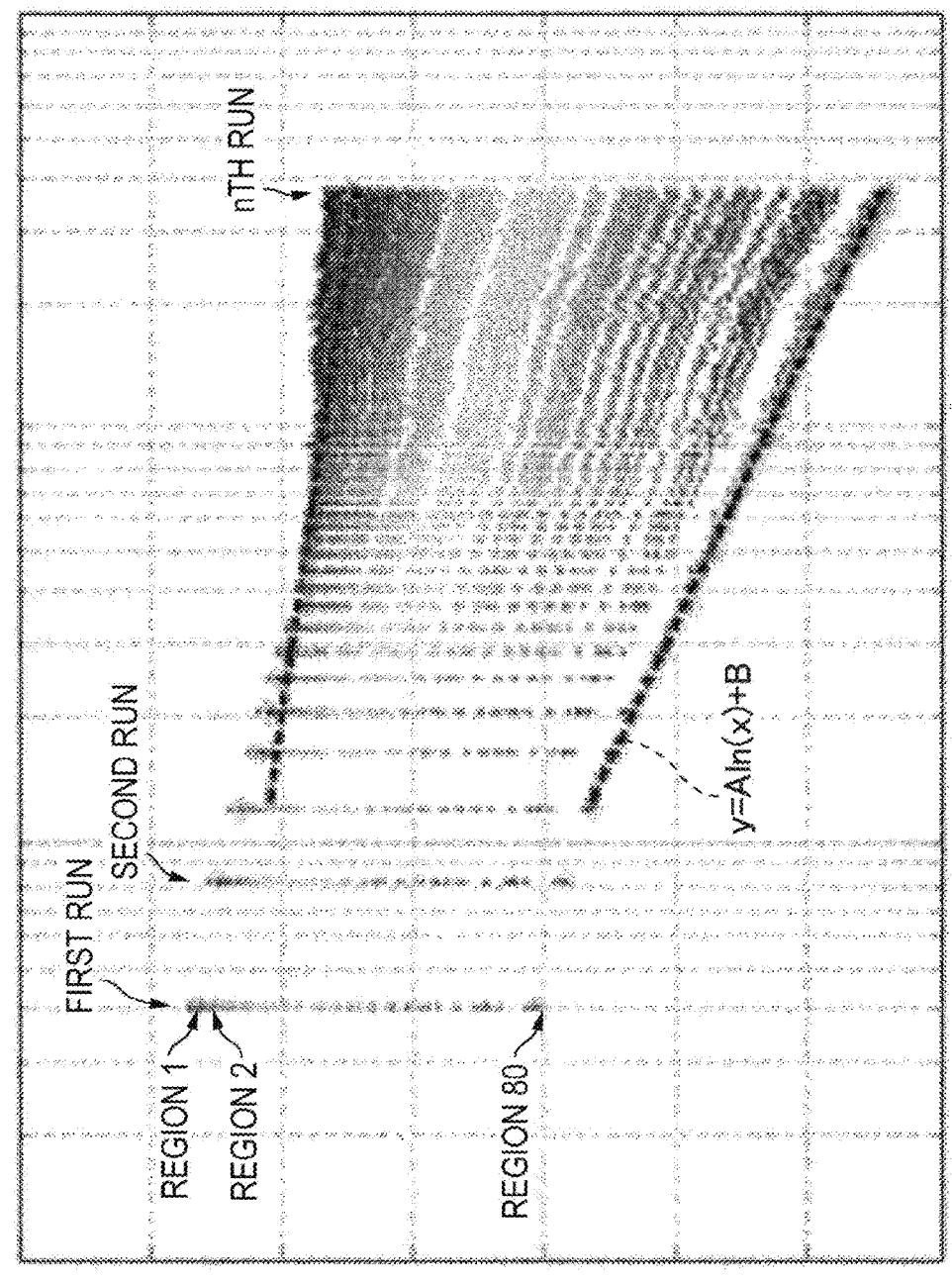
FIG. 12 is a graph illustrating an example of an image of a relationship between an aging time and an average servo band interval.

Next, a graph with the average servo band interval obtained as described above on the vertical axis and the aging time on the horizontal axis (logarithmic axis) is drawn, and the data in each predetermined region is subjected to logarithmic approximation to obtain an approximate straight line. Specifically, the following approximate straight line is obtained. For the calculation of the approximate straight line, the "Add approximate curve" function of Excel (registered trademark) of Microsoft (registered trademark) is used. Note that the version of Microsoft (registered trademark) Excel (registered trademark) described above is Microsoft (registered trademark) Excel (registered trademark) for Microsoft 365 MSO. FIG. 12 illustrates an image of a graph with the average servo band interval on the vertical axis and the aging time on the horizontal axis (logarithmic axis).

$$y = Aln(x) + B,$$

where y represents an average servo band interval [μm]. x represents time [h]. A and B represent coefficients. ln represents a natural logarithm.

Next, the coefficient A is obtained for each of the 80 predetermined regions to acquire 80 coefficients A in total. Subsequently, the 80 coefficients A acquired are averaged to calculate an average value $A_m$ of the coefficients A. Then, using the average value $A_m$ of the coefficient A, a ten-hour servo band interval $D_1$ (=$A_m$×ln(10)+B) and an 87,600-hour (10-year) servo band interval $D_2$ (=$A_m$×ln(87600)+B) are calculated. Next, a difference ΔD (=$D_2$−$D_1$) between the ten-hour servo band interval $D_1$ and the 87,600-hour (ten-year) servo band interval $D_2$ is calculated and set as the ten-year creep deformation amount ΔD.

4. Method for Manufacturing Magnetic Tape

Next, an example of a method for manufacturing the magnetic tape MT having the above configuration will be described.

(Step of Preparing Paint)

First, nonmagnetic particles, a binder, and the like are kneaded and dispersed in a solvent to prepare an underlayer forming paint. Next, magnetic particles, a binder, and the like are kneaded and dispersed in a solvent to prepare a magnetic layer forming paint. For the preparation of the magnetic layer forming paint and the underlayer forming paint, for example, the following solvents, dispersing apparatuses, and kneading apparatuses can be used.

Examples of the solvent used for preparing the paints described above include ketone solvents such as acetone, methyl ethyl ketone, methyl isobutyl ketone, and cyclohexanone, alcohol solvents such as methanol, ethanol, and propanol, ester solvents such as methyl acetate, ethyl acetate, butyl acetate, propyl acetate, ethyl lactate, and ethylene glycol acetate, ether solvents such as diethylene glycol dimethyl ether, 2-ethoxyethanol, tetrahydrofuran, and dioxane, aromatic hydrocarbon solvents such as benzene, toluene, and xylene, halogenated hydrocarbon solvents such as methylene chloride, ethylene chloride, carbon tetrachloride, chloroform, and chlorobenzene, and the like. These may be used alone or in an appropriate mixture.

As the kneading apparatus used for preparing the paint described above, for example, a kneading apparatus such as a continuous biaxial kneader, a continuous biaxial kneader capable of diluting in multiple stages, a kneader, a pressure kneader, or a roll kneader can be used, but the kneading apparatus is not particularly limited to these apparatuses. Further, as the dispersing apparatus used for preparing the paint described above, for example, a dispersing apparatus such as a roll mill, a ball mill, a horizontal Sandoz mill, a vertical Sandoz mill, a spike mill, a pin mill, a tower mill, a pearl mill (e.g., "DCP mill" manufactured by Nippon Eirich Co., Ltd., etc.), a homogenizer, or an ultrasonic dispersing machine can be used, but the dispersing apparatus is not particularly limited to these apparatuses.

(Application Step)

Next, the underlayer forming paint is applied to one main surface of the substrate 41 and dried to form the underlayer 42. Subsequently, the magnetic layer forming paint is applied onto the underlayer 42 and dried to form the magnetic layer 43 on the underlayer 42. Note that during drying, the magnetic particles are subjected to magnetic orientation in the thickness direction of the substrate 41 by, for example, a solenoid coil. Further, during drying, the magnetic particles may be subjected to magnetic orientation in the running direction (longitudinal direction) of the substrate 41 by, for example, a solenoid coil, and then subjected to magnetic orientation in the thickness direction of the substrate 41. By performing the treatment of once orienting the magnetic particles in the longitudinal direction in this manner, the perpendicular orientation degree (i.e., squareness ratio S1) of the magnetic particles can be further improved. After the magnetic layer 43 is formed, the back layer 44 is formed on the other main surface of the substrate 41. As a result, the magnetic tape MT is obtained.

The squareness ratios S1, S2 are set to desired values by, for example, adjusting the strength of the magnetic field applied to the coating film of the magnetic layer forming paint, the concentration of the solid content in the magnetic layer forming paint, and the drying conditions (drying temperature and drying time) of the coating film of the magnetic layer forming paint. The strength of the magnetic field applied to the coating film is preferably not less than two times and not more than three times the coercivity of the magnetic particles. In order to further increase the squareness ratio S1 (i.e., in order to further decrease the squareness ratio S2), it is preferable to improve the dispersion state of the magnetic particles in the magnetic layer forming paint. Further, in order to further increase the squareness ratio S1, it is also effective to magnetize the magnetic particles before the magnetic layer forming paint enters an orientation apparatus configured to magnetically orient magnetic particles. Note that the methods for adjusting the squareness ratios S1, S2 described above may be used alone or in combination of two or more.

(Curing Step)

Next, after the magnetic tape MT is wound into a roll shape, the magnetic tape MT is heated in this state to cure the underlayer 42 and the magnetic layer 43.

(Calender Step)

Next, a calender treatment is performed on the obtained magnetic tape MT to smooth the magnetic surface.

(Demagnetization Step and Servo Pattern Writing Step)

Next, after the magnetic tape MT is demagnetized, a servo pattern may be written on the magnetic tape MT as necessary.

(Cutting Step and Strain Relaxation Treatment Step)

Next, the magnetic tape MT is cut into a predetermined width (e.g., ½ inch width) and wound around a winding hub. Next, a strain relaxation treatment is performed by holding the wound magnetic tape MT in an environment at a predetermined temperature for a predetermined time. Thus, the magnetic tape MT is obtained.

(Method for Adjusting Average Creep Slope Ratio and Average Tan δ Ratio)

The average creep slope ratio $(A_2/A_1)$ and the average Tan δ ratio (average Tan $\delta_2$/average Tan $\delta_1$) can be adjusted to desired values by, for example, adjusting the thickness of each layer of the magnetic tape MT, selecting the type of material of the substrate 41, adjusting the conditions for the strain relaxation treatment, and the like.

5. Effects

As described above, in the magnetic tape MT according to the embodiment, the average creep slope ratio $(A_2/A_1)$ between the average creep slope $A_1$ measured in the environment at a temperature of 32° C. and a humidity of 20% RH and the average creep slope $A_2$ measured in the environment at a temperature of 32° C. and a humidity of 80% RH is 1.440 or less, and the average Tan δ ratio (average Tan $\delta_2$/average Tan $\delta_1$) between the average Tan $\delta_1$ measured in the environment at a temperature of 32° C. and a humidity of 20% RH and the average Tan $\delta_2$ measured in the environment at a temperature of 32° C. and a humidity of 80% RH is 1.2000 or less. Thereby, even in a case where the average thickness of the magnetic tape MT is 5.30 μm or less, it is possible to reduce the creep deformation and the viscoelastic change of the magnetic tape MT due to the environmental change (humidity change). Therefore, it is possible to realize a magnetic tape having excellent dimensional stability against an environmental change (humidity change). In addition, it is possible to realize a magnetic tape having excellent dimensional stability against the temperature change in the environment at a humidity of 80% RH.

6. Modified Example

In the above embodiment, the case where the magnetic tape cartridge is the one-reel type cartridge 10 has been described, but the magnetic tape cartridge may be a two-reel type cartridge.

Figure 13:
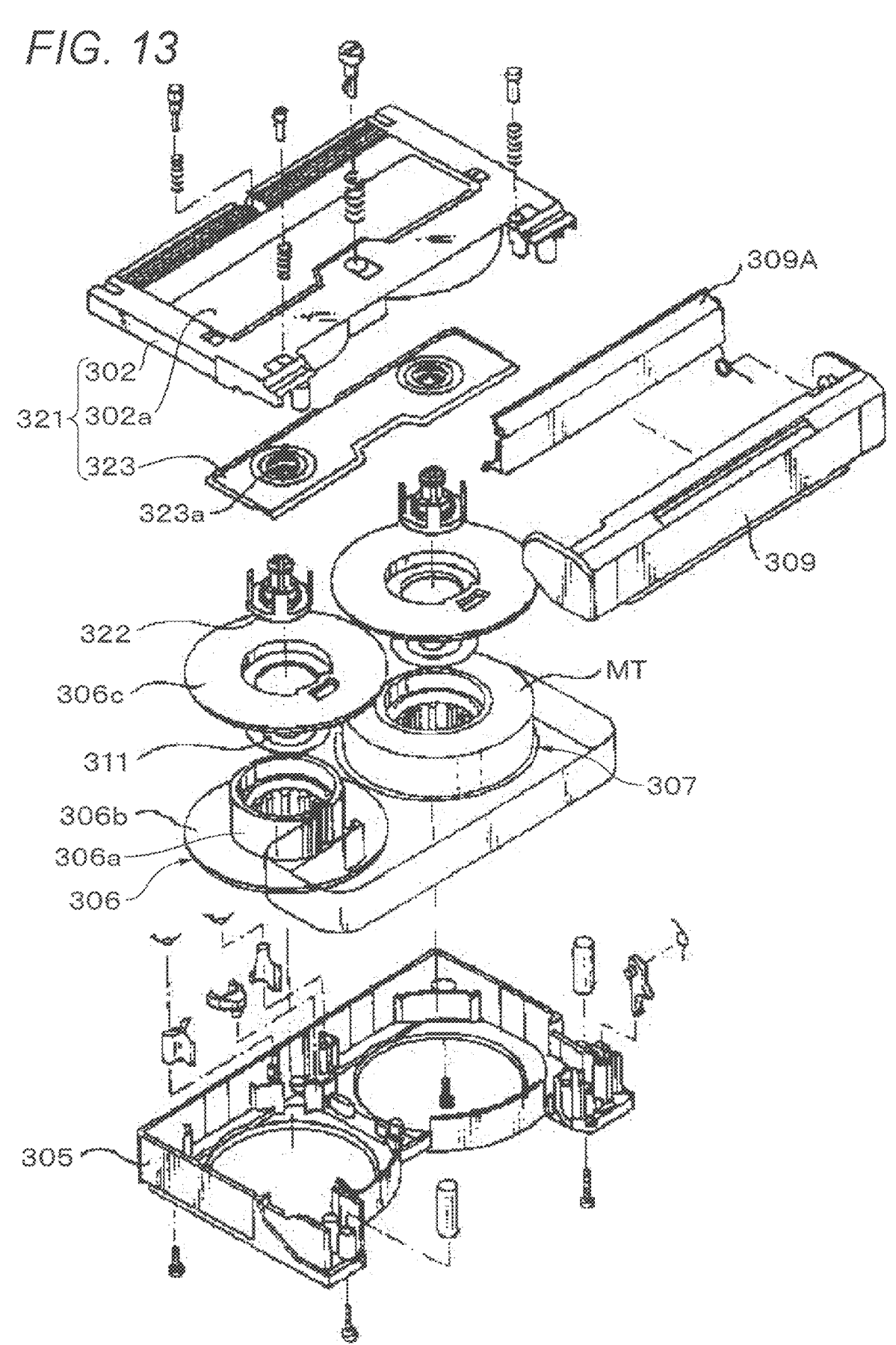
FIG. 13 is an exploded perspective view illustrating an example of a configuration of a cartridge according to a modified example of the embodiment of the present disclosure.

FIG. 13 is an exploded perspective view illustrating an example of a configuration of the two-reel type cartridge 321. The cartridge 321 includes an upper half 302 including a synthetic resin, a transparent window member 323 fitted and fixed to a window portion 302a opened on the upper surface of the upper half 302, reel holders 322 fixed to the inner side of the upper half 302 and preventing reels 306, 307 from being lifted up, a lower half 305 corresponding to the upper half 302, the reels 306, 307 stored in a space formed by combining the upper half 302 and the lower half 305, a magnetic tape MT wound around the reels 306, 307, a front lid 309 that closes a front-side opening formed by combining the upper half 302 and the lower half 305, and a back lid 309A that protects the magnetic tape MT exposed at the front-side opening.

The reels 306, 307 are for winding the magnetic tape MT. The reel 306 includes a lower flange 306b having a cylindrical hub 306a in the center where the magnetic tape MT is wound, an upper flange 306c having substantially the same size as the lower flange 306b, and a reel plate 311 sandwiched between the hub 306a and the upper flange 306c. The reel 307 has a similar configuration to the reel 306.

The window member 323 is provided with attachment holes 323a at positions corresponding to the reels 306, 307, respectively, for assembling the reel holders 322 that are reel holding mechanisms for preventing the reels from being lifted up. The magnetic tape MT is similar to the magnetic tape MT in the above embodiment.

EXAMPLES

Hereinafter, the present disclosure will be specifically described with reference to examples, but the present disclosure is not limited to these examples.

In the following examples and comparative examples, the average creep slope ratio $(A_2/A_1)$ and the average Tan δ ratio (average Tan $\delta_2$/average Tan $\delta_1$) were adjusted by adjusting the thickness of each layer of the magnetic tape, selecting the type of material of the base film (substrate), and adjusting the conditions for the strain relaxation treatment.

Example 1

(Step of Preparing Magnetic Layer Forming Paint)

A magnetic layer forming paint was prepared as follows. First, a first composition having the following formulation was kneaded with an extruder. Next, the kneaded first composition and a second composition having the following formulation were added to a stirring tank equipped with a disper, and premixing was performed. Subsequently, dyno mill mixing was further performed, and a filter treatment was performed to prepare a magnetic layer forming paint.

(First Composition)

Barium ferrite $(BaFe_{12}O_{19})$ magnetic powder (hexagonal plate shape, average aspect ratio 2.9, average particle volume 1400 $nm^3$): 100.0 parts by mass Vinyl chloride-based resin (formulation of the resin solution: 30.0 mass % of a vinyl chloride-based resin and 70.0 mass % of a cyclohexanone solution): 35.0 parts by mass (degree of polymerization 300, number average molecular weight Mn=10,000, $OSO_3K$=0.07 mmol/g and secondary OH=0.3 mmol/g as polar groups)

Polyurethane resin (resin solution: formulation amount of polyurethane resin: 30.0 mass %, formulation amount of cyclohexanone: 70.0 mass %): 10.0 parts by mass (Polyurethane resin: number average molecular weight Mn=25000, glass transition temperature Tg=110° C.)

aluminum oxide powder: 6.0 parts by mass $(\alpha\text{-}Al_2O_3$, average particle size 0.1 μm)

(Second Composition)

Carbon black: 2.0 parts by mass (manufactured by TOKAI CARBON CO., LTD., trade name: SEAST S, arithmetic average particle diameter: 70 nm)

Polyurethane resin (formulation of the resin solution: polyurethane resin 30.0 mass %, cyclohexanone 70.0 mass %): 5.0 parts by mass (Polyurethane resin: number average molecular weight Mn=25000, glass transition temperature Tg=110° C.)

n-butyl stearate: 2.0 parts by mass

Methyl ethyl ketone: 121.0 parts by mass

Toluene: 121.0 parts by mass

Cyclohexanone: 116.0 parts by mass

Finally, 3.3 parts by mass of polyisocyanate (trade name: Coronate L, manufactured by TOSOH CORPORATION)

and 1.0 parts by mass of stearic acid were added as curing agents to the magnetic layer forming paint prepared as described above.

(Step of Preparing Underlayer Forming Paint)

An underlayer forming paint was prepared as follows.

First, a third composition having the following formulation was kneaded with an extruder. Next, the kneaded third composition and a fourth composition having the following formulation were added to a stirring tank equipped with a disper, and premixing was performed. Subsequently, dyno mill mixing was further performed, and a filter treatment was performed to prepare an underlayer forming paint.

(Third Composition)

Acicular iron oxide powder: 100.0 parts by mass $(\alpha\text{-}Fe_2O_3$, average long-axis length 0.11 μm)

Vinyl chloride-based resin (formulation of the resin solution: 30.0 mass % of a vinyl chloride-based resin and 70.0 mass % of cyclohexanone): 46.0 parts by mass (degree of polymerization 300, number average molecular weight Mn=10,000, $OSO_3K$=0.07 mmol/g and secondary OH=0.3 mmol/g as polar groups)

Aluminum oxide powder: 3.0 parts by mass $(\alpha\text{-}Al_2O_3$, average particle size 0.1 μm)

(Fourth Composition)

Carbon black: 30.0 parts by mass (manufactured by ASAHI CARBON CO., LTD., trade name: #80)

Polyurethane resin (formulation of the resin solution: polyurethane resin 30.0 mass %, cyclohexanone 70.0 mass %): 40.0 parts by mass (Polyurethane resin: number average molecular weight Mn=25000, glass transition temperature Tg=70° C.)

n-butyl stearate: 2.0 parts by mass

Methyl ethyl ketone: 108.2 parts by mass

Toluene: 108.2 parts by mass

Cyclohexanone: 100.0 parts by mass

Finally, 1.5 parts by mass of polyisocyanate (trade name: Coronate L, manufactured by TOSOH CORPORATION) and 1.5 parts by mass of stearic acid were added as curing agents to the underlayer forming paint prepared as described above.

(Step of Preparing Back Layer Forming Paint)

A back layer forming paint was prepared as follows. The following raw materials were mixed in a stirring tank equipped with a disper and subjected to a filter treatment to prepare a back layer forming paint.

Carbon black (manufactured by ASAHI CARBON CO., LTD., Ltd., trade name: #80): 100.0 parts by mass Polyester polyurethane: 100.0 parts by mass (manufactured by Nippon Polyurethane Industry Co., Ltd, trade name: N-2304)

Methyl ethyl ketone: 500.0 parts by mass

Toluene: 400.0 parts by mass

Cyclohexanone: 100.0 parts by mass

Polyisocyanate (trade name: Coronate L, manufactured by TOSOH CORPORATION): 10.0 parts by mass (Application Step)

Using the magnetic layer forming paint and the underlayer forming paint prepared as described above, an underlayer and a magnetic layer were formed as follows on one main surface of a long polyethylene naphthalate film (hereinafter referred to as a "PEN film") having an average thickness of 4.00 μm, which is a base film (nonmagnetic support). First, the underlayer forming paint was applied onto one main surface of the PEN film and dried to form an underlayer so that the average thickness was 830 nm after the strain relaxation treatment. Next, the magnetic layer forming paint was applied onto the underlayer and dried to form a magnetic layer so that the average thickness was 70 nm after the strain relaxation treatment. During the drying of the magnetic layer forming paint, the magnetic particles were subjected to magnetic orientation in the thickness direction of the film by a solenoid coil. Thereby, the square-ness ratio S1 of the magnetic tape in the perpendicular direction (thickness direction) was set to 65%, and the squareness ratio S2 of the magnetic tape in the longitudinal direction was set to 38%. Subsequently, the back layer forming paint was applied onto the other main surface of the PEN film and dried to form the back layer so that the average thickness was 0.30 μm after the strain relaxation treatment. As a result, a magnetic tape was obtained.

In the following description, the average thickness of the underlayer, the average thickness of the magnetic layer, and the average thickness of the back layer represent the average thickness of the underlayer after the strain relaxation treatment, the average thickness of the magnetic layer after the strain relaxation treatment, and the average thickness of the back layer after the strain relaxation treatment, respectively.
(Curing Step)

After the magnetic tape was wound into a roll shape, the magnetic tape was heated at 70° C. for 48 hours in this state to cure the underlayer and the magnetic layer.
(Calender Step)

A calender treatment was performed to smooth the surface of the magnetic layer. At this time, the temperature in the calender treatment was set at 100° C., and the pressure in the calender treatment was 200 kg/cm.
(Cutting Step and Strain Relaxation Treatment Step)

The magnetic tape obtained as described above was cut into a width of ½ inch (12.65 mm) and wound around a winding hub. Hereinafter, the magnetic tape wound around the winding hub is referred to as a pancake. Next, a strain relaxation treatment was performed by holding the pancake in an environment at 60° C. for 24 hours. As a result, a magnetic tape having an average thickness of 5.20 μm was obtained.

Example 2

The average thickness of the underlayer was 680 nm, the average thickness of the back layer was 0.25 μm, and the base film was a PEN film having an average thickness of 4.20 μm. In addition, a strain relaxation treatment was performed by holding the pancake in an environment at 60° C. for 40 hours. A magnetic tape with an average thickness of 5.20 μm was obtained in a similar manner to Example 1 except for the above.

Example 3

The average thickness of the underlayer was 530 nm, the average thickness of the back layer was 0.20 μm, and the base film was a PET film having an average thickness of 4.40 μm. A magnetic tape with an average thickness of 5.20 μm was obtained in a similar manner to Example 1 except for the above.

Comparative Example 1

The average thickness of the underlayer was 1130 nm, the average thickness of the back layer was 0.40 μm, and the base film was a PEN base film having an average thickness of 3.60 μm. A magnetic tape with an average thickness of 5.20 μm was obtained in a similar manner to Example 1 except for the above.

Comparative Example 2

The average thickness of the underlayer was 680 nm, the average thickness of the back layer was 0.25 μm, and the base film was a PET film having an average thickness of 4.20 μm. A magnetic tape with an average thickness of 5.20 μm was obtained in a similar manner to Example 1 except for the above.
(Evaluation)

The magnetic tape obtained as described above was evaluated as follows.
(Average Creep Slope Ratio ($A_2/A_1$))

The average creep slope ratio ($A_2/A_1$) of the magnetic tape was measured by the method for measuring the average creep slope ratio ($A_2/A_1$) described in the above embodiment. The results are shown in Table 2.
(Average Tan δ Ratio (Average Tan $\delta_2$/Average Tan $\delta_1$))

The average Tan δ ratio (average Tan $\delta_2$/average Tan $\delta_1$) of the magnetic tape was measured by the method for measuring the average Tan δ ratio (average Tan $\delta_2$/average Tan $\delta_1$) described in the above embodiment. The results are shown in Table 2.
(Average Width Change Amount ΔW of Magnetic Tape)

The average width change amount ΔW of the magnetic tape was measured by the method for measuring the average width change amount ΔW described in the above embodiment. The results are shown in Table 2.
(Ten-Year Creep Deformation Amount ΔD)

First, five servo bands were formed by writing servo signals on a magnetic tape, using a servo writer. By writing the servo signals, a row of V-shaped magnetic patterns (servo patterns) was formed at known intervals in each servo band. Next, the magnetic tape on which the servo signal was written was wound around a cartridge (cartridge conforming to the LTO standard).

Next, the ten-year creep deformation amount ΔD of the magnetic tape was measured by the method for measuring the ten-year creep deformation amount ΔD described in the above embodiment. The results are shown in Table 2.

TABLE 2

| <IMG SRC= "SYP348412WO01t002.gif"> |
| --- |

Figure 14:
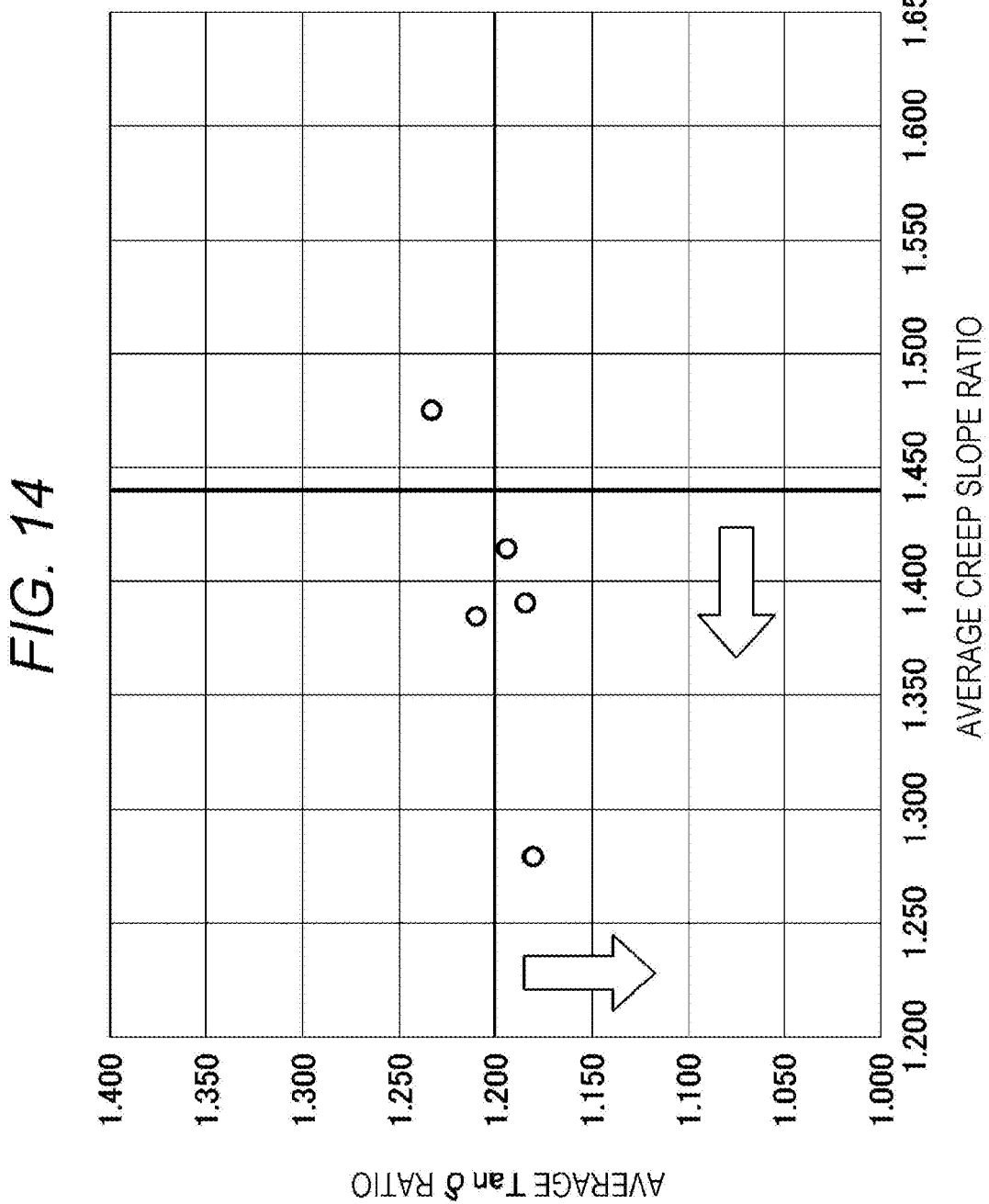
FIG. 14 is a graph illustrating measurement results of an average creep slope ratio and an average Tan δ ratio.

FIG. 14 illustrates the measurement results of the average creep slope ratio ($A_2/A_1$) and the average Tan δ ratio (average Tan $\delta_2$/average Tan $\delta_1$). When the average creep slope ratio ($A_2/A_1$) is 1.440 or less and the average Tan δ ratio (average Tan $\delta_2$/average Tan $\delta_1$) is 1.2000 or less, the average width change amount ΔW of the magnetic tape with respect to the temperature change in the environment at a humidity of 80% RH can be kept at or below 160 nm, and the ten-year creep deformation amount in the environment at a temperature of 32° C. and a humidity of 55% RH can be kept at or below 66 nm (Examples 1 to 3, Comparative Example 1).

Even when the average creep slope ratio ($A_2/A_1$) is 1.440 or less, when the average Tan δ ratio (average Tan $\delta_2$/average Tan $\delta_1$) exceeds 1.2000, the ten-year creep deformation amount in the environment at a temperature of 32° C. and a humidity of 55% RH can be kept at or below 66 nm, but the average width change amount ΔW of the magnetic tape with respect to the temperature change in the environment at a humidity of 80% RH cannot be kept at or below 160 nm (Comparative Example 2).

Although the embodiment and the modified example thereof according to the present disclosure have been specifically described above, the present disclosure is not limited to the above embodiment and modified example, and various modifications based on the technical idea of the present disclosure are possible. For example, configurations, methods, processes, shapes, materials, numerical values, and the like described in the above embodiments and modified examples are merely examples, and different configurations, methods, processes, shapes, materials, numerical values, and the like may be used as necessary. The configurations, methods, processes, shapes, materials, numerical values, and the like of the above embodiment and modified example can be combined with each other without departing from the gist of the present disclosure.

The chemical formulae of compounds and the like exemplified in the above embodiment and modified example are representative and are not limited to the listed valences and the like as long as they are common names of the same compound. In the numerical value range described in stages in the above embodiment and modified example, an upper limit value or a lower limit value of a numerical value range in a certain stage may be replaced with an upper limit value or a lower limit value of a numerical value range in another stage. The materials exemplified in the above embodiment and modified example may be used alone or in combination of two or more unless otherwise specified.

Further, the present disclosure can adopt the following configurations.

(1)

A magnetic recording medium in tape form including:

a substrate; and a magnetic layer, in which the substrate contains a polyester-based resin, an average thickness of the magnetic recording medium is 5.30 μm or less, a ratio $(A_2/A_1)$ of an average creep slope $A_2$ measured in an environment at a temperature of 32° C. and a humidity of 80% RH to an average creep slope $A_1$ measured in an environment at a temperature of 32° C. and a humidity of 20% RH is 1.440 or less, and a ratio (average Tan $\delta_2$/average Tan $\delta_1$) of an average Tan $\delta_2$ measured in the environment at a temperature of 32° C. and a humidity of 80% RH to an average Tan $\delta_1$ measured in the environment at a temperature of 32° C. and a humidity of 20% RH is 1.2000 or less.

(2)

The magnetic recording medium according to (1), in which the magnetic layer has a servo pattern, the servo pattern includes a plurality of first magnetized regions and a plurality of second magnetized regions, and the plurality of first magnetized regions and the plurality of second magnetized regions are asymmetric with respect to an axis parallel to a width direction of the magnetic recording medium.

(3)

The magnetic recording medium according to (2), in which an inclination angle of the first magnetized region with respect to the axis is different from an inclination angle of the second magnetized region with respect to the axis, and a larger one of the inclination angle of the first magnetized region and the inclination angle of the second magnetized region is 18° or more and 28° or less.

(4)

The magnetic recording medium according to any one of (1) to (3), in which the magnetic layer includes magnetic particles, and the magnetic particles have an average particle volume of 1500 nm³ or less.

(5)

The magnetic recording medium according to any one of (1) to (4), in which the average creep slope $A_1$ is an average value of creep slopes of a plurality of first samples taken from the magnetic recording medium, and a creep slope of each of the first samples is obtained by performing a creep test on the first sample in an environment at a temperature of 32° C. and a humidity of 20% RH, acquiring a graph with time on a horizontal axis and strain on a vertical axis, changing the horizontal axis of the graph to a logarithmic representation, performing logarithmic approximation on data in the graph after the change, and obtaining a slope of an approximate straight line, and the average creep slope $A_2$ is an average value of creep slopes of a plurality of second samples taken from the magnetic recording medium, and a creep slope of each of the second samples is obtained by performing a creep test on the second sample in an environment at a temperature of 32° C. and a humidity of 80% RH, acquiring a graph with time on a horizontal axis and strain on a vertical axis, changing the horizontal axis of the graph to a logarithmic representation, performing logarithmic approximation on data in the graph after the change, and obtaining a slope of an approximate straight line.

(6)

The magnetic recording medium according to any one of (1) to (5), in which the ratio $(A_2/A_1)$ is 1.300 or less, and the ratio (average Tan $\delta_2$/average Tan $\delta_1$) is 1.1800 or less.

(7)

The magnetic recording medium according to any one of (1) to (6), in which an amount of change in an average width of the magnetic recording medium with respect to a temperature change in an environment at a humidity of 80% RH is 160 nm/° C. or less.

(8)

The magnetic recording medium according to any one of (1) to (7), in which a ten-year creep deformation amount in an environment at a temperature of 32° C. and a humidity of 55% RH is 66 nm or less.

(9)

The magnetic recording medium according to any one of (1) to (8), in which the magnetic layer is configured to be capable of recording a signal with a data track width of 800 nm or less and a bit length of 46 nm or less.

(10)

The magnetic recording medium according to any one of (1) to (9), further including an underlayer, in which the underlayer has an average thickness of 900 nm or less.

(11)

The magnetic recording medium according to any one of (1) to (10), in which the magnetic layer has an average thickness of 80 nm or less.

(12)

The magnetic recording medium according to any one of (1) to (11), in which the substrate has an average thickness of 4.40 μm or less.

(13)

The magnetic recording medium according to any one of (1) to (12), further including a back layer, in which the back layer has an average thickness of 0.60 μm or less.

(14)

The magnetic recording medium according to any one of (1) to (13), in which the magnetic layer includes magnetic particles, and the magnetic particles contain hexagonal ferrite, ε-iron oxide, or Co-containing spinel ferrite.

(15)

A cartridge including the magnetic recording medium according to any one of (1) to (14).

(16)

A magnetic recording medium including:

an average thickness of the magnetic recording medium $t_T$ is $t_T \leq 5.3$ μm, a ratio $(A_2/A_1)$ of an average creep slope $A_2$ at a temperature of 32° C. and a humidity of 80% RH to an average creep slope $A_1$ at a temperature of 32° C. and a humidity of 20% RH is 1.440 or less, and a ratio $(Tan\ \delta_2/Tan\ \delta_1)$ of an average Tan $\delta_2$ at a temperature of 32° C. and a humidity of 80% RH to an average Tan $\delta_i$ at a temperature of 32° C. and a humidity of 20% RH is less than 1.2100.

(17)

The magnetic recording medium according to (17), in which the ratio $(A_2/A_1)$ is 1.400 or less.

(18)

The magnetic recording medium according to any one of (16) to (17), in which the ratio $(A_2/A_1)$ is 1.300 or less.

(19)

The magnetic recording medium according to any one of (16) to (18), in which the ratio $(Tan\ \delta_2/Tan\ \delta_1)$ is 1.2000 or less.

(20)

The magnetic recording medium according to any one of (16) to (19), in which the ratio $(Tan\ \delta_2/Tan\ \delta_1)$ is 1.1900 or less.

(21)

The magnetic recording medium according to any one of (16) to (20), in which the ratio $(Tan\ \delta_2/Tan\ \delta_1)$ is 1.1800 or less.

(22)

The magnetic recording medium according to any one of (16) to (21), in which the average thickness of the magnetic recording medium $t_T$ is 4.9 μm or less.

(23)

The magnetic recording medium according to any one of (16) to (22), in which the average thickness of the magnetic recording medium $t_T$ is 4.7 μm or less.

(24)

The magnetic recording medium according to any one of (16) to (23), further comprising a magnetic layer, wherein the magnetic layer includes a plurality of servo bands.

(25)

The magnetic recording medium according to any one of (16) to (24), in which the magnetic layer includes a servo pattern, and the servo pattern further includes a first magnetized region and a second magnetized region.

(26)

The magnetic recording medium according to any one of (16) to (25), in which the first magnetized region includes a plurality of servo stripes each having a first inclination angle 61 with respect to an axis parallel to a width direction of the magnetic recording medium, and wherein the second magnetized region includes a plurality of servo stripes each having a second inclination angle $\theta_2$ with respect to the axis, and wherein the first inclination angle 61 is different from the second inclination angle θ2.

(27)

The magnetic recording medium according to any one of (16) to (26), in which an average thickness of the magnetic layer is 80 nm or less.

(28)

The magnetic recording medium according to any one of (16) to (27), in which the magnetic layer includes a plurality of magnetic particles and the magnetic particles includes at least one of hexagonal ferrite, epsilon-type iron oxide, or Co-containing spinel ferrite.

(29)

The magnetic recording medium according to any one of (16) to (28), in which the hexagonal ferrite includes at least one of barium ferrite or strontium ferrite.

(30)

The magnetic recording medium according to any one of (16) to (29), in which the magnetic particles have an average particle volume from 500 $nm^3$ to 2500 $nm^3$.

(31)

The magnetic recording medium according to any one of (16) to (30), in which the average particle volume is equal to or less than 1500 $nm^3$.

(32)

The magnetic recording medium according to any one of (16) to (31), in which the average particle volume is equal to or less than 1400 $nm^3$.

(33)

The magnetic recording medium according to any one of (16) to (32), in which the magnetic particles have an average aspect ratio from 1.0 to 3.0.

(34)

The magnetic recording medium according to any one of (16) to (33), further comprising a substrate, wherein the substrate includes a polyester-based resin.

(35)

The magnetic recording medium according to any one of (16) to (34), in which a longitudinal Young's modulus of the substrate is from 2.5 GPa or more and 7.8 GPa.

(36)

The magnetic recording medium according to any one of (16) to (35), in which a data recording track width of the magnetic layer is 1200 nm or less.

(37)

The magnetic recording medium according to any one of (16) to (36), in which the data recording track width of the magnetic layer is 1000 nm or less.

(38)

The magnetic recording medium according to any one of (16) to (37), in which the data recording track width of the magnetic layer is 800 nm or less.

(39)

The magnetic recording medium according to any one of (16) to (38)), in which an average width change amount ΔW of the magnetic recording medium with respect to a temperature change at a humidity of 80% RH is 160 nm/° C. or less.

(40)

A magnetic recording cartridge including:

a magnetic recording medium, a memory, and a case that accommodates the magnetic recording medium and the memory, in which the magnetic recording medium includes:

an average thickness of the magnetic recording medium $t_T$ is $t_T \leq 5.3$ μm, a ratio $(A_2/A_1)$ of an average creep slope $A_2$ at a temperature of 32° C. and a humidity of 80% RH to an average creep slope $A_1$ at a temperature of 32° C. and a humidity of 20% RH is 1.440 or less, and a ratio $(\text{Tan } \delta_2/\text{Tan } \delta_1)$ of an average $\text{Tan } \delta_2$ at a temperature of 32° C. and a humidity of 80% RH to an average $\text{Tan } \delta_1$ at a temperature of 32° C. and a humidity of 20% RH is less than 1.2100.

(41)

The magnetic recording cartridge according to (40), in which the ratio $(A_2/A_1)$ is 1.400 or less.

(42)

The magnetic recording cartridge according to any one of (40) to (41), in which the ratio $(\text{Tan } \delta_2/\text{Tan } \delta_1)$ is 1.2000 or less.

(43)

The magnetic recording cartridge according to any one of (40) to (42), in which an average width change amount ΔW of the magnetic recording medium with respect to a temperature change at a humidity of 80% RH is 160 nm/° C. or less.

(44)

The magnetic recording cartridge according to any one of (40) to (43), in which the magnetic recording cartridge conforms to a linear tape-open (LTO) standard.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

10, 321 Cartridge
10S Sample
11 Cartridge memory
31 Antenna coil
32 Rectification and power supply circuit
33 Clock circuit
34 Detection and modulation circuit
Controller
36 Memory
36A First storage area
36B Second storage area
41 Substrate
42 Underlayer
43 Magnetic layer
44 Back layer
56 Head unit
56A, 56B Servo read head
110 Servo frame
111 Servo subframe 1
112 Servo subframe 2
113 Servo stripe
111A A-burst
111B B-burst
112C C-burst
112D D-burst
210 Measuring apparatus
MT Magnetic tape
SB Servo band
DB Data band
Tk Data track

The invention claimed is:

1. A magnetic recording medium comprising:

a magnetic layer and a substrate, an average thickness of the magnetic recording medium $t_T$ is $t_T \leq 5.3$ μm, a ratio $(A_2/A_1)$ of an average creep slope $A_2$ at a temperature of 32° C. and a humidity of 80% RH to an average creep slope $A_1$ at a temperature of 32° C. and a humidity of 20% RH is 1.440 or less, and a ratio $(\text{Tan } \delta_2/\text{Tan } \delta_1)$ of an average $\text{Tan } \delta_2$ at a temperature of 32° C. and a humidity of 80% RH to an average $\text{Tan } \delta_1$ at a temperature of 32° C. and a humidity of 20% RH is less than 1.2100, wherein an average width change amount ΔW of the magnetic recording medium with respect to a temperature change at a humidity of 80% RH is 160 nm/° C. or less, wherein the magnetic layer includes a plurality of magnetic particles including at least one of hexagonal ferrite, epsilon-type iron oxide, or Co-containing spinel ferrite, and wherein the substrate includes a polyester-based resin.

2. The magnetic recording medium according to claim 1, wherein the ratio $(A_2/A_1)$ is 1.400 or less.

3. The magnetic recording medium according to claim 1, wherein the ratio $(A_2/A_1)$ is 1.300 or less.

4. The magnetic recording medium according to claim 1, wherein the ratio $(\text{Tan } \delta_2/\text{Tan } \delta_1)$ is 1.2000 or less.

5. The magnetic recording medium according to claim 1, wherein the ratio $(\text{Tan } \delta_2/\text{Tan } \delta_1)$ is 1.1900 or less.

6. The magnetic recording medium according to claim 1, wherein the ratio $(\text{Tan } \delta_2/\text{Tan } \delta_1)$ is 1.1800 or less.

7. The magnetic recording medium according to claim 1, wherein the average thickness of the magnetic recording medium $t_T$ is 4.9 μm or less.

8. The magnetic recording medium according to claim 7, wherein the average thickness of the magnetic recording medium $t_T$ is 4.7 μm or less.

9. The magnetic recording medium according to claim 1, wherein the magnetic layer includes a plurality of servo bands.

10. The magnetic recording medium according to claim 9, wherein the magnetic layer includes a servo pattern, and the servo pattern further includes a first magnetized region and a second magnetized region.

11. The magnetic recording medium according to claim 10, wherein the first magnetized region includes a plurality of servo stripes each having a first inclination angle $\theta_1$ with respect to an axis parallel to a width direction of the magnetic recording medium, and wherein the second magnetized region includes a plurality of servo stripes each having a second inclination angle $\theta_2$ with respect to the axis, and wherein the first inclination angle $\theta_1$ is different from the second inclination angle $\theta_2$.

12. The magnetic recording medium according to claim 9, wherein an average thickness of the magnetic layer is 80 nm or less.

13. The magnetic recording medium according to claim 1, wherein the hexagonal ferrite includes at least one of barium ferrite or strontium ferrite.

14. The magnetic recording medium according to claim 1, wherein the magnetic particles have an average particle volume from 500 $\text{nm}^3$ to 2500 $\text{nm}^3$.

15. The magnetic recording medium according to claim 14, wherein the average particle volume is equal to or less than 1500 $\text{nm}^3$.

16. The magnetic recording medium according to claim 14, wherein the average particle volume is equal to or less than 1400 nm$^3$.

17. The magnetic recording medium according to claim 1, wherein the magnetic particles have an average aspect ratio from 1.0 to 3.0.

18. The magnetic recording medium according to claim 1, wherein a longitudinal Young's modulus of the substrate is from 2.5 GPa or more and 7.8 GPa.

19. The magnetic recording medium according to claim 9, wherein a data recording track width of the magnetic layer is 1200 nm or less.

20. The magnetic recording medium according to claim 19, wherein the data recording track width of the magnetic layer is 1000 nm or less.

21. The magnetic recording medium according to claim 19, wherein the data recording track width of the magnetic layer is 800 nm or less.

22. A magnetic recording cartridge comprising:

a magnetic recording medium, a memory, and a case that accommodates the magnetic recording medium and the memory, wherein the magnetic recording medium includes:

a magnetic layer and a substrate, an average thickness of the magnetic recording medium $t_T$ is $t_T \leq 5.3$ μm, a ratio ($A_2/A_1$) of an average creep slope $A_2$ at a temperature of 32° C. and a humidity of 80% RH to an average creep slope $A_1$ at a temperature of 32° C. and a humidity of 20% RH is 1.440 or less, and a ratio (Tan $\delta_2$/Tan $\delta_1$) of an average Tan $\delta_2$ at a temperature of 32° C. and a humidity of 80% RH to an average Tan $\delta_1$ at a temperature of 32° C. and a humidity of 20% RH is less than 1.2100, wherein an average width change amount $\Delta W$ of the magnetic recording medium with respect to a temperature change at a humidity of 80% RH is 160 mm/° C. or less, wherein the magnetic layer includes a plurality of magnetic particles including at least one of hexagonal ferrite, epsilon-type iron oxide, or Co-containing spinel ferrite, and wherein the substrate includes a polyester-based resin.

23. The magnetic recording cartridge according to claim 22, wherein the ratio ($A_2/A_1$) is 1.400 or less.

24. The magnetic recording cartridge according to claim 22, wherein the ratio (Tan $\delta_2$/Tan $\delta_1$) is 1.2000 or less.

25. The magnetic recording cartridge according to claim 22, wherein the magnetic recording cartridge conforms to a linear tape-open (LTO) standard.

26. The magnetic recording medium according to claim 1, wherein a ten-year creep deformation amount $\Delta D$ in an environment at the temperature of 32° C. and a humidity of 55% RH is 66 nm or less.

27. The magnetic recording cartridge according to claim 22, wherein a ten-year creep deformation amount $\Delta D$ in an environment at the temperature of 32° C. and a humidity of 55% RH is 66 nm or less.

* * * * *